(12) United States Patent
Kons

(10) Patent No.: US 11,916,638 B2
(45) Date of Patent: Feb. 27, 2024

(54) SPATIAL MULTIPLEXING OF DIFFERENT RADIO TECHNOLOGIES

(71) Applicant: Cohere Technologies, Inc., San Jose, CA (US)

(72) Inventor: Shachar Kons, San Diego, CA (US)

(73) Assignee: Cohere Technologies, Inc., San Jose, CA (US)

( * ) Notice: Subject to any disclaimer, the term of this patent is extended or adjusted under 35 U.S.C. 154(b) by 0 days.

(21) Appl. No.: 18/257,088

(22) PCT Filed: Dec. 21, 2021

(86) PCT No.: PCT/US2021/073061
§ 371 (c)(1),
(2) Date: Jun. 12, 2023

(87) PCT Pub. No.: WO2022/140778
PCT Pub. Date: Jun. 30, 2022

(65) Prior Publication Data
US 2023/0412241 A1    Dec. 21, 2023

Related U.S. Application Data

(60) Provisional application No. 63/128,421, filed on Dec. 21, 2020.

(51) Int. Cl.
*H04B 7/06* (2006.01)
*H04B 7/0456* (2017.01)
*H04L 27/26* (2006.01)

(52) U.S. Cl.
CPC ......... *H04B 7/0697* (2013.01); *H04B 7/0456* (2013.01); *H04L 27/2603* (2021.01)

(58) Field of Classification Search
CPC .. H04B 7/0697; H04B 7/0456; H04L 27/2603
See application file for complete search history.

(56) References Cited

U.S. PATENT DOCUMENTS

2013/0265951 A1    10/2013  Ng et al.
2014/0355557 A1    12/2014  Peng et al.
(Continued)

FOREIGN PATENT DOCUMENTS

WO    2019/241436    12/2019

OTHER PUBLICATIONS

International Search Report and Written Opinion for PCT/US2021/073061, dated Mar. 31, 2022, 16 pages.
(Continued)

*Primary Examiner* — Curtis B Odom
(74) *Attorney, Agent, or Firm* — Perkins Coie LLP

(57) ABSTRACT

Methods, systems and devices for spatial multiplexing of different radio technologies are described. An example method for wireless communication includes configuring abase station of a fifth generation new radio (5G NR) radio technology cell to perform transmissions in a network according to a set of compatibility rules that allow a backward compatible operation of the base station with a 4th generation Long Term Evolution (4G LTE) radio technology, and performing transmissions or receptions in the 5G NR cell according to the configuring such that the backward compatible operation is achieved based on orthogonality in a spatial domain between transmissions or receptions in the 5G NR cell and the 4G LTE radio technology.

11 Claims, 45 Drawing Sheets

(56) References Cited

U.S. PATENT DOCUMENTS

2017/0230215 A1  8/2017  Rakib et al.
2020/0154281 A1  5/2020  Muruganathan et al.

OTHER PUBLICATIONS

Liberg et al., "Transmission Time Interval" LTE-M, Cellular Internet of Things, 2018, retrieved on [Mar. 18, 2022], 22 pages.
IP Australia, Examination Report for Australian Patent Application No. 2021410801, dated Jul. 24, 2023, 3 pages.

FIG. 14

SPATIAL MULTIPLEXING OF DIFFERENT RADIO TECHNOLOGIES

CROSS-REFERENCE TO RELATED APPLICATION

This application a 371 National Phase Application of PCT Application No. PCT/US2021/073061 entitled "SPATIAL MULTIPLEXING OF DIFFERENT RADIO TECHNOLOGIES" filed on Dec. 21, 2021, which claims priority to U.S. Provisional Application No. 63/128,421 filed on Dec. 21, 2020, the disclosure of which is hereby incorporated by reference herein in its entirety.

TECHNICAL FIELD

The present document relates to wireless communication.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry produce the next generation of wireless technologies that can keep up with the demand on performance of wireless devices and networks. Many of those activities involve situations in which a large number of user devices may be served by a network.

SUMMARY

This document discloses techniques that may be used by wireless networks to achieve several operational improvements.

In one example aspect, a wireless communication method is disclosed. The method includes configuring transmission resources into one or more spatial layers organized into subframes, wherein transmission resources in each subframe are along a two-dimensional grid of time and frequency resource elements comprising symbols and subcarriers, for each spatial layer, configuring the corresponding resource elements by: designating a first group of resource elements as common resources that carry signal transmissions common to a first group of user devices according to a first radio technology; designating a second group of resource elements as common resources that carry signal transmissions common to a second group of user devices according to a second radio technology; designating a third group of resource elements as device-specific resources that carry device-specific signal transmissions to user devices in the first group of user devices; designating a fourth group of resource elements as device-specific resources that carry device-specific signal transmissions to user devices in the second group of users; and providing simultaneous connectivity to the first group of user devices and the second group of user devices based on use of transmission resources from the one or more spatial layers, such that the transmission resources from the one or more spatial layers are orthogonal in a space dimension.

In another example aspect, another wireless communication method is disclosed. The method includes configuring reception resources into one or more spatial layers organized into subframes, wherein reception resources in each subframe are along a two-dimensional grid of time and frequency resource elements comprising symbols and subcarriers, for each spatial layer, configuring the corresponding resource elements by: designating a first group of resource elements as common resources that carry signal transmissions from a first group of user devices according to a first radio technology; designating a second group of resource elements as common resources that carry signal transmissions from a second group of user devices according to a second radio technology; designating a third group of resource elements as device-specific resources that carry device-specific signal transmissions from user devices in the first group of user devices; designating a fourth group of resource elements as device-specific resources that carry device-specific signal transmissions from user devices in the second group of users; and providing simultaneous uplink connectivity to the first group of user devices and the second group of user devices based on use of reception resources from the one or more spatial layers, such that the reception resources from the one or more spatial layers are orthogonal in a space dimension.

In another example aspect, another wireless communication method is disclosed. The method includes configuring a base station of a fifth generation new radio (5G NR) radio technology cell to perform transmissions in a network according to a set of compatibility rules that allow a backward compatible operation of the base station with a 4th generation Long Term Evolution (4G LTE) radio technology; and performing transmissions or receptions in the 5G NR cell according to the configuring such that the backward compatible operation is achieved based on orthogonality in a spatial domain between transmissions or receptions in the 5G NR cell and the 4G LTE radio technology.

In another example aspect, another wireless communication method is disclosed. The method includes operating a base station using multiple spatial beams to provide simultaneous wireless services to user devices implementing multiple radio technologies, wherein communication resources between the base station and the user devices are arranged as repetitive subframes of resource elements, wherein each resource element comprises a unit of time resource and a unit of frequency resource; wherein a first portion of each subframe is designated for carrying device-specific signals; wherein resource elements in the first portion of each subframe designated for carrying device-specific signals are configured to use spatial multiplexing over the multiple spatial beams to provide wireless service to user devices implementing multiple radio technologies.

In another example aspect, another wireless communication method is disclosed. The method includes configuring a base station implementing a Long Term Evolution (LTE) radio technology to provide cellular coverage to user device without using a multimedia broadcast single frequency network (MBSFN) feature; configuring the base station to perform downlink common control channel transmissions using N symbols, wherein N=2 or 3; and performing transmissions or receptions in remaining symbols of a subframe such that a compatible operation is achieved based on orthogonality in a spatial domain between the LTE radio technology and a fifth generation new radio (5G NR) cell.

In another example aspect, a wireless communication system that implements the above-described methods is disclosed. The wireless communication system includes a base station (network-side device) and one or more user devices (field-deployed devices).

In yet another example aspect, a wireless system in which one or more of the above described methods are implemented is disclosed.

In yet another example aspect, the method may be embodied as processor-executable code and may be stored on a computer-readable program medium.

These, and other, features are described in this document.

BRIEF DESCRIPTION OF THE DRAWINGS

Drawings described herein are used to provide a further understanding and constitute a part of this application. Example embodiments and illustrations thereof are used to explain the technology rather than limiting its scope.

FIG. 10A shows a subframe where symbol #1 is being used for 4G LTE PDCCH, and FIG. 10B shows a subframe where symbol #1 is being used for 5G NR PDCCH.

FIG. 14 is a tabular representation of an example of sharing downlink physical channels.

DETAILED DESCRIPTION

Figure 1A:
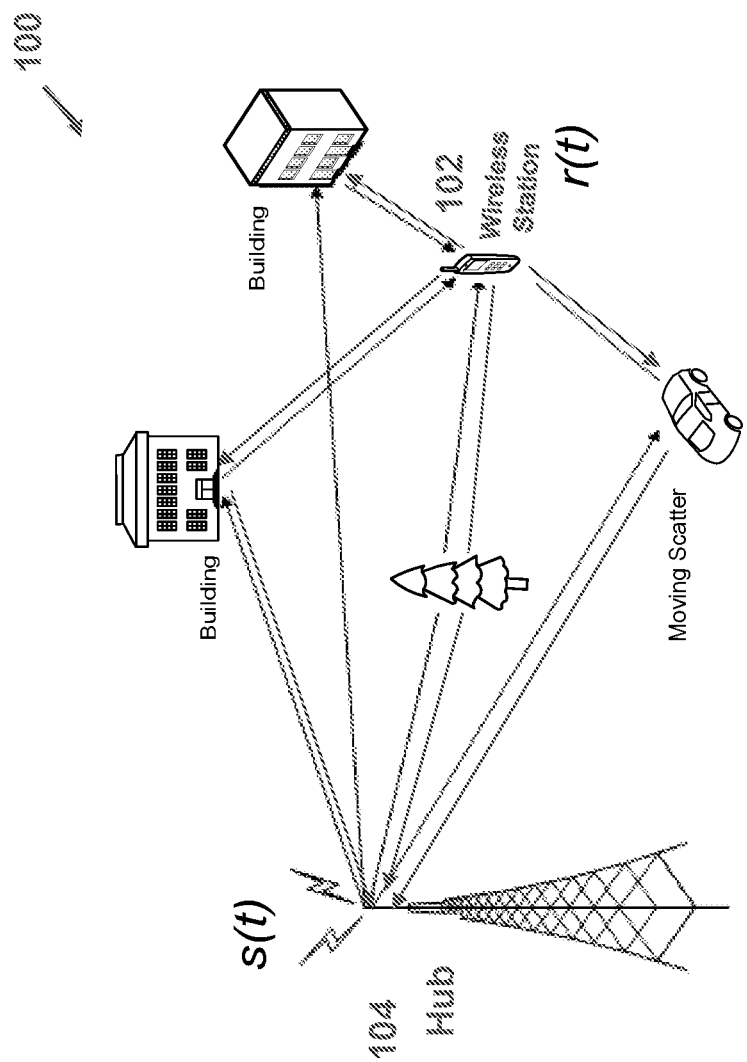
FIG. 1A shows an example wireless communication network.

Section headings are used in the present document only to improve readability and do not limit scope of technologies described in each section only to that section.

The spectrum, over different frequency bands, is a valuable resource used by different radio technologies. Typically, a new radio technology is deployed over frequency bands that were previously unused or taken by obsolete technologies. However, with the introduction of a new radio technology, previous radio technologies cannot always be immediately shut down and replaced with the new one, as there are many devices that are still working with the previous radio technologies and cannot be upgraded. Therefore, new radio technologies are often deployed over new frequency bands, which is a costly solution to the operators of these technologies.

To overcome this problem, operators may deploy a new radio technology over a frequency band that is already allocated to an existing radio technology, and this frequency band is expected to support both radio technologies. This concept if called "Coexistence", where two or more radio technologies are sharing the same resources (typically a frequency band).

This approach offers a smoother migration for the new technology, as the number of new devices, supporting it grows.

Examples of coexistence of different radio technologies are 3rd Generation Partnership Project's Long Term Evolution specification (3GPP 4G LTE) with 3GPP 5G NR (New Radio) over existing 4G LTE frequency bands and 3GPP 5G NR with Wi-Fi over unlicensed spectrum.

The main problem of deploying coexistence, is how to support the existing radio technology as is, without modifications (assuming legacy devices cannot be upgraded) while ensuring that the new radio technology (e.g., support for improved channel estimation that relies on channel reciprocity, support for multi-user multi-input multi-output MU-MIMO, etc.) does not collide with the existing one.

Current solutions for coexistence offer to multiplex the different radio technologies over different time and frequency resources. Typically, these solutions degrade the performance of the coexisting radio technologies, comparing to their stand-alone versions. Some of these solutions do not have a flexible approach to support the dynamic traffic loads of the coexisting technologies and are implemented as a semi-static split in time and/or frequency between the different radio technologies.

In this patent document, we describe a novel general approach for coexistence of multiple radio technologies using spatial multiplexing and a specific use case of coexistence of 3GPP 4G LTE with 3GPP 5G NR (as described in Section 1 below). This approach improves the performance of the coexisting radio technologies, compared to current solutions, and enables a flexible and dynamic allocation of resources to accommodate the traffic loads of the different radio technologies.

1 Spatial Multiplexing of Different Radio Technologies

The spatial multiplexing of different radio technologies, as described in this patent document, leverages techniques for channel prediction (as described in Section 2), reciprocal geometric precoding (as described in Section 3), precoding or postcoding techniques based on signals received from user devices (as described in Section 4), and providing multi-layer, multi-beam wireless connectivity to multiple user devices (as described in Section 5).

Embodiments of the disclosed technology may be implemented in a wireless communication system as shown in FIG. 1A. As shown therein, the wireless communication system 100 in which a transmitter device 102 transmits signals to a receiver 104. The signals may undergo various wireless channels and multipaths, as depicted. Some reflectors such as buildings and trees may be static, while others such as cars, may be moving scatterers. The transmitter device 102 may be, for example, a user device, a mobile phone, a tablet, a computer, or another Internet of Things (IoT) device such as a smartwatch, a camera, and so on. The receiver device 104 may be a network device such as the base station. The signals transmitted from the base station to the transmitter 102 may experience similar channel degradations produced by static or moving scatterers. The techniques described in the present document may be implemented by the devices in the wireless communication system 100. The terms "transmitter" and "receiver" are simply used for convenience of explanation and, as further described herein, depending on the direction of transmission (uplink or downlink), the network station may be transmitting or receiving and user device may be receiving or transmitting.

Figure 1B:
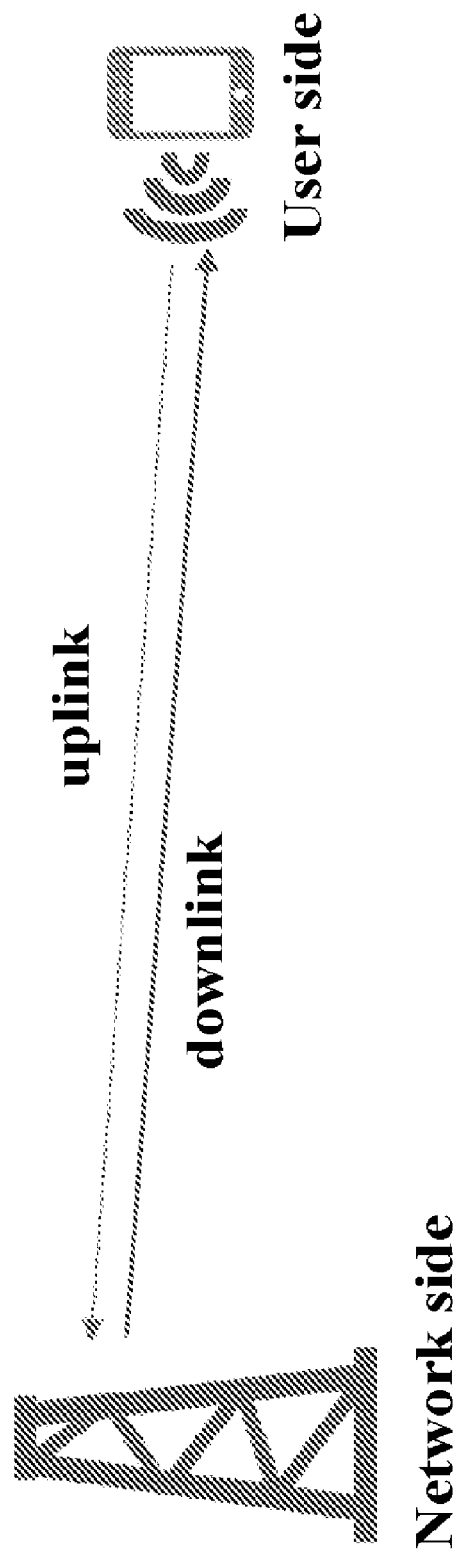
FIG. 1B shows a simplified example of a wireless communication system in which uplink and downlink transmissions are performed.

FIG. 1B shows a simplified wireless network to highlight certain aspects of the disclosed technology. A transmitter transmits wireless signals to a receiver in the wireless network. Some transmissions in the network, variously called as downlink or downstream transmissions, a network-side node such as a base station acts as a transmitter of wireless signals and one or more user devices act as the receiver of these wireless signals. For some other transmissions, as depicted in FIG. 1B, the direction of transmission may reversed. Such transmissions are often called uplink or upstream transmissions. For such transmissions, one or more user devices act as transmitters of the wireless signals and a network-side node such as the base station acts as the receiver of these signals (as depicted in FIG. 1B). Other type of transmissions in the network may include device-to-device transmissions, sometimes called direct or sideband transmissions. While the present document primarily uses the terms "downlink" and "uplink" for the sake of convenience, similar techniques may also be used for other situations in which transmissions in two directions are performed—e.g., inbound or incoming transmissions that are received by a wireless device and outbound or outgoing transmissions that are transmitted by a wireless device. For example, downlink transmissions may be inbound transmissions for a user device, while outbound transmissions for a network device. Similarly, uplink transmission may be inbound transmissions for a network device while outbound transmissions from a wireless device. Therefore, for some embodiments, the disclosed techniques may also be described using terms such as "inbound" and "outbound" transmission without importing any 3GPP-specific or other wireless protocol-specific meaning to the terms "uplink" and "downlink."

In frequency division multiplexing (FDM) networks, the transmissions to a base station and the transmissions from the base station may occupy different frequency bands (each of which may occupy continuous or discontinuous spectrum). In time division multiplexing (TDM) networks, the transmissions to a base station and the transmissions from the base station occupy a same frequency band but are separated in time domain using a TDM mechanism such as time slot-based transmissions. Other types of multiplexing are also possible (e.g., code division multiplexing, orthogonal time frequency space, or OTFS, multiplexing, spatial multiplexing, etc.). In general, the various multiplexing schemes can be combined with each other. For example, in spatially multiplexed systems, transmissions to and from two different user devices may be isolated from each other using directional or orientational differences between the two end points (e.g., user devices and a network station such as a base station).

1.1 Coexistence with Spatial Multiplexing

This novel approach is based on dynamic spatial multiplexing of multi-users on orthogonal beams, where on each beam, on any time and frequency resources, any radio technology may be transmitted. The beams are created in such a way that the cross-beam interference is minimized, as further described in Section 5. The beams may be created from multiple antenna elements that are spatially separated (e.g., an antenna array) or from any other type of antenna (such as a Luneburg lens). This technique is applicable for both downlink and uplink transmissions.

Figure 2:
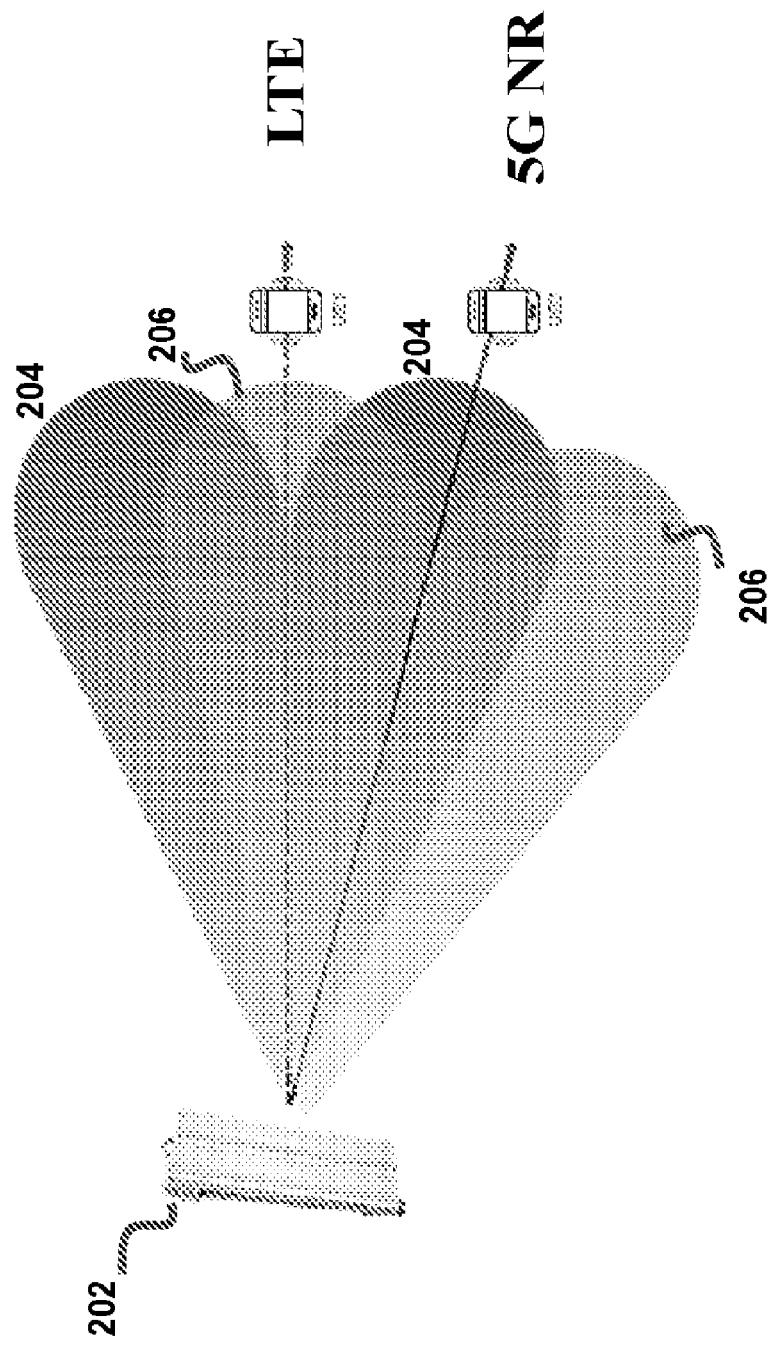
FIG. 2 shows an example of spatial multiplexing of 4G LTE and 5G NR. The two user-equipment (UE) devices are receiving at the same time and on the same frequency band different waveforms with different radio technologies.

FIG. 2 shows an example of spatial multiplexing of two radio technologies—4G LTE and NR. The two antennas (202) are creating two orthogonal beams—a red beam (204) with a NR waveform on it, and a blue beam (206) with a 4G LTE waveform on it. UE1 in this example, can receive 4G LTE and the blue beam is targeted towards it, while the red beam has a minimum energy on its direction. UE2 in this example, can receive 5G NR and the red beam is targeted towards it, while the blue beam has a minimum energy on its direction. These two waveforms with two different radio technologies coexist on the same time and frequency resources, separated only spatially.

Each radio technology may have in each transmission interval common resources and user-specific resources. Common resources are typically not targeted for a specific device and therefore may be transmitted in a way that will be received by most of the devices in the transmission sector (denoted as unprecoded transmission). Examples of such signals are reference signals (4G LTE channel reference signal CRS), synchronization signals (4G LTE/5G NR primary synchronization signal PSS & secondary synchronization signal SSS) and broadcast channels (4G LTE/5G NR physical broadcast channel PBCH). In some cases, common resources may be targeted for a specific device, when the channel attributes of this device are still unknown (for example, during initial access).

User-specific resources are targeted for a specific device and therefore precoded on a beam, which is orthogonal to the other beams. Examples of precoding schemes are described in Sections 3 and 4. Examples of user-specific resources are downlink data channels (4G LTE/5G NR physical downlink shared channel PDSCH) and downlink control channels (5G NR physical downlink control channel PDCCH over USS).

For spatial multiplexing of different radio technologies, common resources should be kept unprecoded and orthogonal to any other transmitted signal. This ensures that these signals are received from the transmitter without interference or adverse impact. In some examples, user-specific resources may be transmitted simultaneously on multiple orthogonal beams. In other examples, overlaying transmissions of multiple user-specific data streams on the same frequency and time resources is enabled by multiple antennas at the base-station and the usage of the spatial domain, wherein a different spatial precoder is applied to each data stream targeting a specific user device (as further described in Section 4).

In FIGS. 3 to 11J, various examples of configuration of resource elements are depicted in which the horizontal axis represents time divided in units of time and vertical axis represents frequency in units of subcarriers. The time axis units may be, for example symbols of orthogonal frequency division multiplexing (OFDM) symbols.

Figure 3:
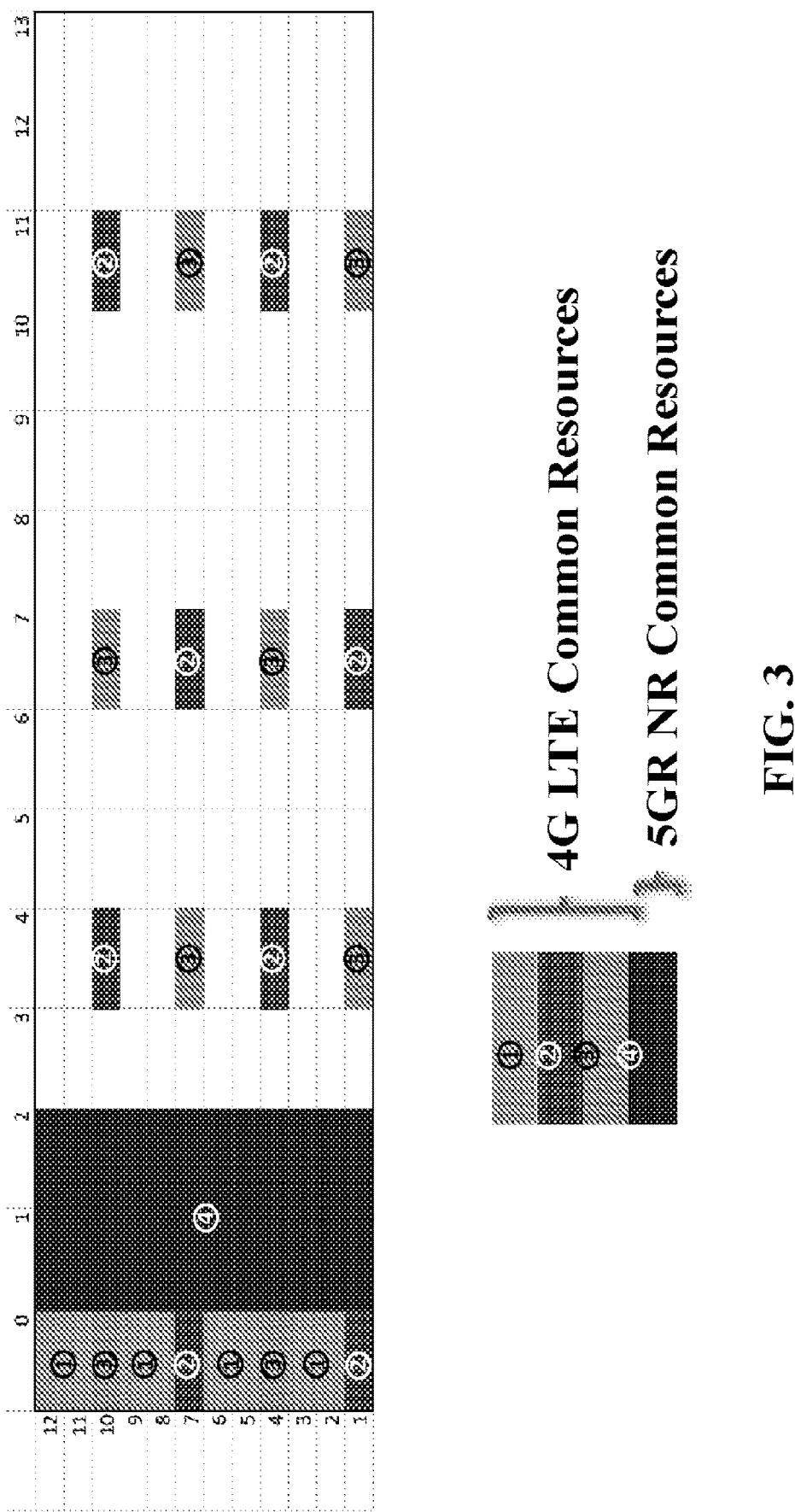
FIG. 3 shows a common resources example in a physical resource block, PRB, time-frequency grid, with 3 common symbols.
Figure 4:
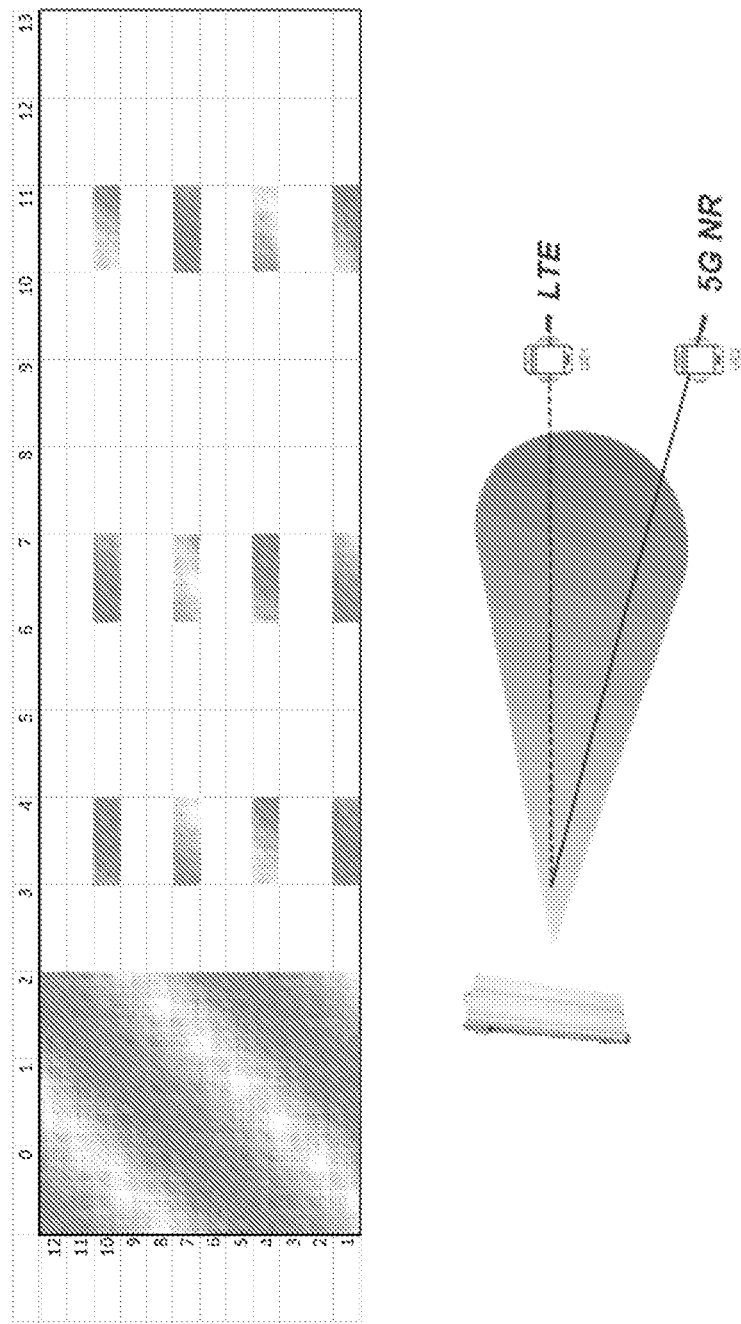
FIG. 4 shows an example of common resources (gray) and User-specific resources (white) example in a PRB time-frequency grid with 3 common symbols. The common resources are transmitted in a beam targeting all the users.
Figure 5:
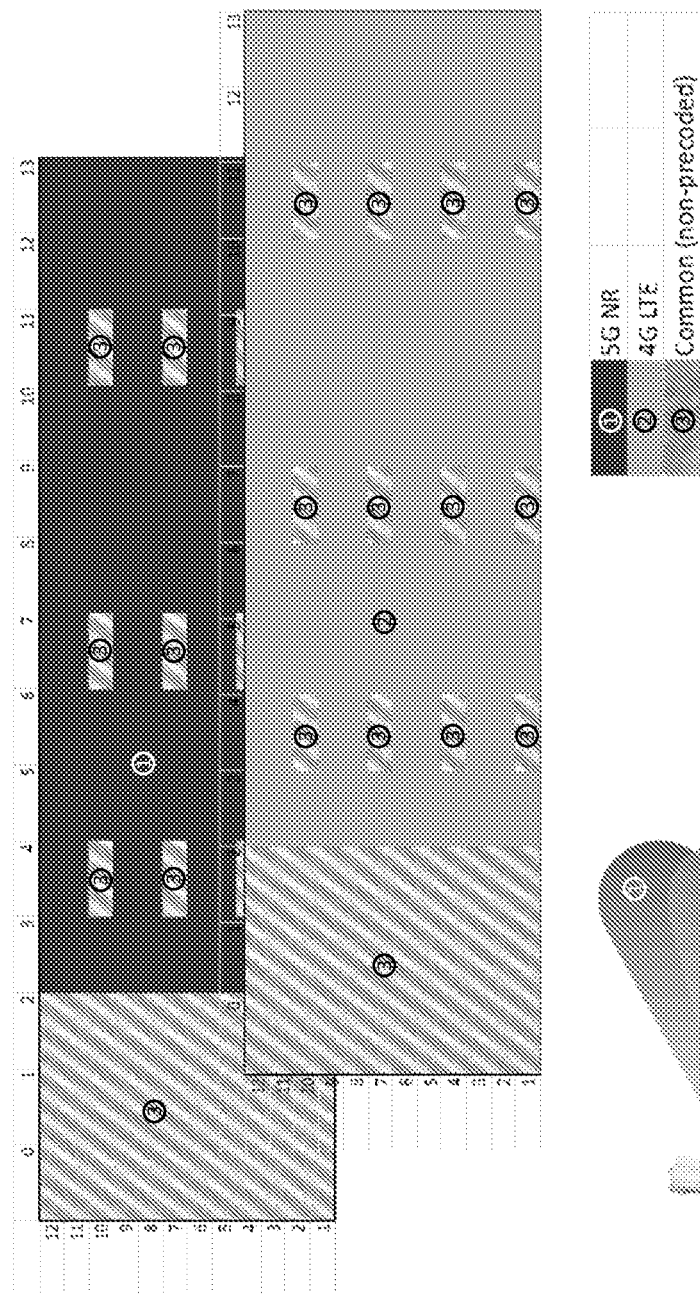
FIG. 5 shows an example of user-specific data on two time-frequency grids for spatial multiplexing over two beams, with 3 common symbols. Note that the like-shaded resource elements in these grids are the same and are transmitted on a single beam.

FIG. 3 shows an example of common resources in a time-frequency grid of 12 subcarriers and 14 OFDM symbols (also known in 4G LTE as a PRB=Physical Resource Block). For 5G NR with 15 kHz subcarrier spacing, the same grid can be used. The first symbol (#0) is allocated with common resources for 4G LTE, the second and third symbols (#1, #2) are allocated with common resources for 5G NR and symbols #4, #7 and #11 have some common resources in them for 4G LTE. Note, that there is no common resource on the time-frequency grid, which has more than one radio technology assigned to it and therefore, all these common resources are transmitted unprecoded. The remaining resources, indicated by white elements in FIG. 4, are available for spatial multiplexing of user-specific data on different waveforms, as also shown in FIG. 5.

Figure 6:
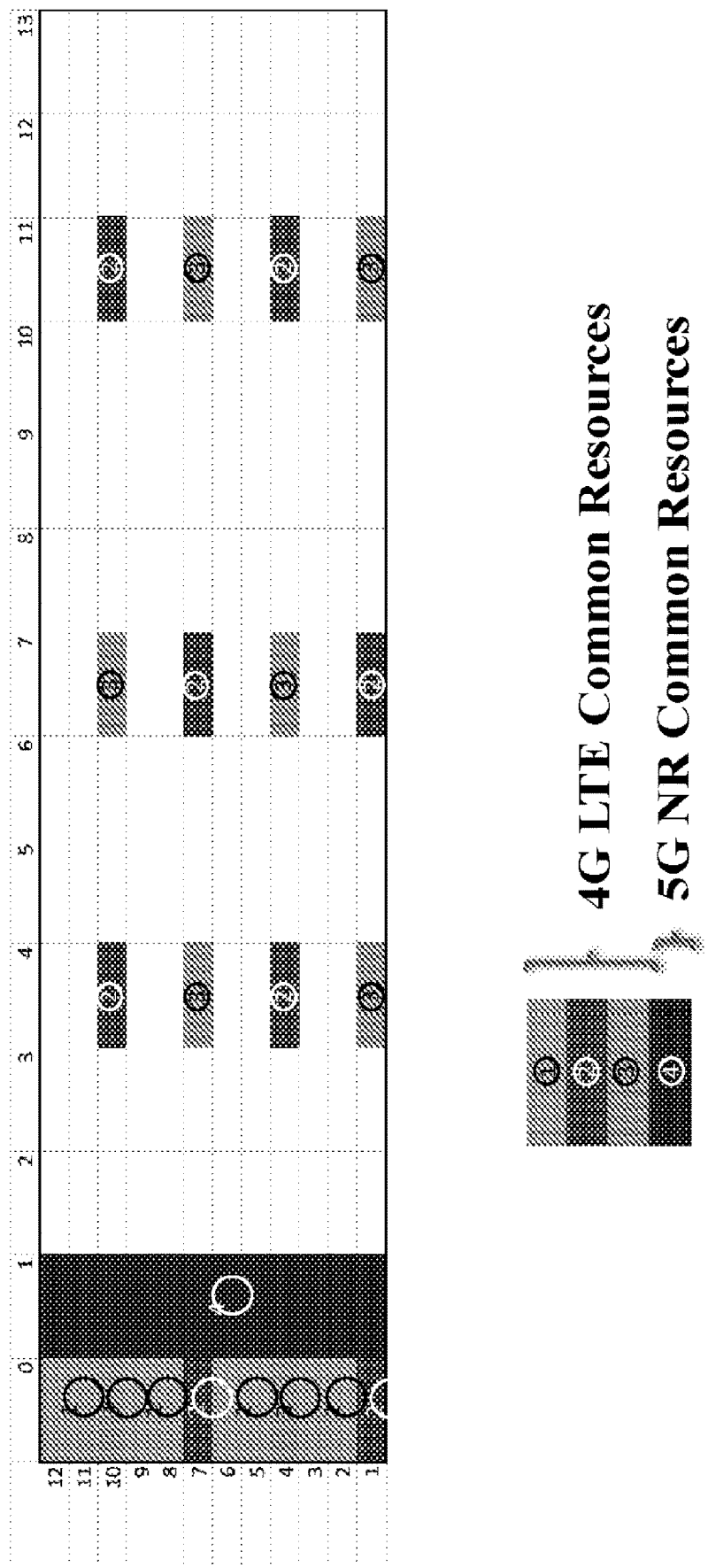
FIG. 6 depicts a common resources example in a PRB time-frequency grid, with 2 common symbols.
Figure 7:
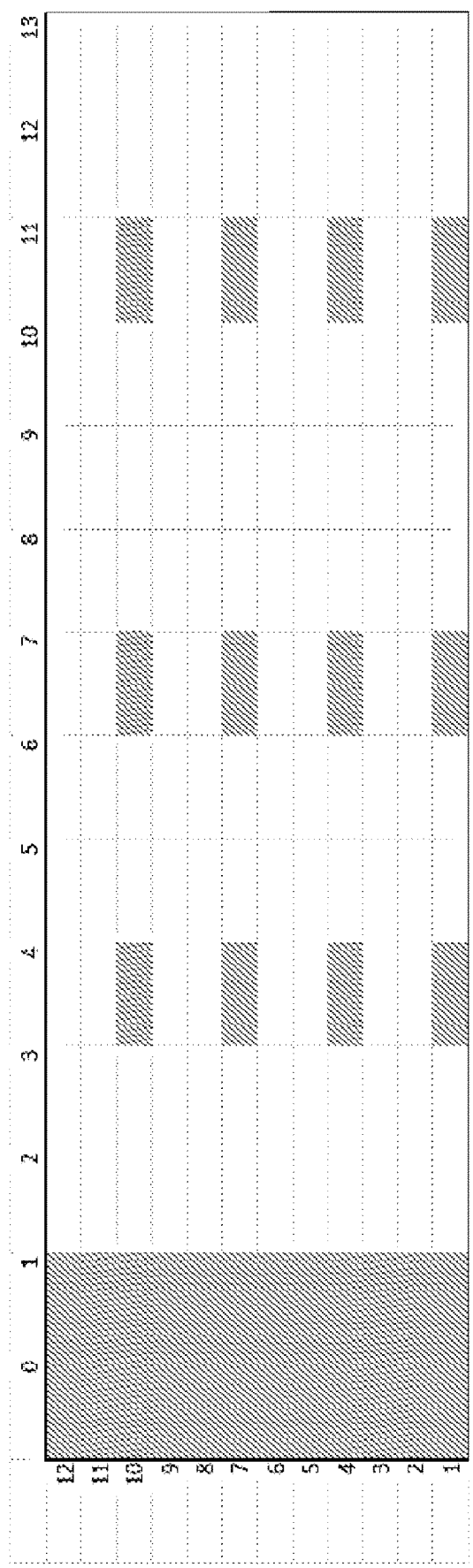
FIG. 7 shows a common resources (gray) and User-specific resources (white) example in a PRB time-frequency grid, with 2 common symbols. The common resources are transmitted in a beam targeting all the users.
Figure 7:
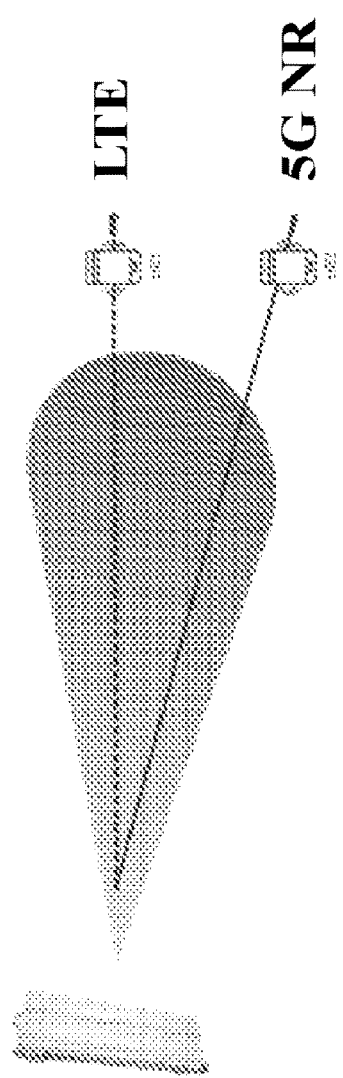
Figure 8:
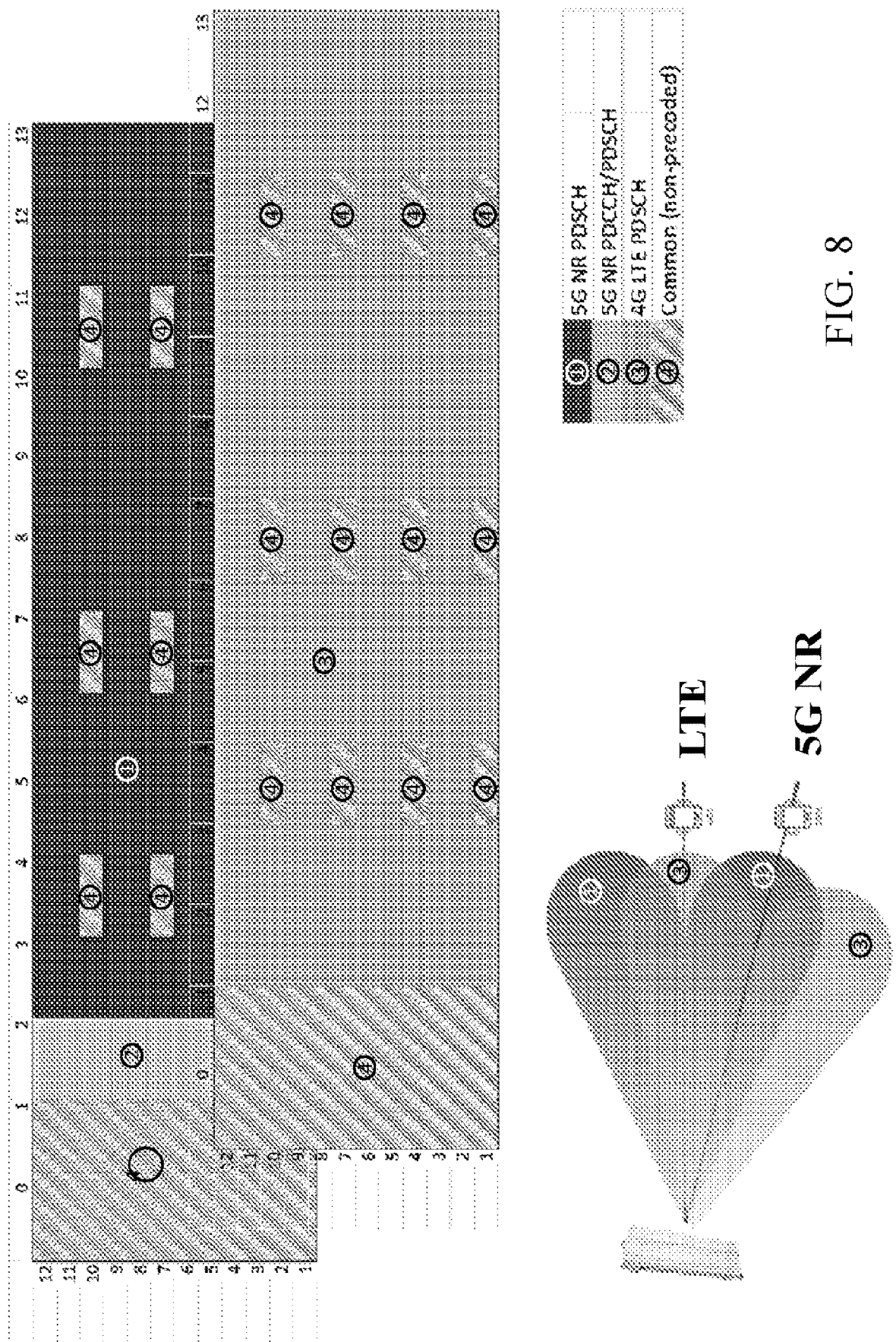
FIG. 8 shows a User-specific data on two time-frequency grids for spatial multiplexing over two beams, with 2 common symbols. Note, that the gray elements in these grids are the same and are transmitted on a single beam.

Another example with a slightly different configuration of only two common symbols at the beginning of the subframe is shown in FIG. 6, FIG. 7 and FIG. 8. The third symbol is spatially multiplexed and may be used for transmitting precoded 4G LTE data (PDSCH) and/or precoded 5G NR control or data (PDCCH or PDSCH).

1.2 Different Allocations within a Subframe

Figure 9A:
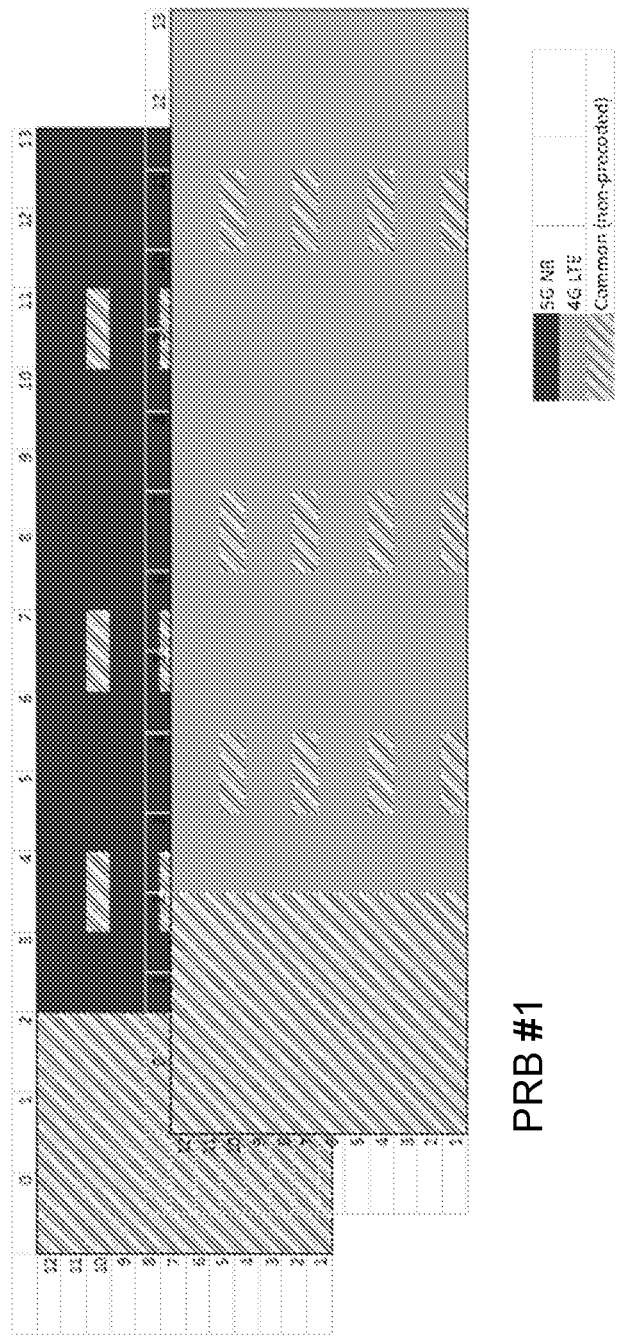
FIGS. 9A-9C are examples of different allocations for spatial multiplexing.
Figure 9B:
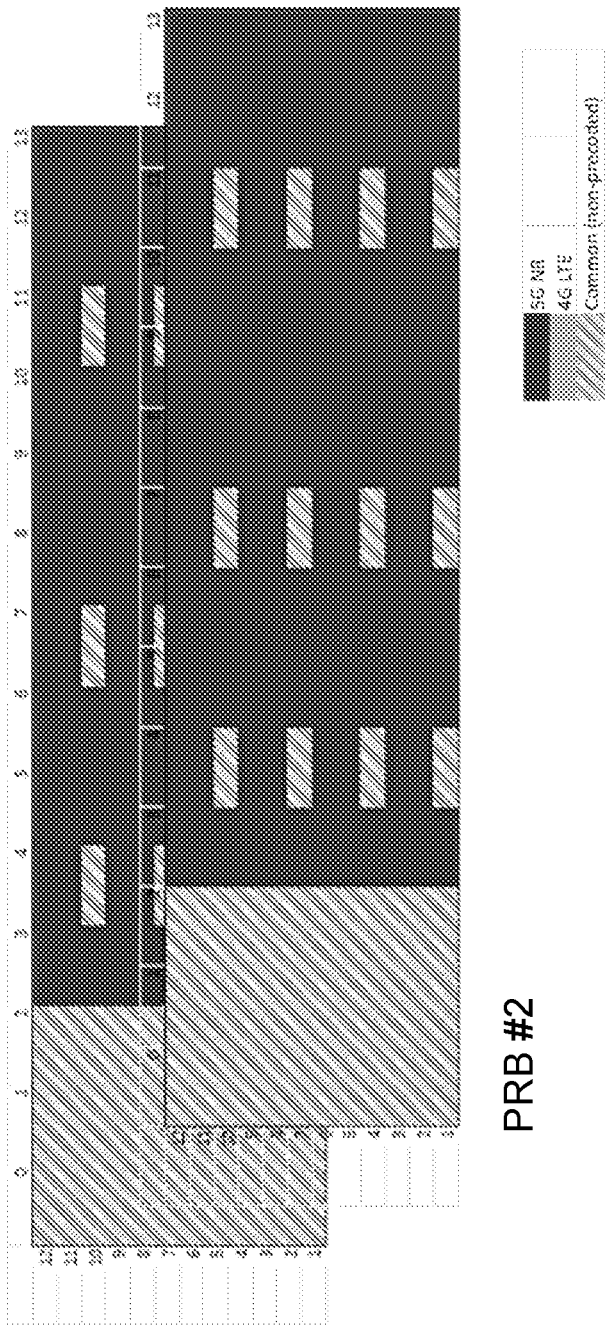
Figure 9C:
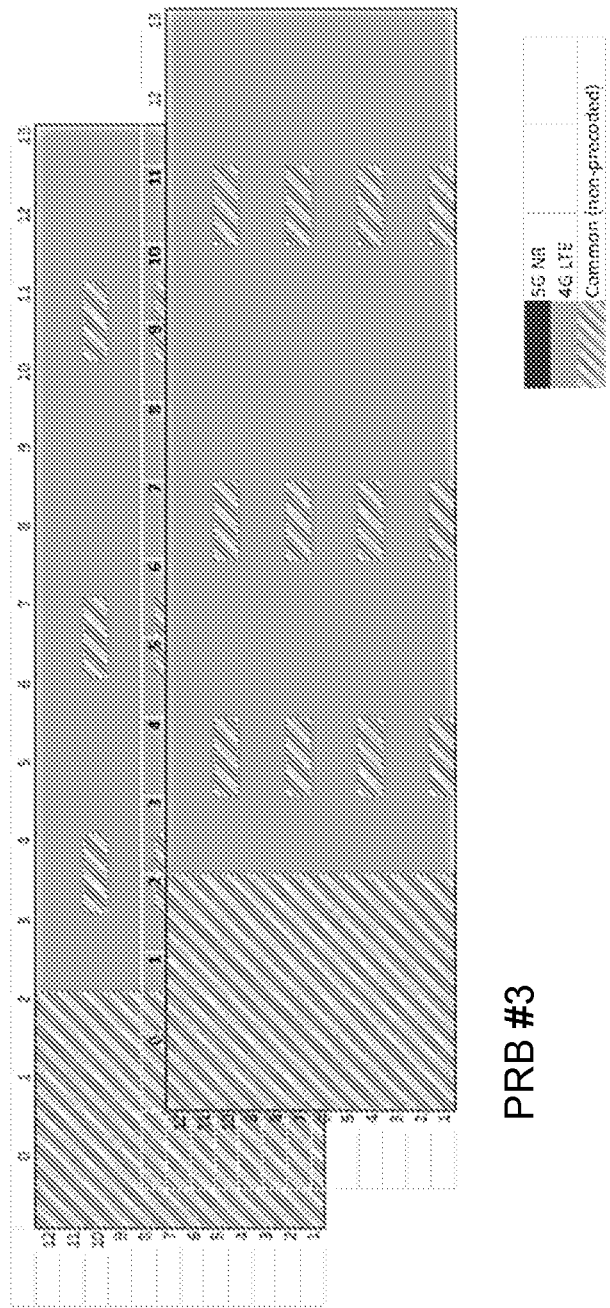

Spatial multiplexing is applied on a resource element (RE) level and each RE in the time-frequency grid may have a different spatial multiplexing and a different set of beams transmitted from the antennas. The ability to spatially multiplex different radio technologies, does not imply that on any resource element, the same radio technology cannot be transmitted over one or more beams to one or more devices. Some resource elements may spatially multiplex different radio technologies and some may spatially multiplex the same radio technologies. FIGS. 9A-9B show such an example for a subframe with 3 PRBs. The first PRB (#1) is spatially multiplexing transmissions to two user devices, one is a 4G LTE device and the other is a 5G NR device (as shown in FIG. 9A), the second PRB (#2) is spatially multiplexing transmissions to two user devices, both are 5G NR devices (as shown in FIG. 9B) and the third PRB (#3) is spatially multiplexing transmissions to two user devices, both are 4G LTE (as shown in FIG. 9C).

1.3 Sharing Common Resources Between Different Radio Resources

Figure 10A:
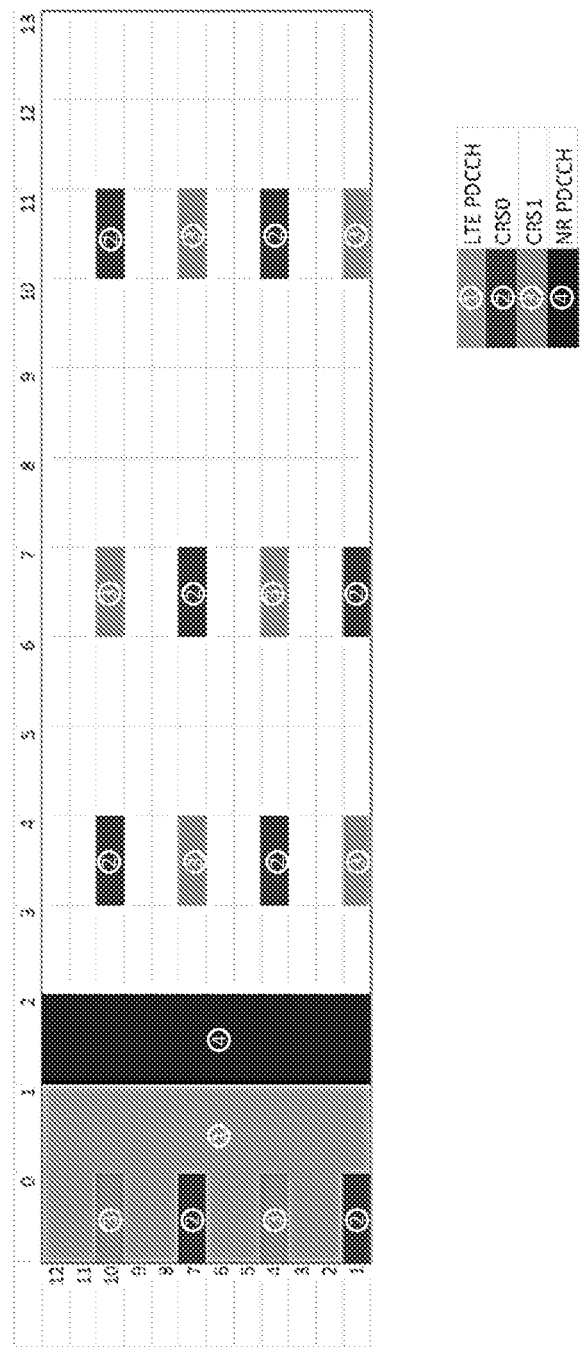
FIGS. 10A and 10B depict a common resource sharing example.
Figure 10B:
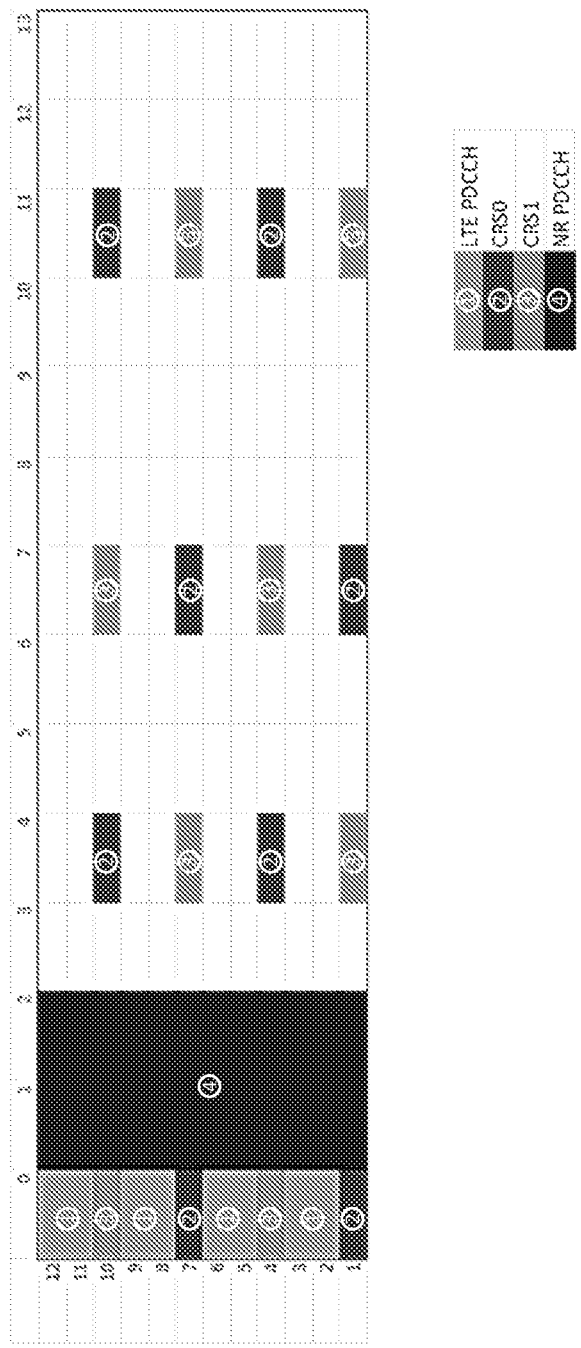

Although common resources are not spatially multiplexed, it is possible to configure some of the common resources, for multiple radio technologies. For example, configuring some resources on the same symbol for the downlink control channel (PDCCH) of both 4G LTE and 5G NR. User devices of both radio technologies will search this symbol for messages targeted to them. However, in each subframe, a control channel of only one radio technology will be allocated to these resources. FIGS. 10A and 10B illustrate such an example, where symbol #1 is a shared common resource. In some subframes, where there is more 4G LTE traffic, two symbols can be used for 4G LTE PDCCH and one symbol for 5G NR PDDCH, as shown in FIG. 10A. In other subframes, where there is more 5G NR traffic, two symbols can be used for 5G NR PDCCH and one symbol for 4G LTE PDDCH, as shown in FIG. 10B. In any case, all user devices of both radio technologies, are configured to receive the PDCCH over two symbols. When they search a symbol of a different radio technology, they will not detect any valid message targeted to them.

1.4 Configuration of 4G LTE and 5G NR for Spatial Multiplexing

As discussed in previous section, when coexisting multiple radio technologies, we must ensure that common resources do not collide with any other resources (common or user-specific). Both 4G LTE and 5G NR has some flexibility to configure their system in different ways. This section describes two specific sets of configurations that ensures this for the coexistence of 4G LTE and 5G NR. Other configuration sets may also be valid.

1.5 Configuration A: Three Common Symbols 1.5.1 4G LTE:
1. Configure LTE without MBSFN (Multimedia Broadcast Single Frequency Network) subframes.
2. Configure the downlink control channel (PDCCH) over three symbols. Transmit PDCCH over symbol #0 and optionally on any of the symbols #1-#2.
3. Transmit PDSCH over symbols #3-#13.

1.5.2 5G NR:
1. Configure the first slot in the frame (which has the Synchronization Signal Block=SSB) to be aligned with an 4G LTE subframe, which is not #0 or #5.
2. Configure SSB subcarrier spacing of 30 kHz and use SSB index #2.
3. Configure both cell and user-devices for rate-matching LTE CRS.
4. Configure subcarrier spacing of 15 kHz
5. Define CORESETs for downlink control channel (PDCCH) with CSS (Common Search Space) over any of the symbol #1-#2 and USS (UE-specific Search Space) on any of the symbols #1-#3. Define CORESET 0 over symbol #1 or #2.
6. Transmit PDSCH on symbols #3-13 or #4-13.
7. Configure DMRS on symbols #3 and #12
8. Configure uplink grid alignment of 7.5 kHz.
9. Configure SRS on the last symbol of the slot.

1.6 Configuration B: Two Common Symbols 1.6.1 4G LTE:
1. Configure LTE without MBSFN (Multimedia Broadcast Single Frequency Network) subframes.
2. Configure the downlink control channel (PDCCH) over two symbols. Transmit PDCCH over symbol #0 and optionally on symbol #1.
3. Transmit PDSCH over symbols #2-#13.

1.6.2 5G NR:
1. Configure the first slot in the frame (which has the Synchronization Signal Block=SSB) to be aligned with an 4G LTE subframe, which is not #0 or #5.
2. Configure SSB subcarrier spacing of 30 kHz and use SSB index #2.
3. Configure both cell and user-devices for rate-matching LTE CRS.
4. Configure subcarrier spacing of 15 kHz
5. Define CORESETs for downlink control channel (PDCCH) with CSS (Common Search Space) over symbol #1 and USS (UE-specific Search Space) on any of the symbols #1-#2. Define CORESET 0 over symbol #1.
6. Transmit PDSCH on symbols #2-13 or #3-13.
7. Configure DMRS on symbols #3 and #12
8. Configure uplink grid alignment of 7.5 kHz.
9. Configure SRS on the last symbol of the slot.

1.7 A Frame Example for 4G LTE/5G NR for Spatial Multiplexing Configuration

FIGS. 11A-11J show examples for one possible frame configuration, where common 4G LTE and 5G NR signals do not collide with other resources. These configuration examples have three common symbols. Each subframe is represented by a single PRB for simplicity. However, other PRBs in each subframe may have less signals than what is presented in the figures.

Figure 11A:
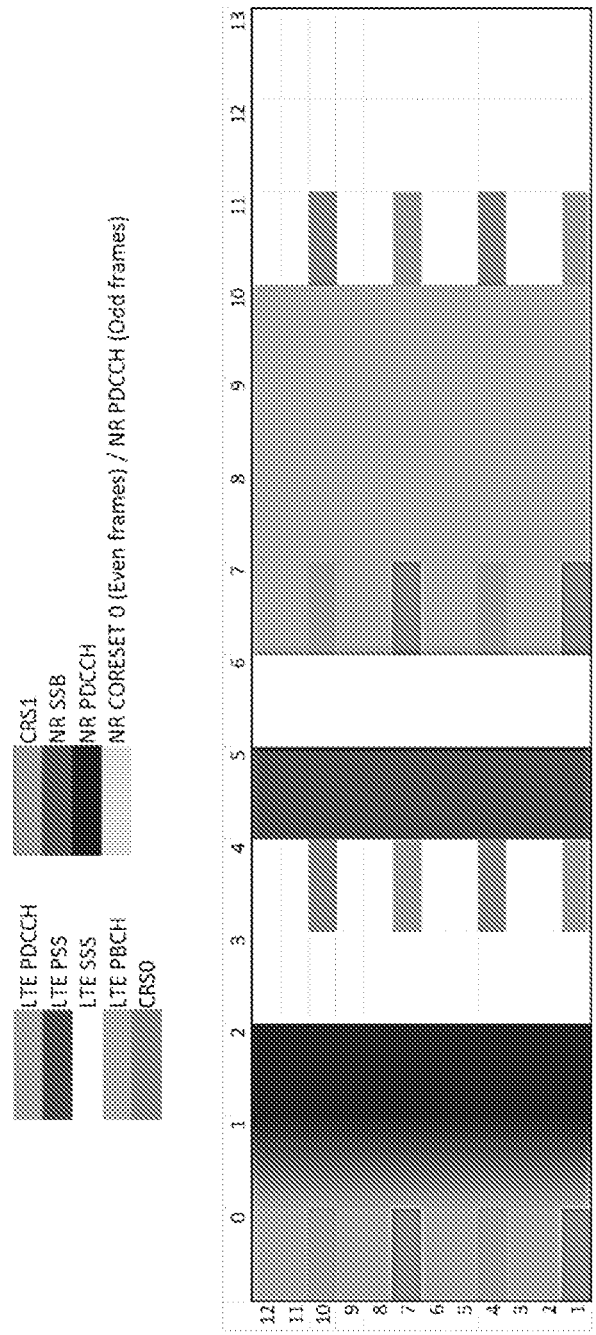
FIGS. 11A-11J show examples of coexistence configuration for 4G LTE and 5G NR. Each subframe/slot is represented with a single PRB for simplicity.

FIG. 11A shows the example of a 4G LTE Subframe #0/5G NR slot #9.

Figure 11B:
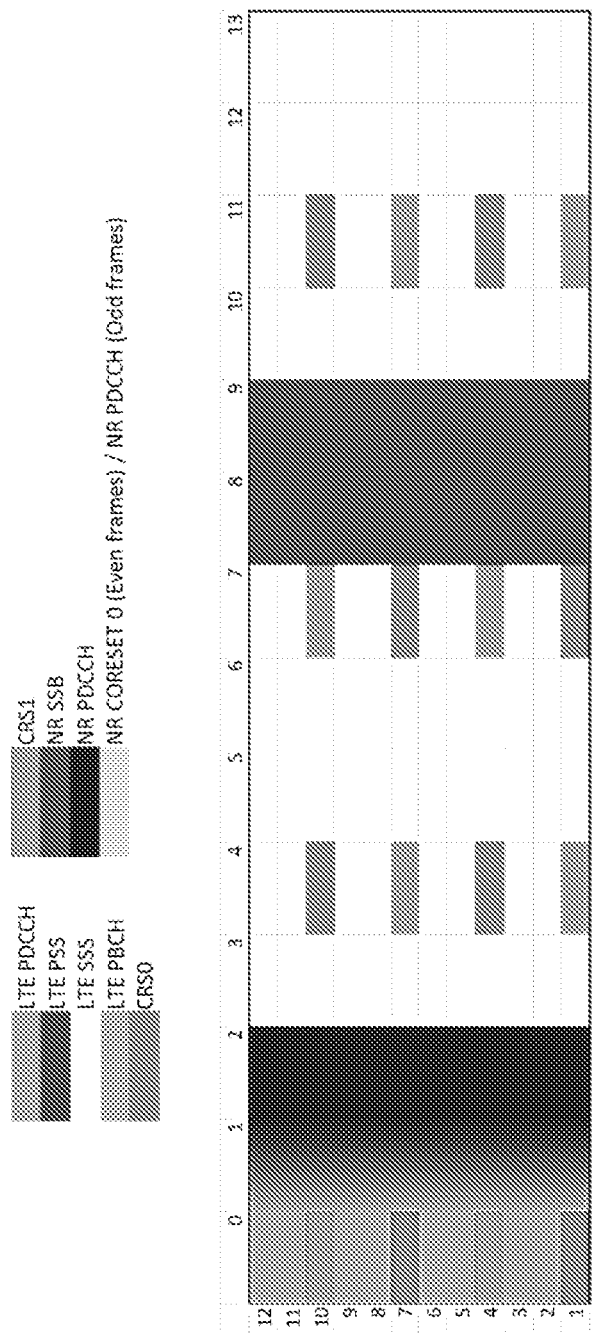

FIG. 11B shows the example of a 4G LTE Subframe #1/5G NR slot #0.

Figure 11C:
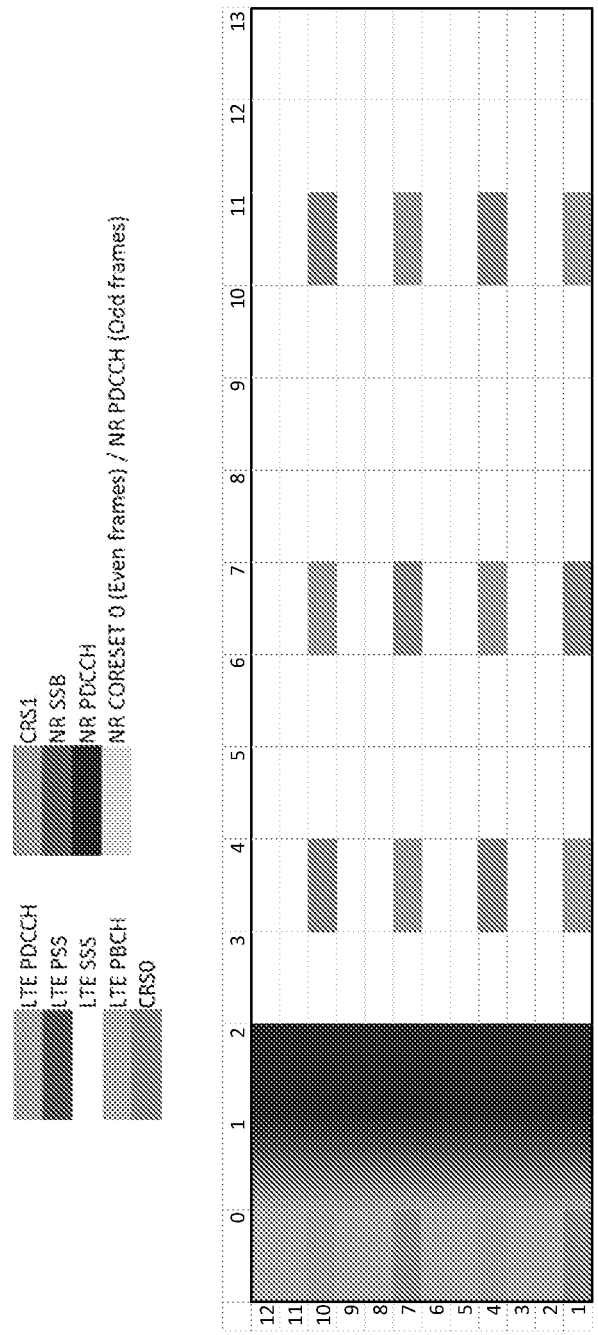

FIG. 11C shows the example of a 4G LTE Subframe #2/5G NR slot #1.

Figure 11D:
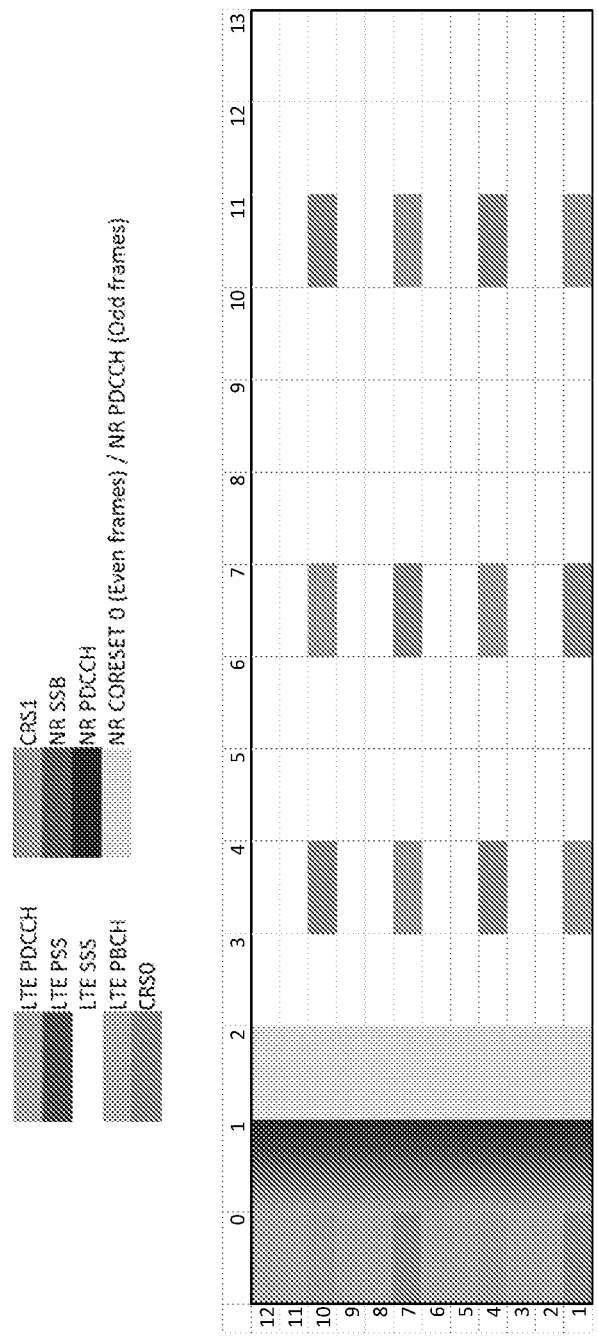

FIG. 11D shows the example of a 4G LTE Subframe #3/5G NR slot #2.

Figure 11E:
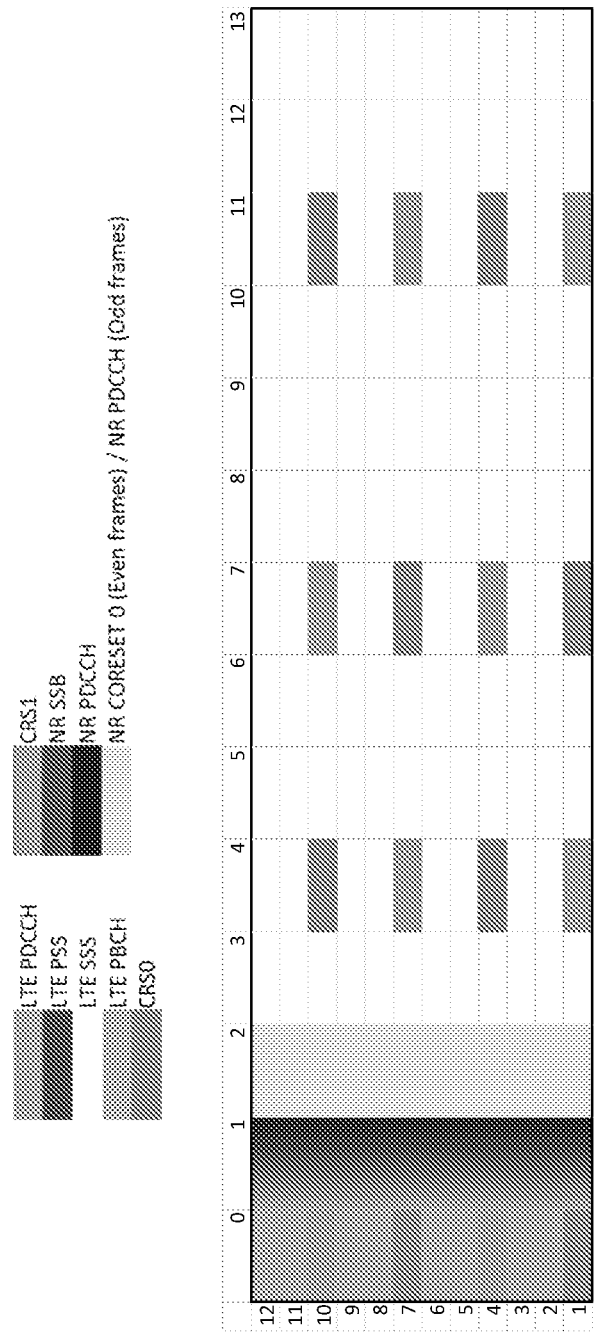

FIG. 11E shows the example of a 4G LTE Subframe #4/5G NR slot #3.

Figure 11F:
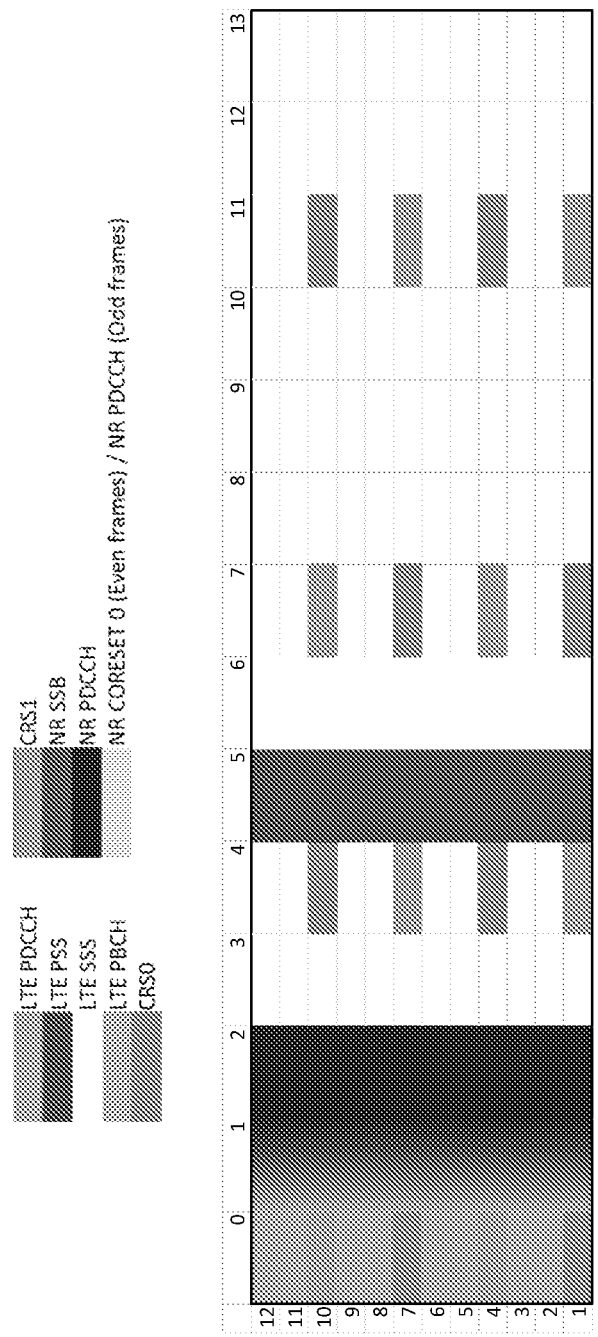

FIG. 11F shows the example of a 4G LTE Subframe #5/5G NR slot #4.

Figure 11G:
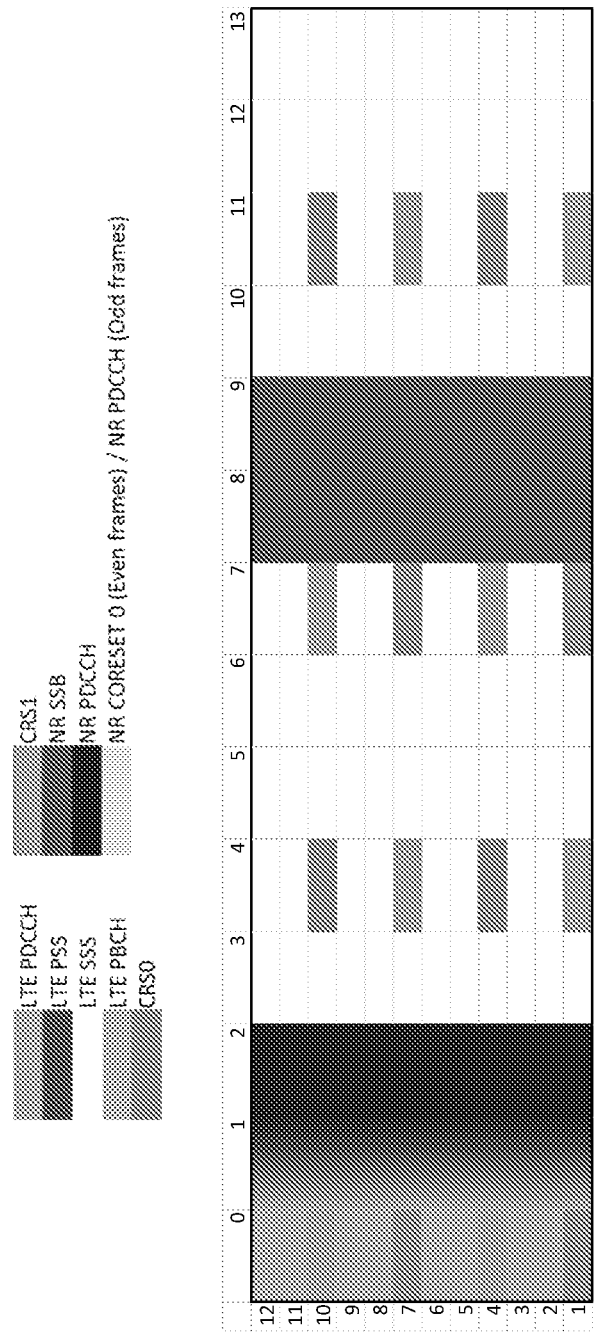

FIG. 11G shows the example of a 4G LTE Subframe #6/5G NR slot #5.

Figure 11H:
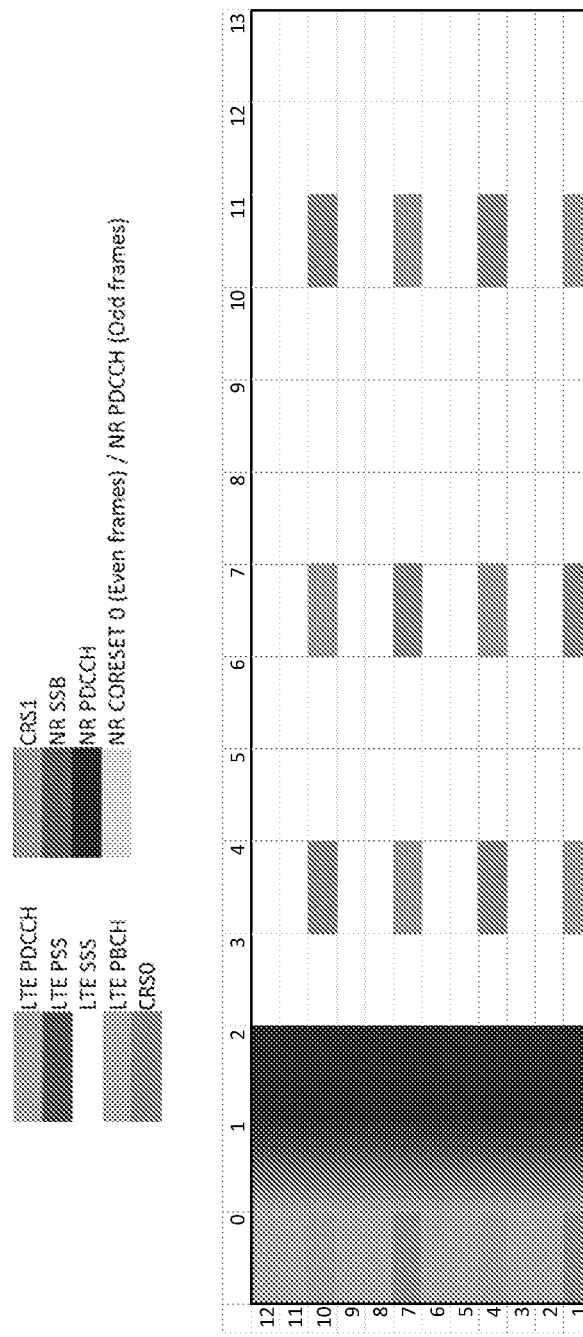

FIG. 11H shows the example of a 4G LTE Subframe #7/5G NR slot #6.

Figure 11I:
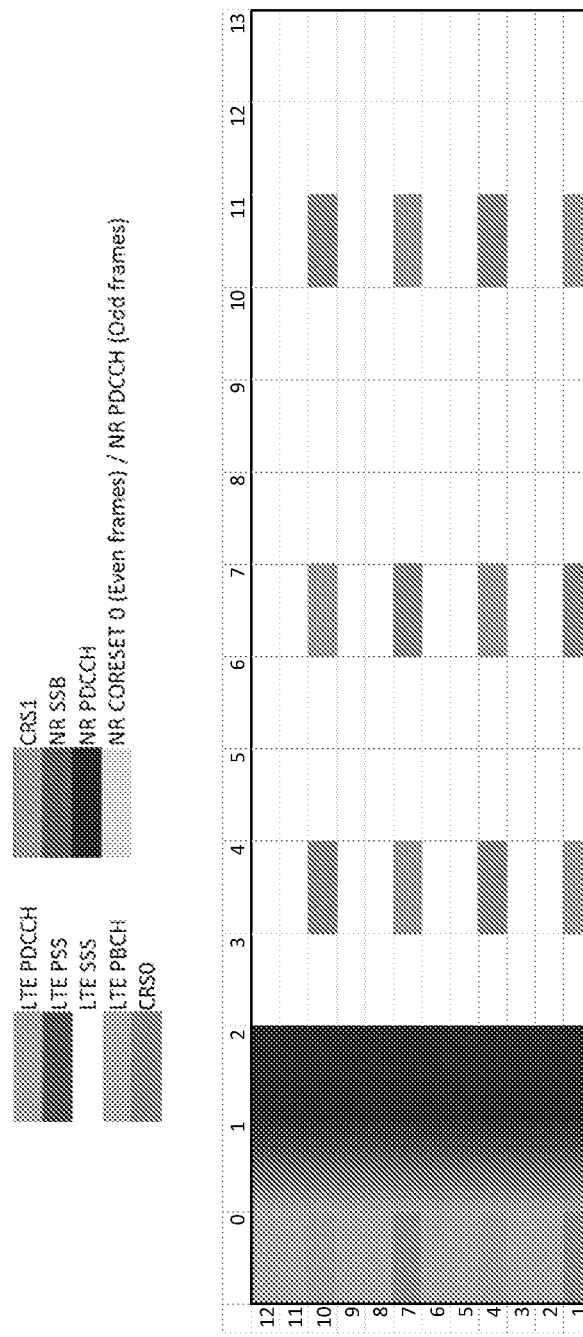

FIG. 11I shows the example of a 4G LTE Subframe #8/5G NR slot #7.

Figure 11J:
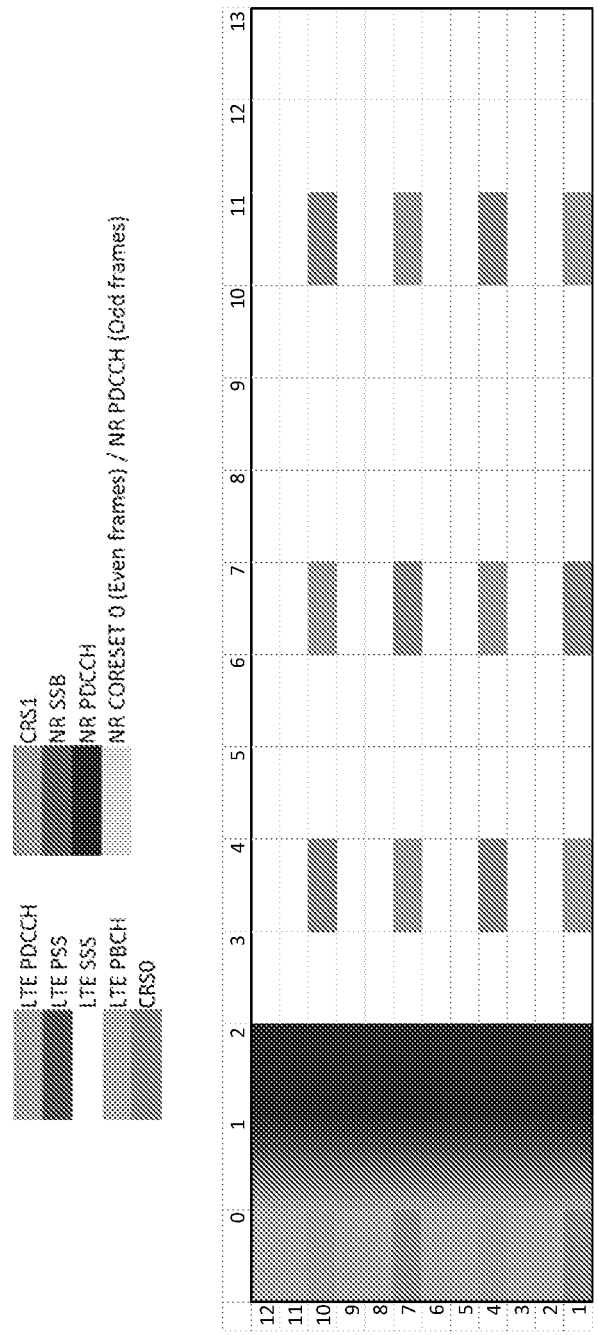

FIG. 11J shows the example of a 4G LTE Subframe #9/5G NR slot #8.

2 Channel Prediction in Wireless Systems

The techniques described in this section may be used for predicting the wireless channels in a Time Division Duplex (TDD) or a Frequency Division Duplex (FDD) system that supports the co-existence of different radio technologies. Such a system may include base stations (BS) and multiple user equipment (UE). This technique is suitable for both stationary and mobile UE. Generally, these techniques are used to compute a correct covariance matrix representing the wireless channels, based on a sparse multi-dimensional geometric model, from a relatively small number of observations (in frequency, time and space). From this covariance matrix, a prediction filter is computed and applied to some channel measurements, to predict the channels in some or all the frequency, space and time dimensions. The predicted channels for the UE, along with other predicted channels for other UE, may be used to generate a precoded downlink transmission from one BS to multiple UE (Multi-User MIMO or MU-MIMO), or from several BS to multiple UE (also known as CoMP—Coordinated Multi-Point or distributed MU-MIMO). It is noted that although most of the computational load, described in the following paragraphs, is attributed to the BS (or some other network-side processing unit), some of it may be performed, in alternative implementations, in the UE.

2.1 TDD Systems

In this scenario, the BS predicts the wireless channels from its antennas to the UE in a future time instance. This may be useful for generating a precoded downlink transmission. The UE may transmit at certain time instances reference signals to the BS, from which the BS will estimate the wireless channels response. Note, that typically, a small number of time instances should be sufficient, which makes it a method, suitable for mobile systems. Then, the estimated channel responses (whole or partial), are used with one of the described methods, to determine the covariance matrix of the channels and compute a prediction filter. This processing may take place in the base station itself, or at a remote or a network-side processing unit (also known as "cloud" processing). The prediction filter may be applied to some of the channel responses already received, or to some other estimated channel responses, to generate a prediction of the wireless channels, at a future time instance and over the desired frequency and space grids.

2.2 FDD Systems

In this scenario too, the BS predicts the wireless channels from its antennas to the UE in a future time instance. However, the UE to BS uplink transmissions and the BS to UE downlink transmissions are over different frequency bands. The generation of the of prediction filter is similar to TDD systems. The UE may transmit at certain time instances reference signals to the BS, from which the BS will estimate the wireless channels response. Then, the estimated channel responses (whole or partial), are used with one of the described methods, to determine the covariance matrix of the channels and compute a prediction filter. In parallel, at any time instance, the BS may transmit reference signals to the UE. The UE will feedback to the BS through its uplink, some the received reference signals (all or partial), as raw or processed information (implicit/explicit feedback). The BS will generate, if needed, an estimated channel response for the downlink channel, from the information received from the UE and apply the prediction filter to it. The result is a predicted channel at the downlink frequency band and at a future time instance.

2.3 Self-Prediction for Modulation and Coding Scheme (MCS) Estimation

In some embodiments, it is useful for the BS to know the quality of the prediction of the channels in order to determine correctly which MCS to use for its precoded transmission. The more accurate the channels are represented by the computed covariance matrix; the higher prediction quality is achieved, and the UE will have a higher received SNR.

One possible method for determining the correct MCS is to use self-prediction. The BS applies the prediction filter to some of the received estimated channel responses from the UE, predicting channels, which the BS also have other received estimated channel responses for. Then, the BS compares the predicted channels to the received estimated channels and computes the quality of the prediction, from which the MCS may be determined.

3 Reciprocal Geometric Coding

As shown in the example in FIG. 1A, a wireless channel is a super-position of reflections. A geometric precoder, which is typically supported by multiple radio technologies (e.g., LTE and 5G NR) is based on the geometry of these reflectors. This geometry tends to change relatively slow comparing to typical communication time scales. For example, considering the spatial domain, the Angle of Arrival (AoA) of the rays from the wireless reflectors (or directly from the UE) to the BS antennas, will be relatively constant in a time scale of tens of milliseconds and frequency independent. This is unlike the channel state, which is time and frequency dependent. The reciprocal property of the wireless channel allows us to use information about the channel obtained from uplink transmissions (UE to BS) for downlink precoded transmissions (BS to UE).

The geometric precoder, projects the transmission of each layer into a subspace, which is spanned by the reflectors of a specific user and orthogonal as much as possible to the reflectors of other layers. This subspace is time and frequency independent and relies solely on the geometry of the channel. The channel geometry is captured by means of a covariance matrix. The technique proposed in this section use uplink reference signals to compute the channel response at each one of the BS receiving antennas and the covariance matrix of these measurements.

For example, in an LTE/5G NR system, the BS may use the uplink Sounding Reference Signals (SRS) transmitted by a UE, or the uplink Demodulation Reference Signals (DMRS) to compute the channel response at different time and frequency resource elements and from them compute the spatial covariance matrix.

More formally, let i=1, ..., K be a user (or layer) index and L represent the number of BS antennas. Let $H_i(f,t)$ be a complex column vector, representing the channel response at the L BS antennas, at time t=1, ..., $N_t$, and frequency f=1, ..., $N_f$. Note, that $N_t$ may be 1 and $N_f$ may also represent a small part of the used bandwidth. The L×L covariance matrix may be computed directly by $$R_i = \frac{1}{N_f \cdot N_t} \sum_{f,t} H_i(f, t) \cdot H_i^H(f, t)$$

where $(\cdot)^H$ is the Hermitian operator, or indirectly using techniques like maximum likelihood. For example, in some embodiments, a Toeplitz maximum likelihood technique may be used.

Let K represent the number of users for the precoded transmission and $R_i$ their uplink spatial covariance matrices. It is also assumed the normalized uplink power allocation for each user, denoted by $q_i \geq 0$, satisfies $\sum_{i=1}^{K} q_i = 1$.

The optimal uplink vector space, $V_i^*$, that spans the desired channels from the user to the BS and orthogonal to the channels from the other users, is the one that maximizes the SINR at the BS:

$$V_i^* = \underset{V_i}{\operatorname{argmax}} \left\{ \frac{q_i V_i^H R_i V_i}{\sum_{j \neq i} q_j V_i^H R_j V_i + N_0} \right\}$$

where, the numerator term is the signal and the denominator terms are the interference and the additive noise variance.

The precoder for user i is computed as $P_i = p_i \cdot \operatorname{conj}(V_i^*)$ 3.1 Examples of Reference Signals This precoder, which projects the transmitted signal into different vector spaces, does not "invert" the channel and the UE must equalize the channel. Therefore, the UE must receive precoded reference signals as well along with the precoded data. The reference signals may be one of the conventional reference signals, such as a demodulation reference signal or a sounding reference signal. Alternatively, or in addition, a new reference signal may be used for facilitating the computations described herein.

3.2 Scheduling

When the number of available users for precoded downlink transmission is larger than K, the BS may want to specifically select K users that are spatially separated as much as possible. The BS may use the spatial covariance matrices, $R_i$, to determine this set of users.

3.3 Example Procedure for Reciprocal Geometric Coding

One example procedure for computing a reciprocal geometric precoder is as follows:
1. Choose an uplink power allocation (may be simply a uniform allocation, q i=1/K).
2. For each user i, receive uplink reference signals and compute channel response $H_i(f,t)$
3. For each user i, from the received channel response, compute covariance matrix $R_i$
4. For each user i, compute uplink SINR matrix, $SINR_i^{(UL)}$, and find its maximum eigenvector $V_i^*$
5. Compute downlink user cross-interference matrix, $A^{(DL)}$ and find its maximum eigenvector $V_{A^{(DL)}}$
6. For each user i, compute downlink power allocation, $p_i$ from $V_{A^{(DL)}}$
7. For each user i, compute geometric precoder $P_i$ from $p_i$ and $V_i^*$ 4 Spectral Sharing in Wireless Networks The co-existence of multiple radio technologies may be further complicated because not all user devices support advanced MU-MIMO transmission modes. These legacy user devices may operate under the assumption that there is no spectrum sharing at all. These user devices may not have any means, or may only have partial means, to provide downlink channel feedback of any sort, and may not support precoded reference signals, which may be required for the equalization of the precoded data transmissions. The embodiments described in this section advantageously enable spectral sharing transmissions to and from these legacy user devices, without any modifications to their existing hardware or software.

The simplified wireless system shown in FIG. 1A consists of one or more base-stations and multiple user devices. For simplicity, a system with a single base-station and user devices with a single antenna, as shown in FIG. 1B, is first described. In later sections of this document, extensions to multiple base-stations and to user devices with multiple antennas, are described.

A base-station has L physical antennas. These antennas may be arranged as a linear antenna array or in any other configuration. A spatial precoder (or shortly a precoder), is a complex vector of L elements, providing different weights to the emitted/received signal of the different antennas, thus spatially shaping the wave-front of the resulting signal.

The spatial shaping (or precoding) is orthogonal to the time and frequency dimensions. Meaning that, for different frequency and time resources, different precoders may be applied.

4.1 Example Embodiments of a Common Precoder

Let $P_c$ represent the common precoder. In the downlink, the purpose of the common precoder is to emit a signal that will reach all the user-devices in the base-station's sector, or a region served by the base station. In the uplink, the common precoder is used for all the cases where reception is not from a small known set of multiple user devices. Note that in the uplink processing it is actually a "post-coder" that is applied to the received signal. However, for simplicity, the term "precoder" will be used for the uplink as well.

An example of a common precoder is an isotropic precoder that generates a signal with equal angular energy. Mathematically, this precoder is a discrete delta function in the spatial domain (e.g., across spatial positioning of antenna array elements) and a constant value in the transformed angular domain.

$$P_c=[0,\ldots,0,1,0,\ldots,0] \quad (1)$$

$$F\{P_c\}=\text{constant} \quad (2)$$

where $F\{\cdot\}$ is the discrete Fourier transform.

Figure 12:
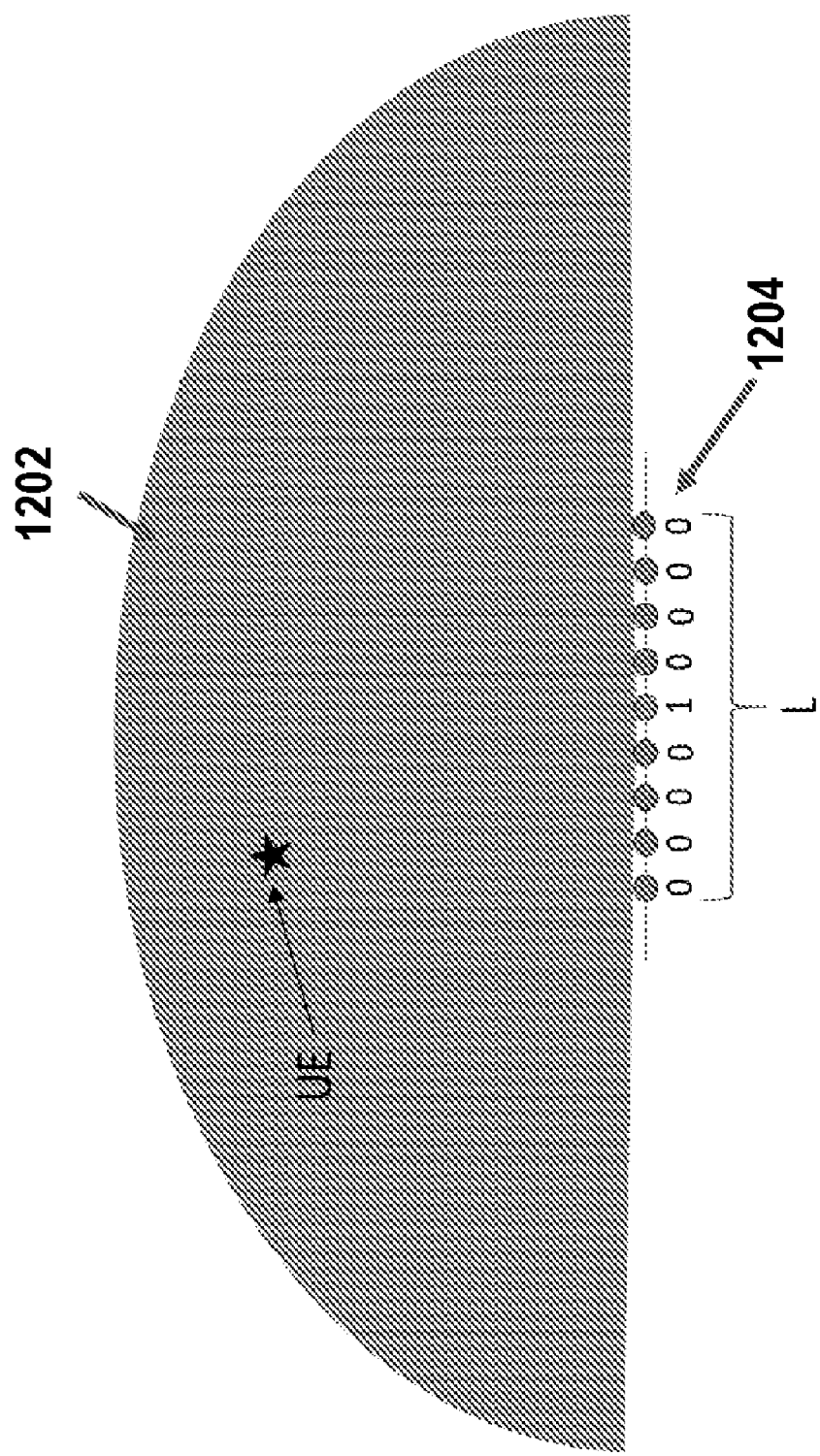
FIG. 12 illustrates how an example common precoder works.

FIG. 12 illustrates such a precoder. Note, that the common precoder is not required to be constant over time and frequency. Different time and frequency resources may use different common precoders. The semicircle 1202 represents constant energy over all angles. The star represents a user device (or User Equipment). The small circles 1204 represent the antennas and the numbers beneath them are the precoder weights.

4.2 Example Embodiments of UE-Specific Precoders

Figure 13:
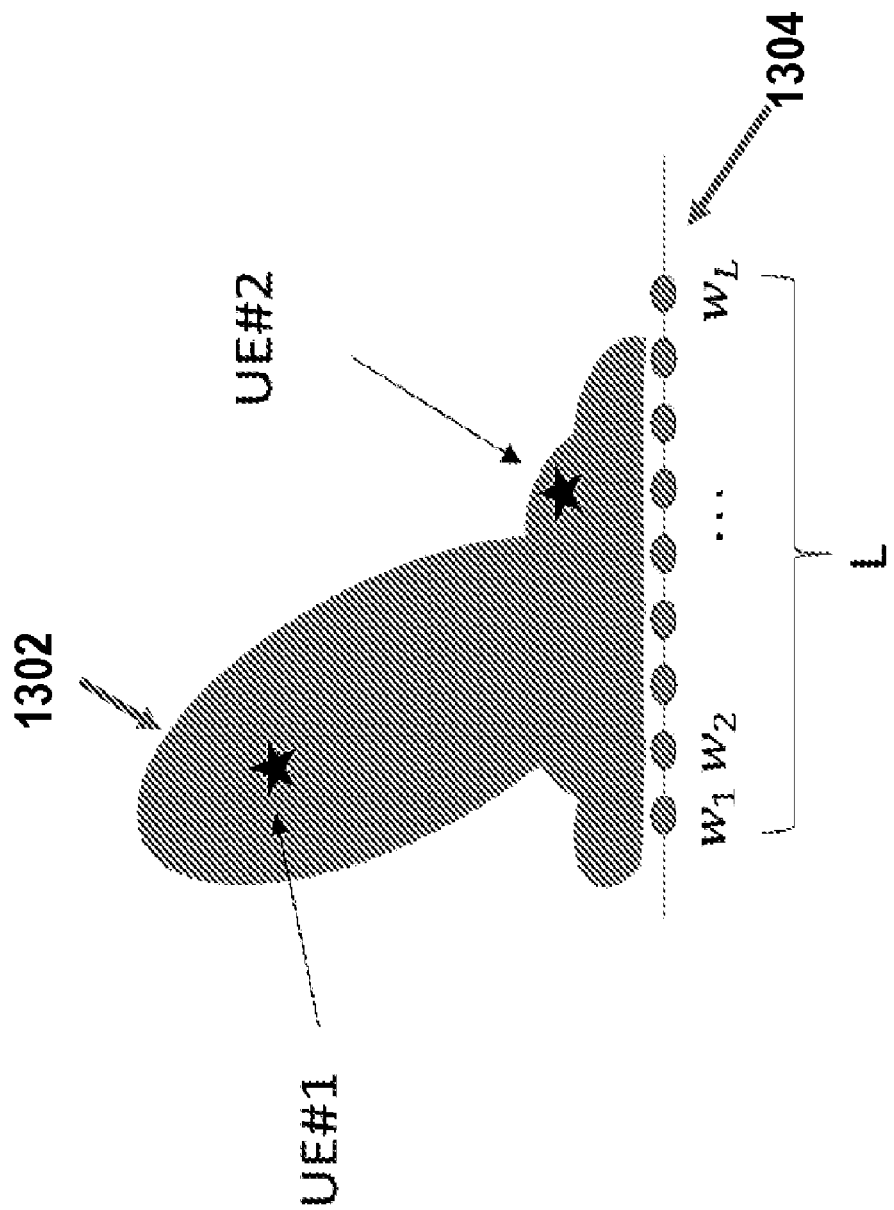
FIG. 13 illustrates how a user device specific precoder works.

Let $P_{us}^i=[w_1^i, w_2^i, \ldots, w_L^i]$ be the user-specific precoder for user i, where $w_l^i$, $l=1, \ldots, L$, are complex weights. In the downlink, the purpose of the user-specific precoder is to maximize the received signal energy at the specific user device, while minimizing the interference to the other receiving user devices. In other words, maximize the Signal to Interference and Noise Ratio (SINR) at a specific user device. In the reciprocal uplink, the purpose of the precoder (post-coder) is to maximize the received signal energy at the base-station from a specific user device, while minimizing the received interfering signals from other transmitting user devices. FIG. 13 illustrates an example of such a precoder. The blue shape represents a radiation pattern. Most of the energy is focused towards UE #1 (as shown by lobe 1302), which is the target user device, while minimal energy is targeted towards the direction of UE #2 (another receiving user device). The weights applied to each antenna are shown below the antennas in the array 1304.

4.3 Downlink Sharing of Physical Channels

In the downlink, the base station may use its frequency and time resources to multiplex different physical channels. Some of these channels may be transmitted through common precoders and some through user-specific precoders. Table 1 shows an example of such multiplexing of physical channels. Note that each frequency and time resource element may be transmitted with a single or multiple precoders, depending on how many data streams are sharing this element. User-specific precoded data will typically share a resource element with multiple user-devices. However, transmission of data for a single user device on a resource element, may also be done using a common precoder.

Figure 14:
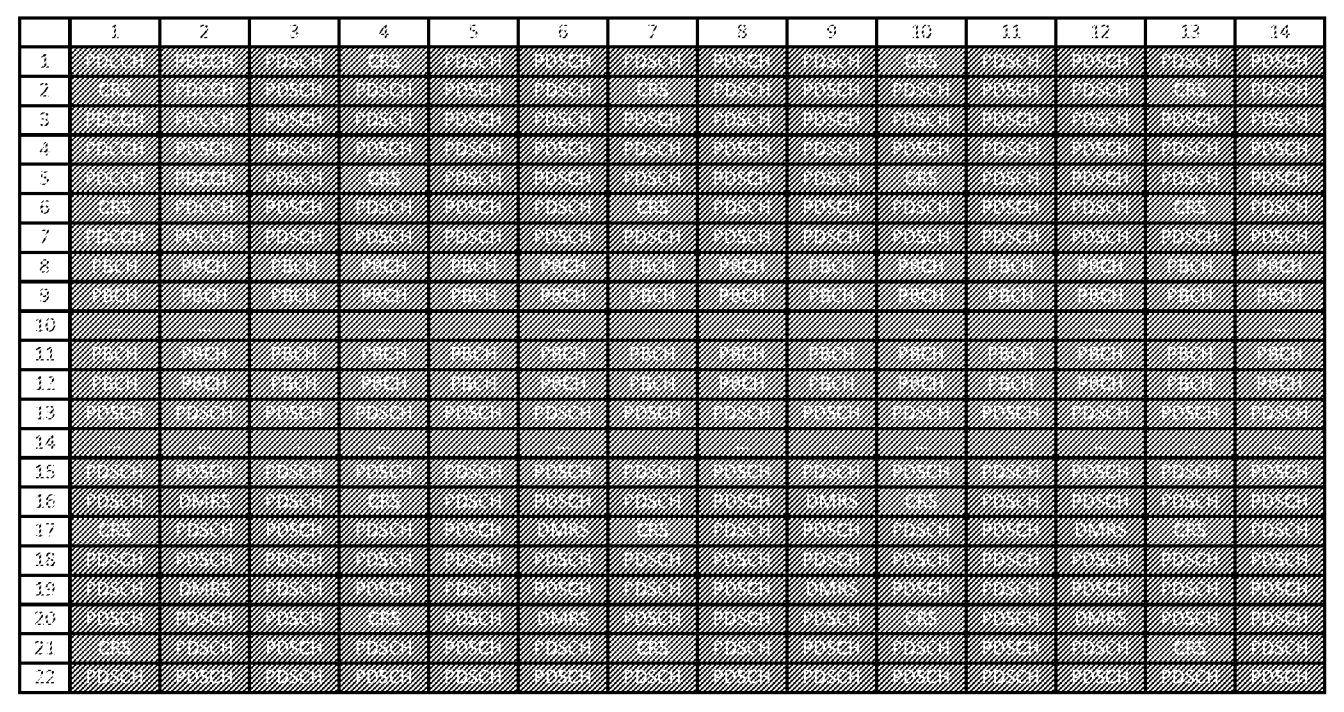

Table 1 shows Downlink physical channels sharing example, using 3GPP terminology. The grid represents frequency and time resources (22×14). The same information is also shown in FIG. 14 by color-coding. Italicized entries (with same grayscale in FIG. 14) represent common precoding and un-italicized entries (with common grayscale coding) represent user-specific precoding. Rows 1-7 represent user-specific precoded data transmission (PDSCH) for multiple user devices, along with some common precoded reference signals (CRS) and common precoded control channel (PDDCH). Rows 8-11 represent a common precoded broadcast channel transmission (PBCH). Rows 12-15 represent a common precoded single user device data transmission (PDSCH) with no spectrum sharing. Rows 16-22 represent a user-specific precoded data transmission (PDSCH) with reference signals (DMRS) for multiple user devices and common precoded reference signals (CRS).

TABLE 1

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | PDCCH | PDCCH | PDSCH | CRS | PDSCH | PDSCH | PDSCH | PDSCH | PDSCH | CRS | PDSCH | PDSCH | PDSCH | PDSCH |
| 2 | CRS | PDCCH | PDSCH | PDSCH | PDSCH | PDSCH | CRS | PDSCH | PDSCH | PDSCH | PDSCH | PDSCH | CRS | PDSCH |
| 3 | PDCCH | PDCCH | PDSCH | PDSCH | PDSCH | PDSCH | PDSCH | PDSCH | PDSCH | PDSCH | PDSCH | PDSCH | PDSCH | PDSCH |
| 4 | PDCCH | PDSCH | PDSCH | PDSCH | PDSCH | PDSCH | PDSCH | PDSCH | PDSCH | PDSCH | PDSCH | PDSCH | PDSCH | PDSCH |
| 5 | PDCCH | PDSCH | PDSCH | CRS | PDSCH | PDSCH | PDSCH | PDSCH | PDSCH | CRS | PDSCH | PDSCH | PDSCH | PDSCH |
| 6 | CRS | PDCCH | PDSCH | PDSCH | PDSCH | PDSCH | CRS | PDSCH | PDSCH | PDSCH | PDSCH | PDSCH | CRS | PDSCH |
| 7 | PDCCH | PDCCH | PDSCH | PDSCH | PDSCH | PDSCH | PDSCH | PDSCH | PDSCH | PDSCH | PDSCH | PDSCH | PDSCH | PDSCH |
| 8 | PBCH | PBCH | PBCH | PBCH | PBCH | PBCH | PBCH | PBCH | PBCH | PBCH | PBCH | PBCH | PBCH | PBCH |
| 9 | PBCH | PBCH | PBCH | PBCH | PBCH | PBCH | PBCH | PBCH | PBCH | PBCH | PBCH | PBCH | PBCH | PBCH |
| 10 | ... | ... | ... | ... | ... | ... | ... | ... | ... | ... | ... | ... | ... | ... |
| 11 | PBCH | PBCH | PBCH | PBCH | PBCH | PBCH | PBCH | PBCH | PBCH | PBCH | PBCH | PBCH | PBCH | PBCH |
| 12 | PBCH | PBCH | PBCH | PBCH | PBCH | PBCH | PBCH | PBCH | PBCH | PBCH | PBCH | PBCH | PBCH | PBCH |
| 13 | PDSCH | PDSCH | PDSCH | PDSCH | PDSCH | PDSCH | PDSCH | PDSCH | PDSCH | PDSCH | PDSCH | PDSCH | PDSCH | PDSCH |
| 14 | ... | ... | ... | ... | ... | ... | ... | ... | ... | ... | ... | ... | ... | ... |
| 15 | PDSCH | PDSCH | PDSCH | PDSCH | PDSCH | PDSCH | PDSCH | PDSCH | PDSCH | PDSCH | PDSCH | PDSCH | PDSCH | PDSCH |
| 16 | PDSCH | DMRS | PDSCH | CRS | PDSCH | PDSCH | PDSCH | PDSCH | DMRS | CRS | PDSCH | PDSCH | PDSCH | PDSCH |
| 17 | CRS | PDSCH | PDSCH | PDSCH | PDSCH | DMRS | CRS | PDSCH | PDSCH | PDSCH | PDSCH | DMRS | CRS | PDSCH |
| 18 | PDSCH | PDSCH | PDSCH | PDSCH | PDSCH | PDSCH | PDSCH | PDSCH | PDSCH | PDSCH | PDSCH | PDSCH | PDSCH | PDSCH |
| 19 | PDSCH | DMRS | PDSCH | PDSCH | PDSCH | PDSCH | PDSCH | DMRS | PDSCH | PDSCH | PDSCH | PDSCH | PDSCH | PDSCH |
| 20 | PDSCH | PDSCH | PDSCH | CRS | PDSCH | DMRS | PDSCH | PDSCH | PDSCH | CRS | PDSCH | DMRS | PDSCH | PDSCH |
| 21 | CRS | PDSCH | PDSCH | PDSCH | PDSCH | PDSCH | CRS | PDSCH | PDSCH | PDSCH | PDSCH | PDSCH | CRS | PDSCH |
| 22 | PDSCH | PDSCH | PDSCH | PDSCH | PDSCH | PDSCH | PDSCH | PDSCH | PDSCH | PDSCH | PDSCH | PDSCH | PDSCH | PDSCH |

4.4 Example Embodiments of Uplink Sharing of Physical Channels

Different uplink physical channels may be multiplexed within the frequency and time resources. The base-station receives at all its antennas the uplink transmissions from all sources and process it.

Common channels, which may represent transmissions cases which are not from a small known set of multiple user devices, are processed with a common precoder, $P_c(l,f,t)$. The received and processed data in the base-station is:

$$Y_{P_c}(f, t) = \sum_{l=1}^{L} P_c(l, f, t) \cdot \left[ \sum_{i} H^i(l, f, t) \cdot X^i(f, t) + n(l, f, t) \right] \quad (3)$$

where f and t are frequency and time indexes, $X^i(f,t)$ are uplink data symbols from user device i, $H^i(l,f,t)$ is the frequency channel response from user device i to antenna l, and $n(l,f,t)$ is an additive noise term.

Similarly, user-specific channels are processed with their user-specific precoders $$Y_{P_{us}}^i(f, t) = \sum_{l=1}^{L} P_{us}^i(l, f, t) \cdot \left[ \sum_{i} H^i(l, f, t) \cdot X^i(f, t) + n(l, f, t) \right] \quad (4)$$

The operation of applying the user-specific precoders to the received uplink signal acts as a channel decoupler, which converts a MU-MIMO link to a parallel system with decoupled SISO links, $Y_{P_{us}}^i$. This enables parallel implementation of independent receivers at the base-station, as described later in the document.

Figure 15:
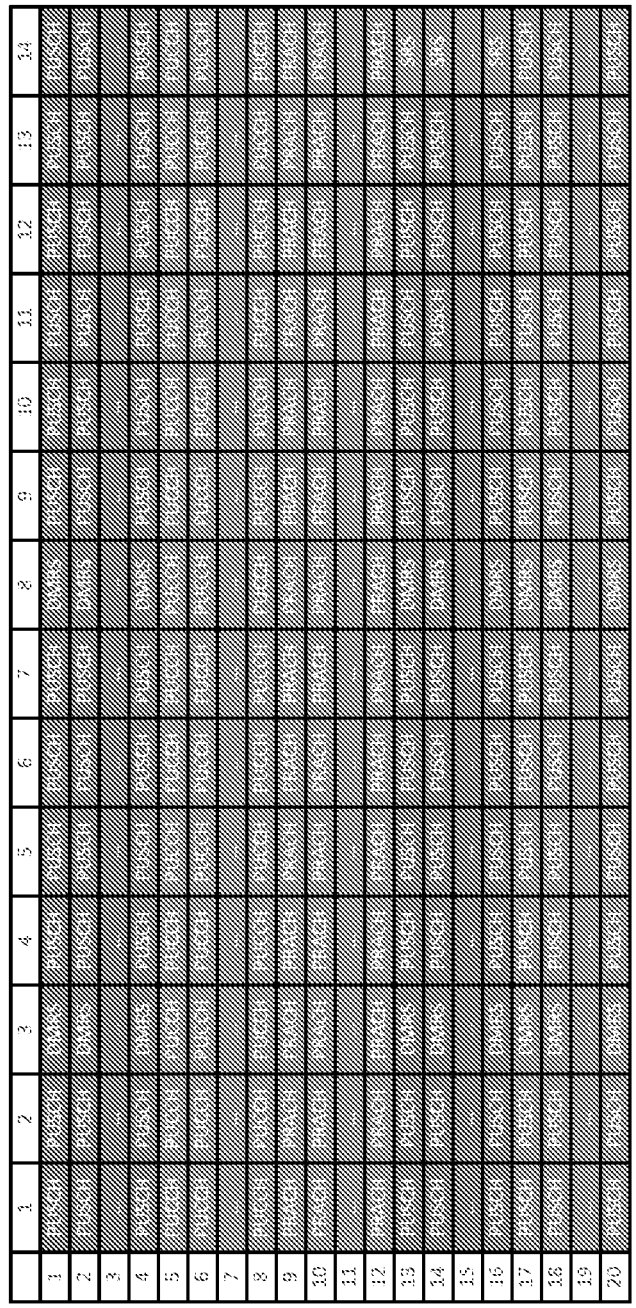
FIG. 15 is a tabular representation of an example of sharing uplink physical channels.

Table 2 (and FIG. 15) shows an example for such multiplexing of physical channels. Here as well, the selection of precoder type is per resource element. User-specific pre-coded data will typically share the resource element with multiple user devices. However, processing of data from a single user on a resource element, may also be done using a common precoder.

Table 2 shows uplink physical channels sharing example, using 3GPP terminology. The grid represents frequency and time resources (20×14). Italicized and commonly colored entries represent common precoding and un-italicized and commonly color coded entries represent user-specific precoding. Rows 1-4 represent user-specific uplink data transmissions (PUSCH) with demodulation reference signals (DMRS) from multiple user devices, to be processed with user-specific precoders. Rows 5-8 represents common uplink control channel transmissions (PUCCH), to be processed with a common precoder. Rows 9-12 represents common uplink random access channel transmissions (PRACH), to be processed with a common precoder. Rows 13-16 represent user-specific uplink data transmissions (PUSCH) with demodulation reference signals (DMRS) from multiple user devices, to be processed with user-specific precoders, except for the last column, which has common sounding reference signals (SRS), which may be processed with a common precoder. Rows 17-20 has a single user-specific data transmission with demodulation reference signals, which may be processed with a common precoder or with a user-specific precoder.

TABLE 2

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | PUSCH | PUSCH | DMRS | PUSCH | PUSCH | PUSCH | PUSCH | DMRS | PUSCH | PUSCH | PUSCH | PUSCH | PUSCH | PUSCH |
| 2 | PUSCH | PUSCH | DMRS | PUSCH | PUSCH | PUSCH | PUSCH | DMRS | PUSCH | PUSCH | PUSCH | PUSCH | PUSCH | PUSCH |
| 3 | ... | ... | ... | ... | ... | ... | ... | ... | ... | ... | ... | ... | ... | ... |
| 4 | PUSCH | PUSCH | DMRS | PUSCH | PUSCH | PUSCH | PUSCH | DMRS | PUSCH | PUSCH | PUSCH | PUSCH | PUSCH | PUSCH |
| 5 | PUCCH | PUCCH | PUCCH | PUCCH | PUCCH | PUCCH | PUCCH | PUCCH | PUCCH | PUCCH | PUCCH | PUCCH | PUCCH | PUCCH |
| 6 | PUCCH | PUCCH | PUCCH | PUCCH | PUCCH | PUCCH | PUCCH | PUCCH | PUCCH | PUCCH | PUCCH | PUCCH | PUCCH | PUCCH |
| 7 | ... | ... | ... | ... | ... | ... | ... | ... | ... | ... | ... | ... | ... | ... |
| 8 | PUCCH | PUCCH | PUCCH | PUCCH | PUCCH | PUCCH | PUCCH | PUCCH | PUCCH | PUCCH | PUCCH | PUCCH | PUCCH | PUCCH |
| 9 | PRACH | PRACH | PRACH | PRACH | PRACH | PRACH | PRACH | PRACH | PRACH | PRACH | PRACH | PRACH | PRACH | PRACH |
| 10 | PRACH | PRACH | PRACH | PRACH | PRACH | PRACH | PRACH | PRACH | PRACH | PRACH | PRACH | PRACH | PRACH | PRACH |
| 11 | ... | ... | ... | ... | ... | ... | ... | ... | ... | ... | ... | ... | ... | ... |
| 12 | PRACH | PRACH | PRACH | PRACH | PRACH | PRACH | PRACH | PRACH | PRACH | PRACH | PRACH | PRACH | PRACH | PRACH |
| 13 | PUSCH | PUSCH | DMRS | PUSCH | PUSCH | PUSCH | PUSCH | DMRS | PUSCH | PUSCH | PUSCH | PUSCH | PUSCH | SRS |
| 14 | PUSCH | PUSCH | DMRS | PUSCH | PUSCH | PUSCH | PUSCH | DMRS | PUSCH | PUSCH | PUSCH | PUSCH | PUSCH | SRS |
| 15 | ... | ... | ... | ... | ... | ... | ... | ... | ... | ... | ... | ... | ... | ... |
| 16 | PUSCH | PUSCH | DMRS | PUSCH | PUSCH | PUSCH | PUSCH | DMRS | PUSCH | PUSCH | PUSCH | PUSCH | PUSCH | SRS |
| 17 | PUSCH | PUSCH | DMRS | PUSCH | PUSCH | PUSCH | PUSCH | DMRS | PUSCH | PUSCH | PUSCH | PUSCH | PUSCH | PUSCH |
| 18 | PUSCH | PUSCH | DMRS | PUSCH | PUSCH | PUSCH | PUSCH | DMRS | PUSCH | PUSCH | PUSCH | PUSCH | PUSCH | PUSCH |
| 19 | ... | ... | ... | ... | ... | ... | ... | ... | ... | ... | ... | ... | ... | ... |
| 20 | PUSCH | PUSCH | DMRS | PUSCH | PUSCH | PUSCH | PUSCH | DMRS | PUSCH | PUSCH | PUSCH | PUSCH | PUSCH | PUSCH |

4.5 Examples of Initial Procedures

This section describes the procedures required for a user device to transmit/receive data on a shared spectrum. Before that, the base-station may schedule the user to transmit/receive as a single user device without any spectral sharing. The procedure may be as follows:

1. User device transmits uplink reference signals. These reference signals may be dedicated for channel sounding or may be a part of an uplink data transmission. For example, SRS or uplink DMRS in LTE/5G NR.
2. The base station may compute from received reference signals, an uplink channel response, $H^i(l,f,t)$.
3. The base station may compute a spatial covariance matrix $R_i$ of dimensions L×L. There are different methods for computing this covariance matrix. For example, averaging out across $N_f$ tones and $N_t$ time samples rank-1 covariance matrices, directly computed from the channel response:

$$R_i = \frac{1}{N_f N_t} \sum_{f,t} H^i(l, f, t) \cdot \left(H^i(l, f, t)\right)^H \quad (5)$$

where $(\cdot)^H$ is the Hermitian conjugate operation.

Other more advanced techniques to compute $R_i$, such as Maximum Likelihood or parameterized covariance construction may also be applied.

4. The base station may detect main angle of arrival (AOA) of the radiation waves. The concept of main AOA assumes that the wireless channel reflections are typically coming in some angular spread around a main angle. This step is useful for scheduling users that have some angular separation. Different techniques may be used for computing the main AOA. For example, transforming the spatial channel response to the angular domain and detecting the angle with the highest energy.

Alternatively, more sophisticated techniques that detect the angles of the reflectors, such as L-1 minimization and Maximum Likelihood may also be applied. If a user does not have a distinguish main AOA, such in some cases of complete Non-Line-Of-Sight (NLOS), or very large angular spread, the base-station may decide to keep this user device as a single user and not share the spectrum for it with other devices.

5. Once the base-station computed the spatial covariance matrix and the main AOA for a user device, it is ready for scheduling of spectral sharing uplink or downlink transmissions. Note, that both these measurements are robust and not very sensitive to mobility, as they rely solely on the geometry of the channel, which typically changes slowly. The base-station may refresh and update these metrics, based on the channel conditions and/or a rate of change of channel conditions.

4.6 Examples of Scheduling

Figure 16:
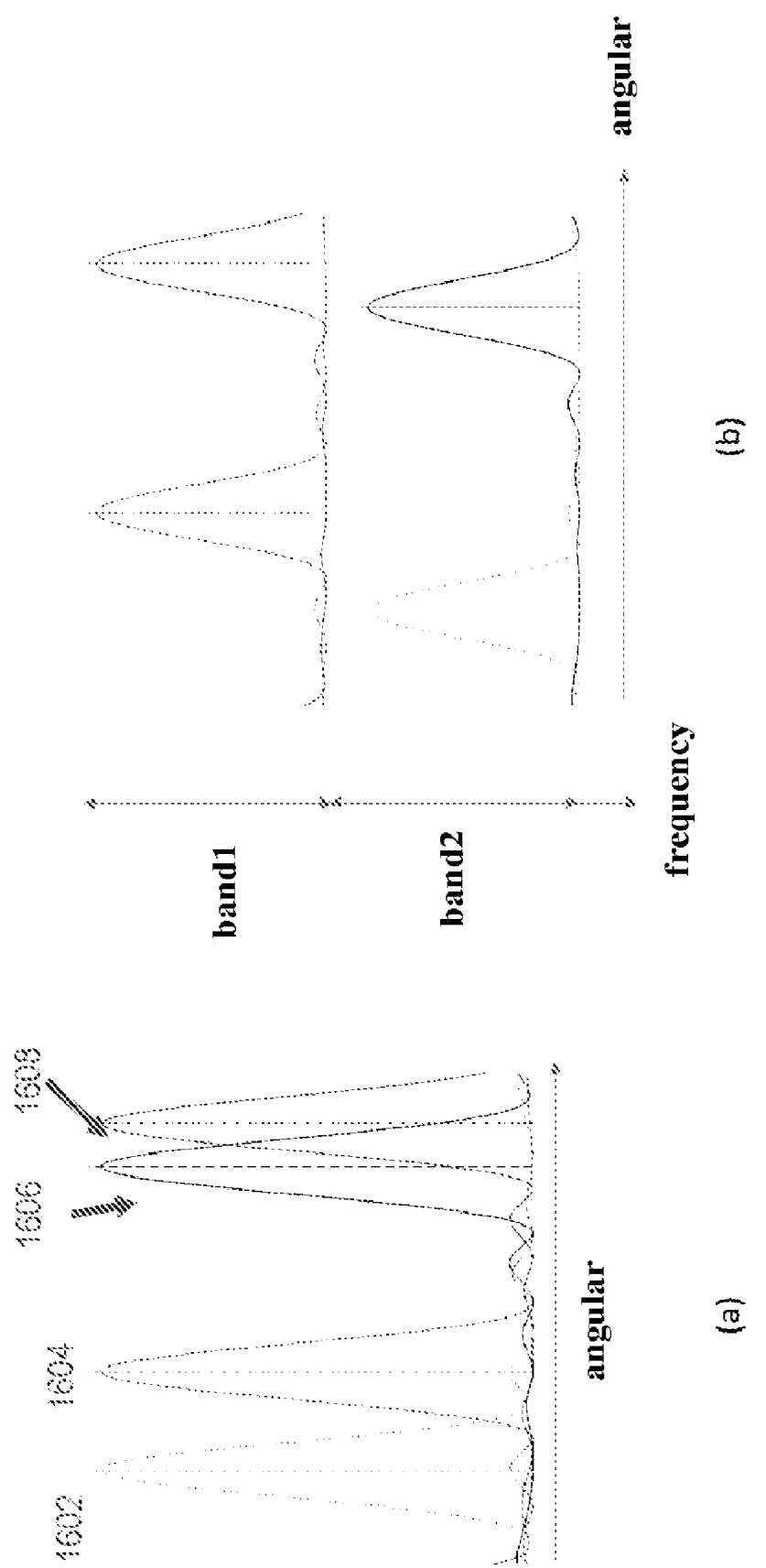
FIG. 16 is an example illustration of two-dimensional scheduling.

For spectral sharing wireless systems, the scheduling algorithm needs to take into consideration, on top of the standard metrics such as traffic requirements (throughput, latency, etc.) and channel conditions (frequency response, SINR, etc.), also the angular separation of the users. The minimum angular separation is a function of the number of base-station antennas, beam structure and required SINR. For a set of users that needs to be scheduled for a downlink or uplink transmission in a specific time frame, the scheduling algorithm needs to allocate user devices on a two-dimensional plane of frequency and angle. Using the detected main AOA, the scheduling algorithm selects user devices with enough angular separation to minimize the cross-interference between all the user devices sharing the same frequency and time resources elements. FIG. 16 shows an example of such scheduling for 4 user devices. The beam patterns 1602, 1604, 1606 and 1608 represent four UEs, plotted along the angular axis in the horizontal direction. On the right, one possible method of separating these transmissions includes using time/frequency locations for 1604 and 1608 that are separated in angular domain, and similarly combining 1602, 1606 transmission to occur at same time/frequencies.

4.7 Examples of Precoder Computations

Once a set of user devices is selected for a spectral sharing transmission, the base-station can compute from their covariance matrices, the precoders to be applied to either the downlink transmission, or the uplink reception. A precoder may be computed as a vector that maximizes some criterion, typically SINR related.

In its general form, the precoder may satisfy the following conditions:

A. Maximizing the signal energy in some angular sector. This focuses the energy toward the main AOA of the targeted user device.

B. Minimizing the signal energy in some angular sectors. This reduces the interference towards the other user devices sharing the spectrum.

C. Minimizing the signal energy compared to a reference beam in some angular sector. This shapes the beam to match a reference beam (which will typically be the beam of the common precoder).

In the downlink, the energy of the precoders may also be scaled by some power allocation, to further control the receive SINR of each user device.

As an example, precoder computation for 2 user devices may consist of computing a precoder for the first user device as a vector that maximizes the signal energy at the main AOA of the first user device, while minimizing the signal energy at the direction of the main AOA of the second user device, and computing a precoder for the second user device, as a vector that maximizes the signal energy at the main AOA of the second user device, while minimizing the signal energy at the direction of the main AOA of the first user device.

4.8 Examples of Precoding in FDD

The computation of the precoder is based on uplink channel measurements only. In general, the computed precoders are correct for the uplink frequency and should only be applied to the uplink reception. In FDD, for the downlink, the computed precoders should be scaled up or down by the ratio of the downlink to uplink frequencies.

The equations below explain the scaling procedure for a linear antenna array with antenna spacing of $\Delta x$. Let $P_{UL}$ be a computed precoder vector and let $\alpha = f_{DL}/f_{UL}$ be the frequencies ratio. The continuous spatial function of the uplink precoder may be expressed as $$\tilde{P}_{UL}(x) = \sum_{l=1}^{L} P_{UL}(l) \cdot \text{sinc}\left(\frac{x-(l-1)}{\Delta x}\right) \tag{6}$$

The precoder vector for the downlink is obtained by sampling a continuous downlink precoder function, $\tilde{P}_{DL}(x)$, in the spatial domain, defined as a scaled version of $\tilde{P}_{UL}(x)$ by a factor of $\alpha$, i.e., $$\tilde{P}_{DL}(x) = P_{UL}(\alpha x) = \sum_{l=1}^{L} P_{UL}(l) \cdot \text{sinc}\left(\frac{\alpha x-(l-1)}{\Delta x}\right) \tag{7}$$

and the discrete precoder vector for the downlink is $$P_{DL}(l) = \tilde{P}_{DL}(x)|_{x=(l-1)\Delta x} \tag{8}$$

for l=1, . . . , L. Note that this scaling operation may also be implemented as a resampling operation of the uplink precoder vector by a factor of $\alpha^{-1}$.

Alternatively, for some methods of parameterized construction of the covariance matrix $R_i$, the detected main AOA may be scaled by a factor of $\alpha$, generating a scaled covariance matrix adapted for the downlink frequency and no further scaling of the precoder vector is required.

Figure 17:
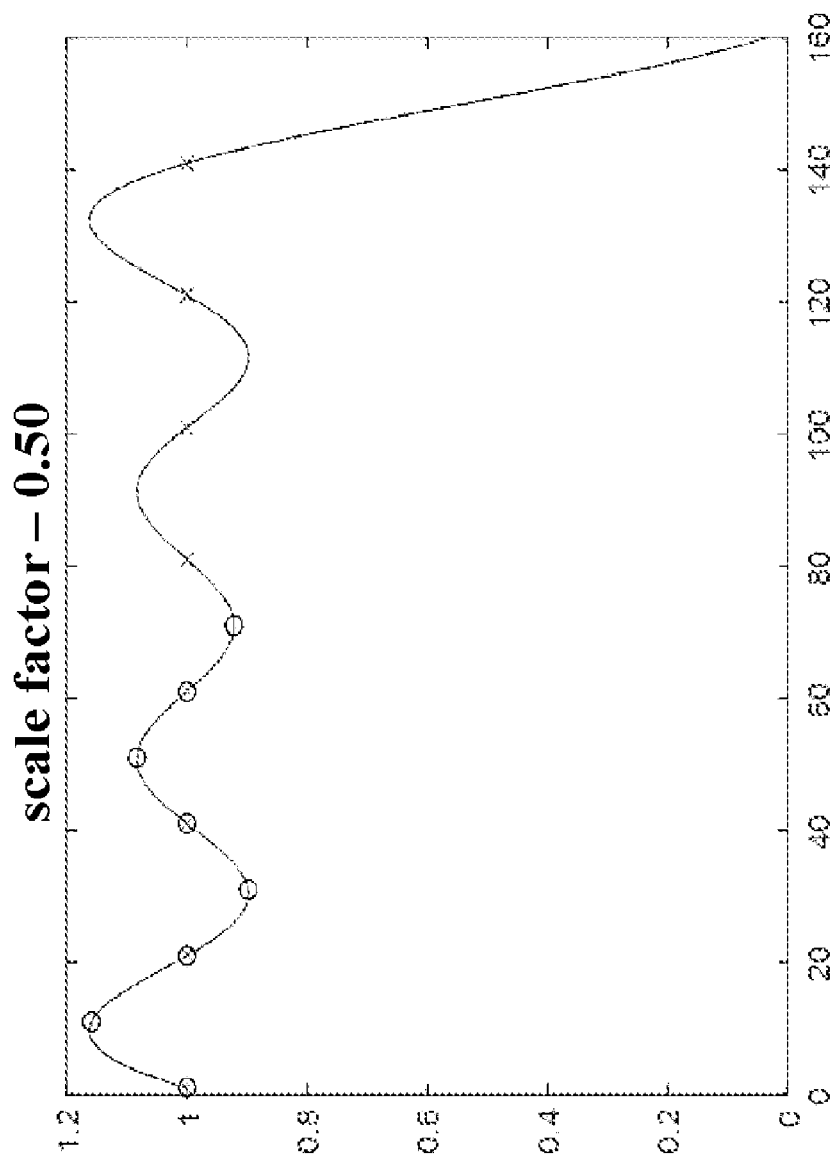
FIG. 17 illustrates an example of a scaling operation with scale factor=0.5.

FIG. 17 shows a scaling example in which scale factor is 0.5. In FIG. 17, original estimated channel response is shown by X marks. This represents, for example, results of measurements performed on the uplink signals. The circle samples represent the resulting scaled response derived according to Equations (6) to (8).

Figure 18:
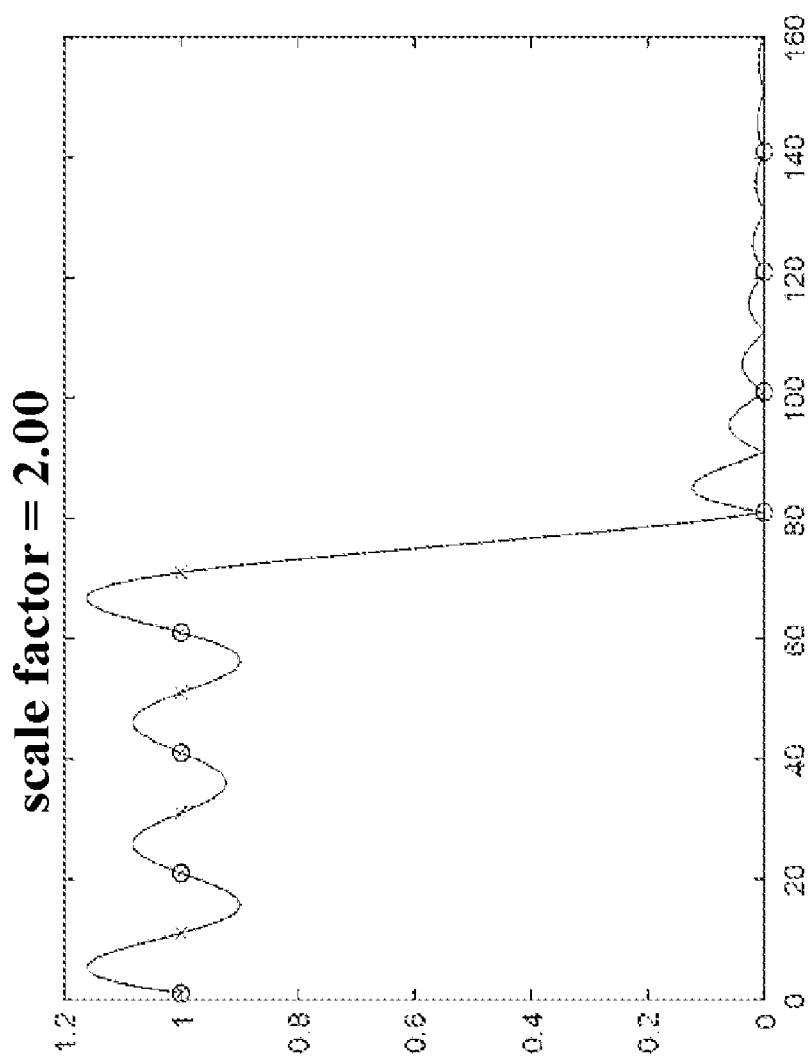
FIG. 18 illustrates an example of a scaling operation with scale factor=2.

FIG. 18 shows another example in which the scale factor is 2. While the examples in FIGS. 17 and 18 are relatively simple scale factors, they are included to further explain the concept of scaling operation disclosed in the present document.

4.9 Examples of Pre-Compensation

Figure 19:
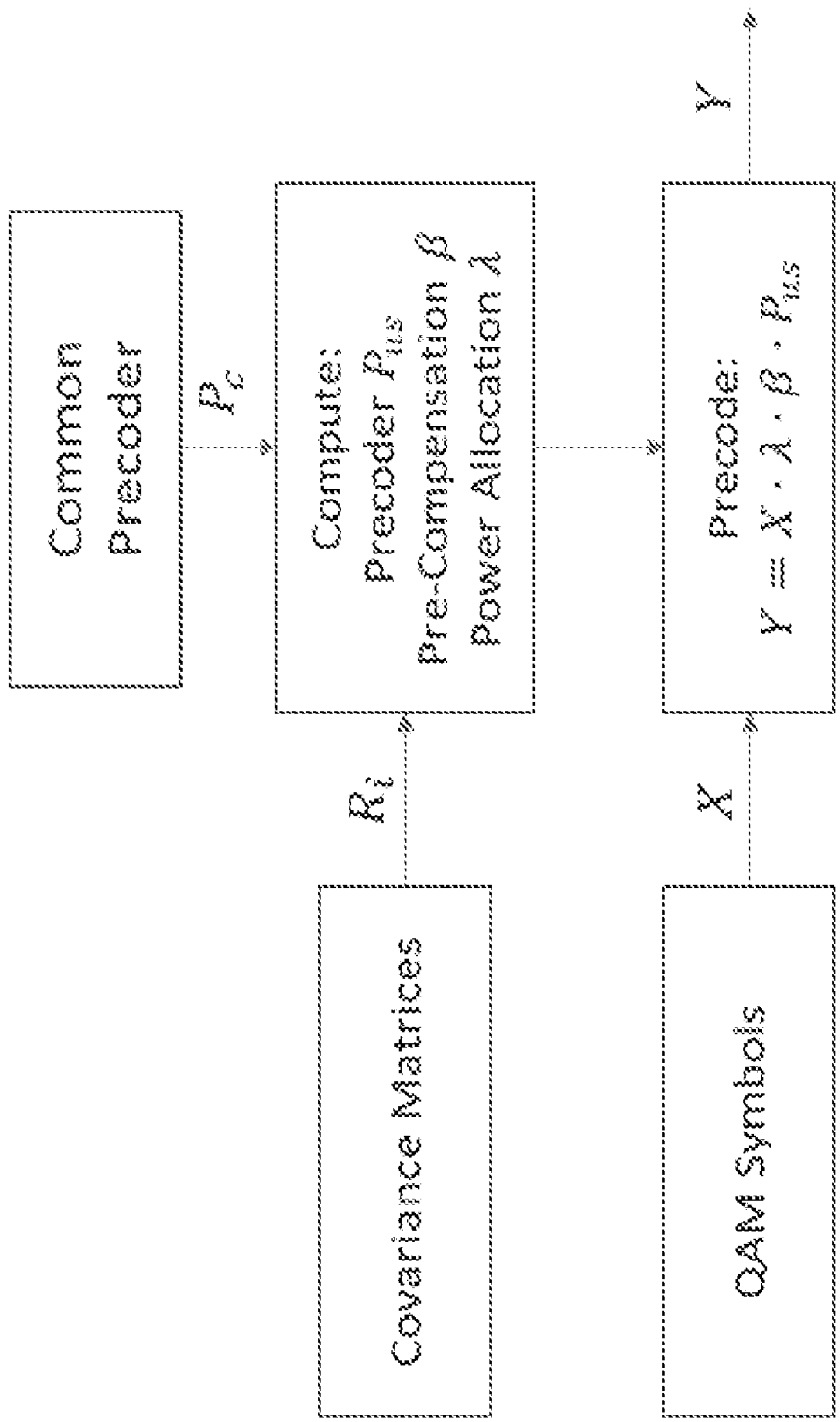
FIG. 19 shows an example of a pre-compensation operation.

To support legacy user devices, which do not support precoded reference signals, pre-compensation of their precoded QAM symbols should be performed. The pre-compensation factor scales all precoded QAM symbols of the user-specific data stream that is transmitted to that user device in the downlink, as illustrated in FIG. 19. The purpose of the pre-compensation factor is to compensate for the difference in the channel response between the user-specific precoder and the common precoder. This way, the receiving device, receives a user-specific precoded transmission with a channel response that is like the common precoded channel response. Then, the user-device may equalize its user-specific data transmission with reference signals that were transmitted while using the common precoder.

In FIG. 19, the covariance matrices and the common precoder are used for computing the user-specific precoder vectors P_us, the power allocation A and the pre-compensation β. Then, each QAM (or QPSK) symbol, X, for that user-specific stream is scaled by λ and β and then multiply by the precoder. The output is the scaled and precoded vector Y.

For example, in LTE, legacy devices may only support transmission mode 1 (TM1) and are not designed to receive multi-user transmissions or to use precoded reference signals for equalization (DMRS). The only available reference signals for equalization of PDSCH data are the cell-reference signals (CRS). In a spectral sharing system, as described in this document, CRS may be precoded with a common precoder and multiple PDSCH transmissions may be precoded with user-specific precoders, sharing the same spectrum. Due to the pre-compensation of the QAM symbols, a user device will receive both CRS and PDSCH with the same channel response and will be able to equalize it and decode it.

4.10 Examples of Base Station Architectures

Figure 20:
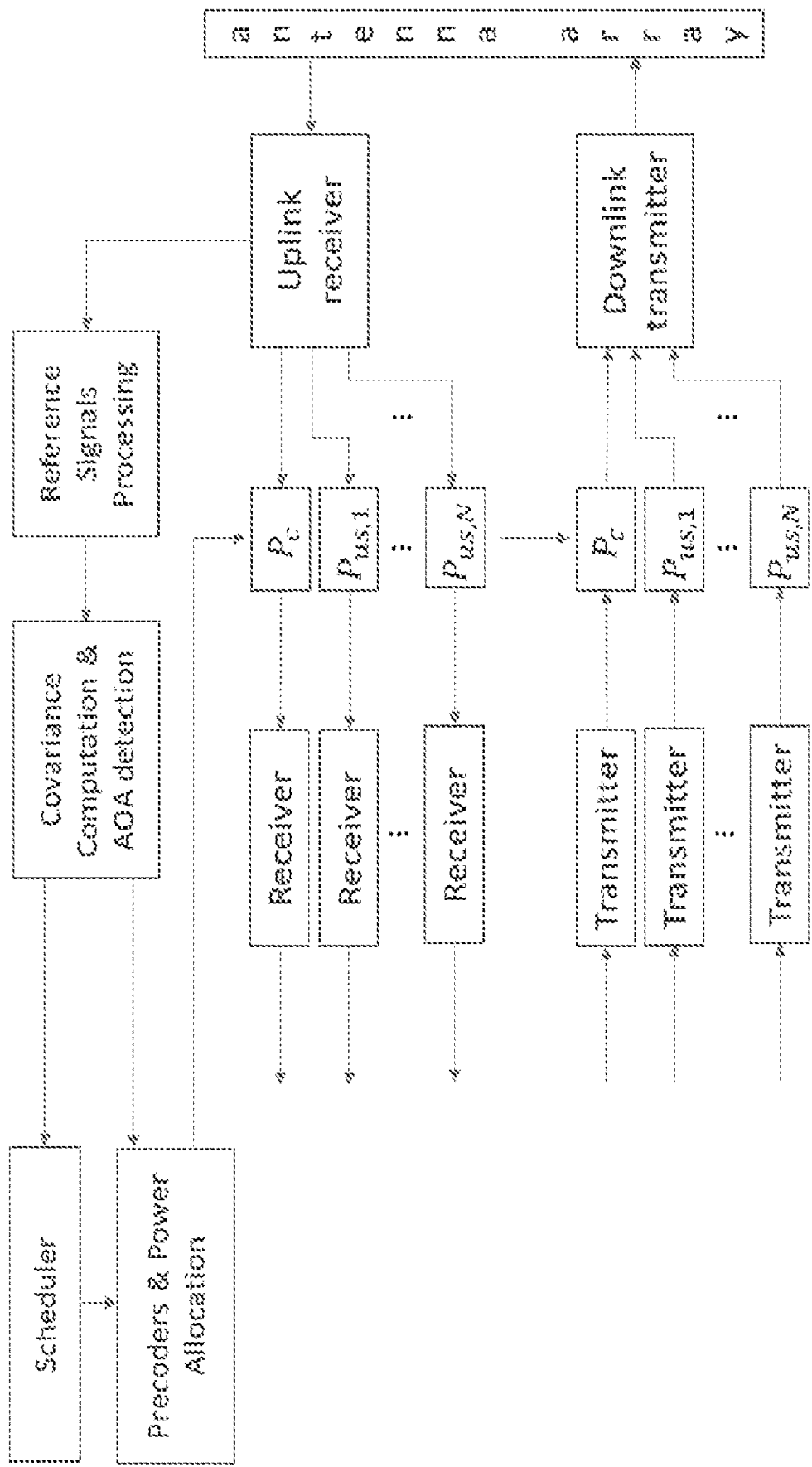
FIG. 20 is a block diagram showing an implementation example of a network-side device.

The spectral sharing system, may be implemented at the base-station with independent parallel receivers/transmitters, as shown in FIG. 20. No joint processing in required in the receivers or transmitters to cancel out cross-interference between the users. Only the computation of precoders takes into consideration, the different users sharing the spectrum.

As shown in FIG. 20, signals to/from the antenna array that is used for transmission or reception of signals may be processed as follows. An uplink receiver circuit may receive signals from antenna arrays. The reference signal portion may be passed to a reference signal processing system that performs the covariance computation and angle of arrival computations. The results of these computations are provided to a scheduler and/or a precoder/power allocator for future use. The user-specific signals may be passed through postcoders Pc, Pus,1 . . . Pus,N for N user devices and corresponded post-processed signal may be used for data receiver be a receiver that performs demodulation/error correction coding and so on.

On the transmit-side, streams for each user device may be passed through the pre-coder and through downlink transmission circuitry and applied to the antenna array for transmission in the downlink direction.

4.11 Examples of Extensions to Multi-Layer Communication

Figure 21:
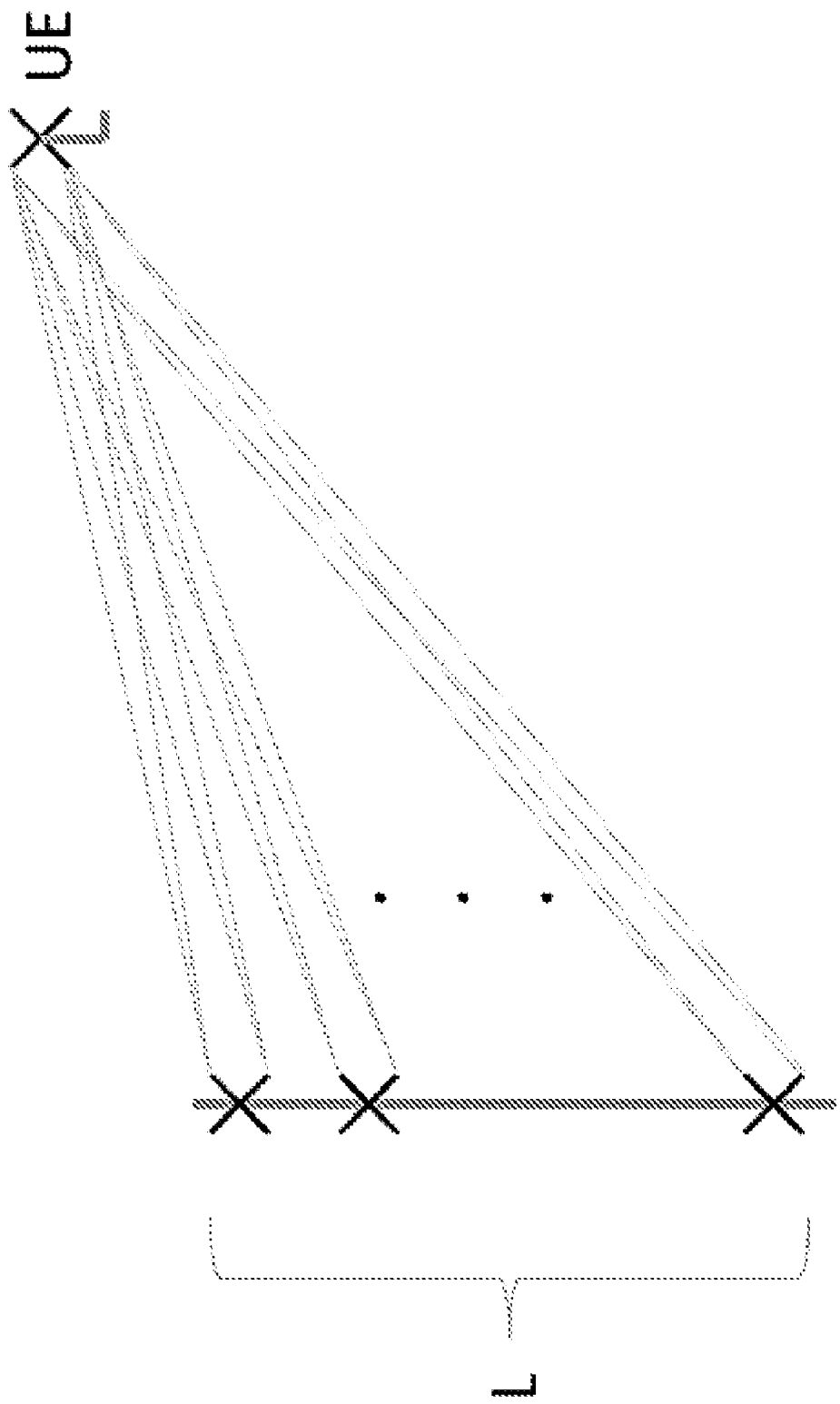
FIG. 21 shows a dual polarization link example.

The scheme described in the previous sections, can be easily extended from single polarization antennas to dual polarization antennas. Each one of the L base station antennas may be a dual polarization antenna and the user device may have a dual polarization antenna as well. With this configuration, it is possible to transmit two independent data streams (or layers) from the base-station to a user device and from a user device to the base-station. Each dual polarization antenna at the base station forms a 2×2 link with the dual polarization antenna at the user device, as seen in FIG. 21. Both dual polarization antennas may use the same exact precoders. The covariance matrices, used for precoders' computation, may be derived from the uplink channel response of any of the dual polarization antennas, or both.

FIG. 21 shows an example of a dual polarization link between a base-station and a user device (UE). The base-station's antennas in this example are on a linear antenna array on the left side, marked with 'X's and the user device is on the right. Each base-station's dual-polarization antenna forms a 2×2 link to the dual polarization antenna of the user device.

Figure 22:
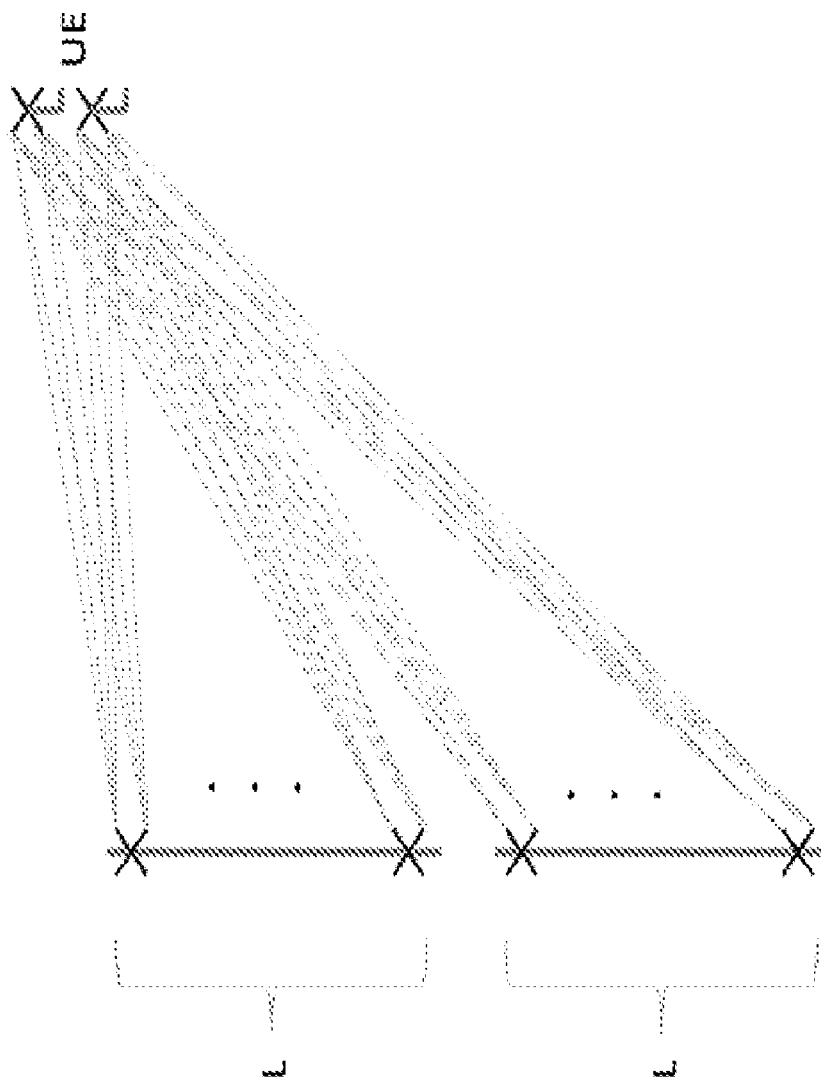
FIG. 22 shows an example with 2 antenna arrays, each with L dual polarization antennas.

This multi-layer per use-device concept can be further extended to more than two layers, by using additional antenna arrays at the base station, spaced apart from each other and multiple dual polarization antennas at the user device, as seen in the example of FIG. 22.

FIG. 22 shows a multi-layer per user device example. The base-station has 2 antenna arrays, each with L dual polarization antennas. The user device has 2 dual-polarization antennas. This is equivalent to L 4×4 links to the user device.

4.12 Example Extensions to Multiple Base Stations

The multi-layer scheme, described in the previous section, can be implemented on separate base-stations spaced apart from each other. Each base-station may have one or more antenna arrays and the user device may have multiple antennas. The transmission/reception of each base-station may be independent of the other base-stations or coordinated with them using a side-link.

5 Multi-Layer, Multi-Beam Communication Systems

This section describes a novel method for a point-to-multi-point (PTMP) communication system, using multi-beams. A hub with one or more antennas (or antenna array) communicates with multiple devices on multiple beams pointing towards these devices. Each one of these devices may have a single antenna or multiple antennas. Also, the hub and devices antennas may have a single or a dual polarization. In this way, a multi-layer link, also known as MIMO, may be established between the hub and each one of these devices, simultaneously.

One novelty aspect of the proposed system is that the beams are designed to maximize the desired signal energy at each device, while minimizing the interference from other beams. For example, a beam may be notched at the angular directions of the other beams, thus minimizing the interference to them. This is achieved by precoding the transmitted symbols, or postcoding the received symbols.

Another novelty aspect of the proposed system is the usage of special antennas instead of linear antenna arrays, such as a Luneburg multi-beam antenna. This antenna typically requires a one-to-one ratio between the number of input feeds and the number target devices, in contrast to linear antenna arrays, where this ratio is typically higher, due to the beam widening effect in the higher angles.

5.1 Multi-Layer Multi-Beam Systems for Stationary Devices

For stationary devices, the beams may be set at fixed directions, pointing to the devices. An example of such a system, is a cellular backhaul, where a hub, connected to a fiber feed, is communicating with remote towers (which have no fiber connection). FIG. 3 illustrates such an example.

Figure 23:
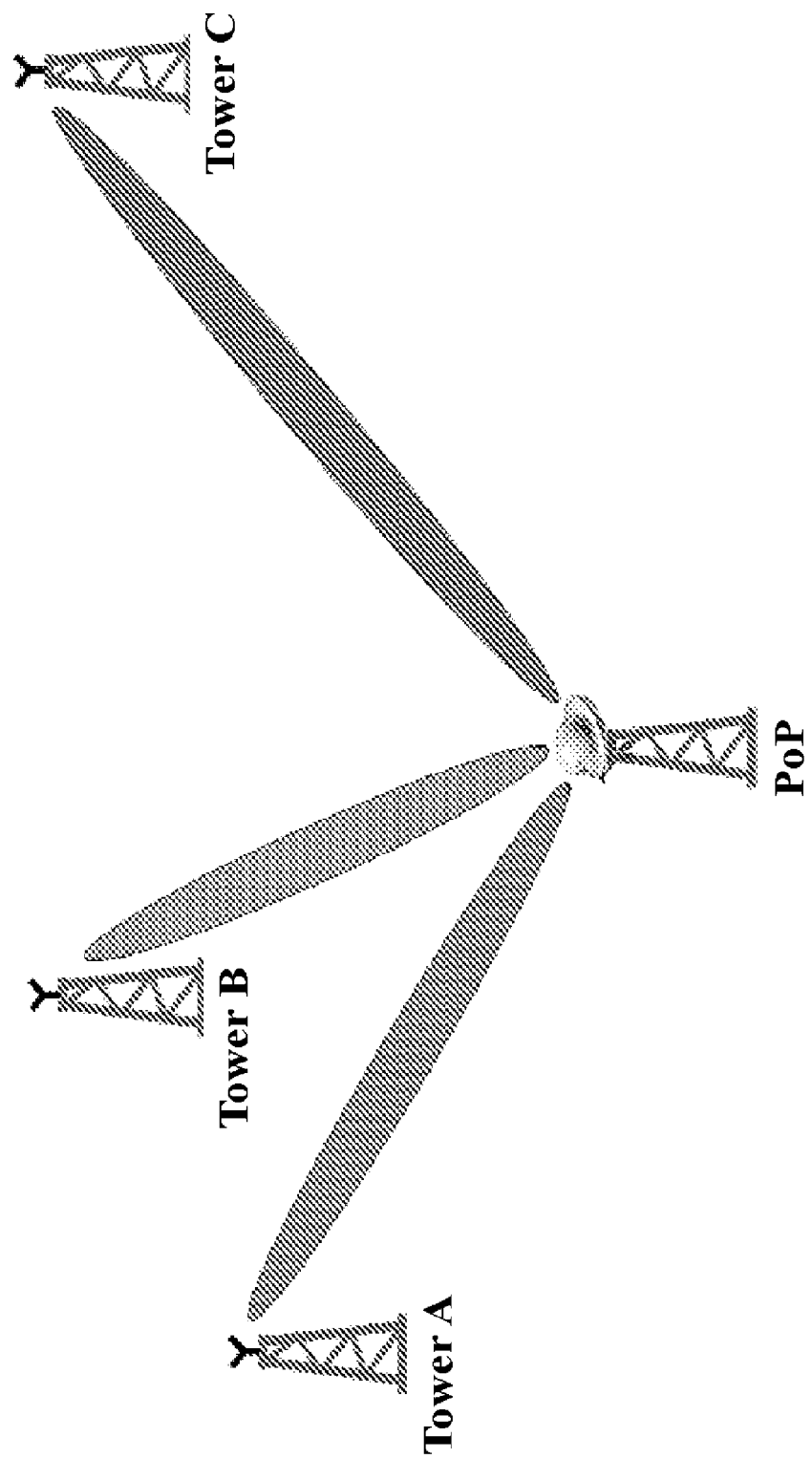
FIG. 23 shows an example of a cellular backhaul network.

FIG. 23 shows a cellular backhaul example. A hub, denoted as a PoP (Point of Presence), is connected to a fiber (not explicitly shown) and communicates with remote towers using a Luneburg antenna and three different beams pointing towards these towers. If the Luneburg has dual-polarization input feeds and the remote antennas are dual-polarized as well, a two-layer link may be established between the hub and each tower.

Figure 24:
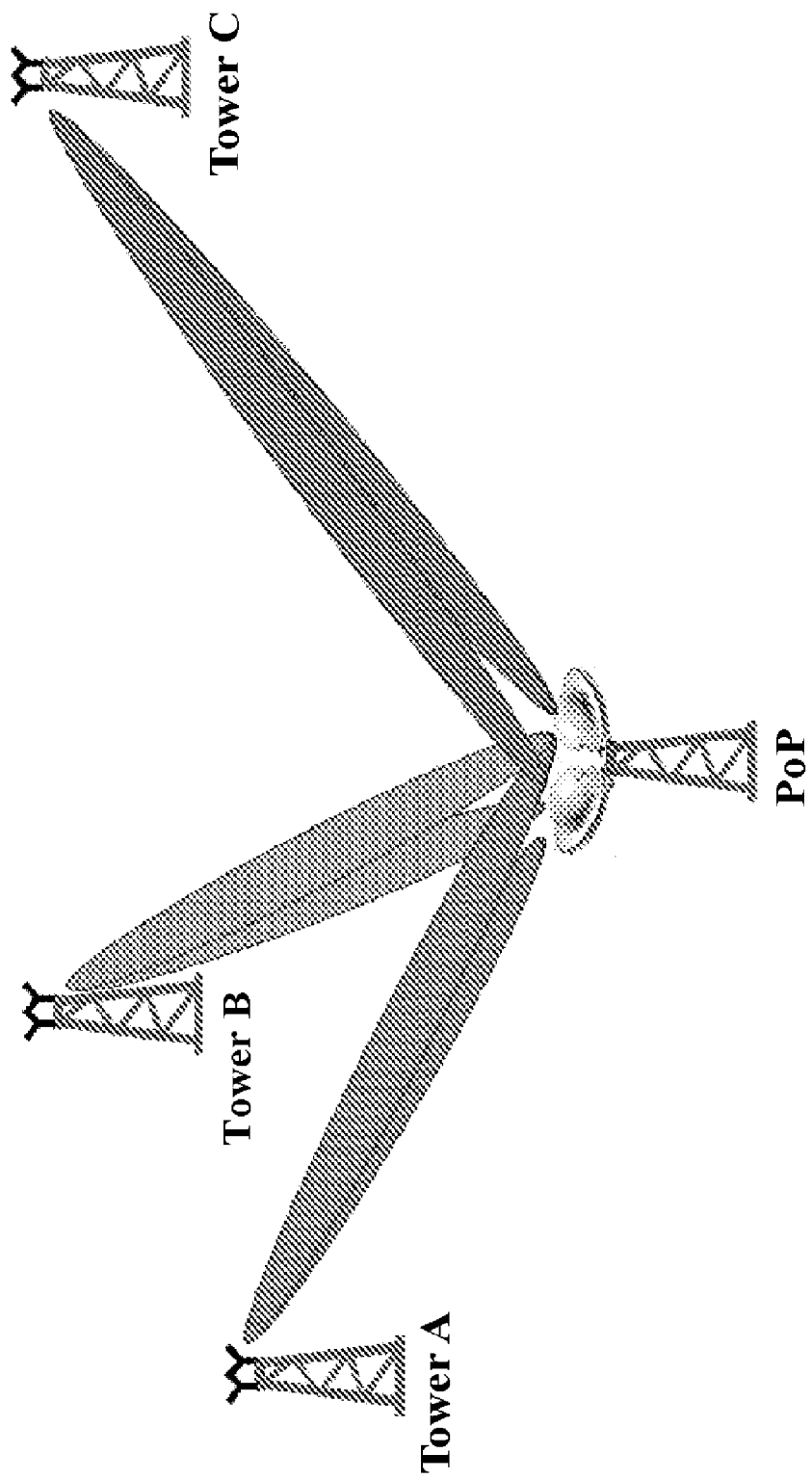
FIG. 24 shows an example of a multiple hub antenna configuration.

Dual polarization antennas and multiple antennas at the remote devices and the hub may all be used to create a multi-layer link between the hub and the devices. Note, that multiple antennas should be spatially separated for a good quality multi-layer link. FIG. 24 illustrates an example of such a system.

In FIG. 24, the hub has two Luneburg antennas, each having three beams targeting three remote towers with dual antennas. If all the antennas are dual-polarized, a 4-layer link between the hub and each tower may be established.

In some embodiments, linear antenna arrays may be used in a multi-layer multi-beam system. However, their beams at angle $\theta$, are a function of $\sin(\theta)$ and not $\theta$ and therefore become wider at higher angles. In other words, a target device at a small angle, will have a narrower beam than a target device at a higher angle. This disadvantage may be overcome with the use of special antennas, like a Luneburg antenna. For a Luneburg antenna the beams are the same for any angular target. Therefore, fewer input feeds will be typically required comparing to an equivalent antenna array.

Figure 25:
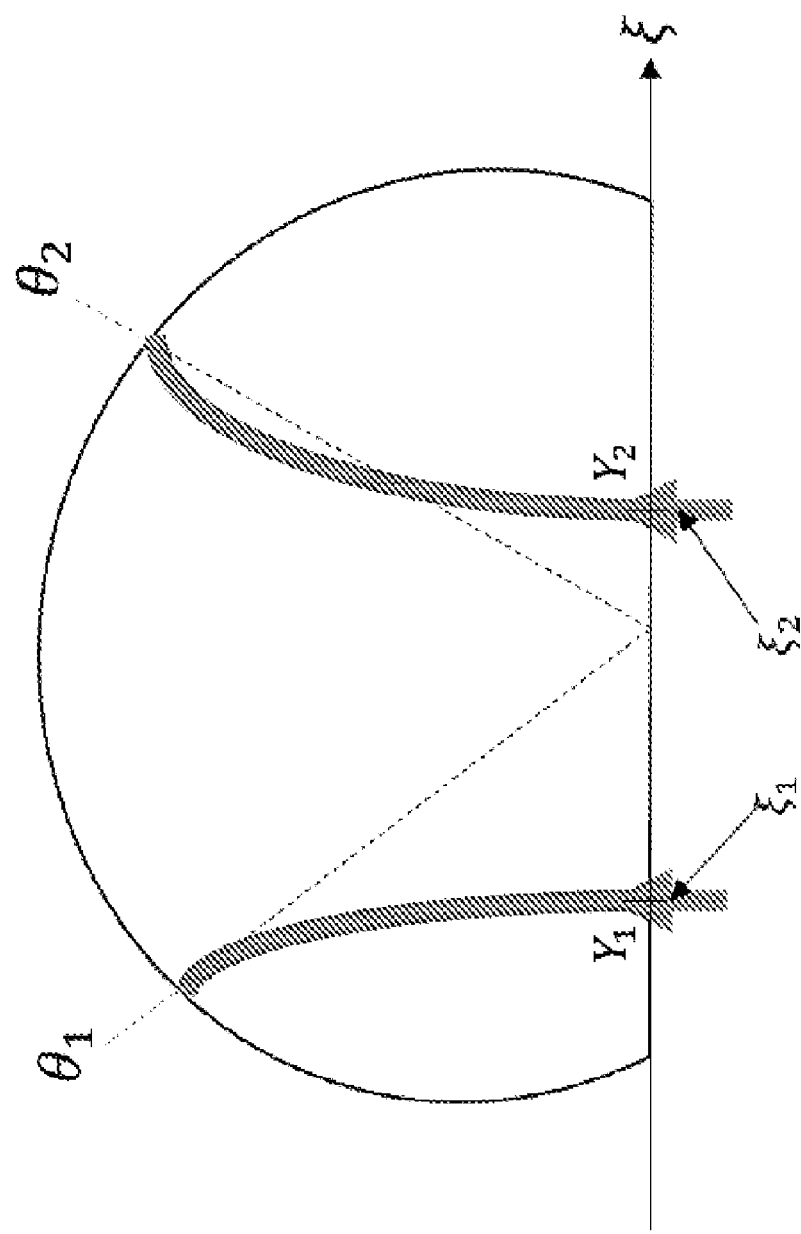
FIG. 25 shows an example of a Luneburg antenna with adjustable input feeds.

One of the properties of a Luneburg antenna is that the angular direction of the beams is a function of the locations of the input feeds, as seen in FIG. 25.

FIG. 25 shows an example of a Luneburg antenna with adjustable input feeds. Two input feeds $Y_1$ and $Y_2$ are set at locations $\xi_1$ and $\xi_2$, creating beams pointing to angles $\theta_1$ and $\theta_2$. Changing the locations $\xi_1$ and $\xi_2$ along horizontal axis will also change $\theta_1$ and $\theta_2$.

Figure 26:
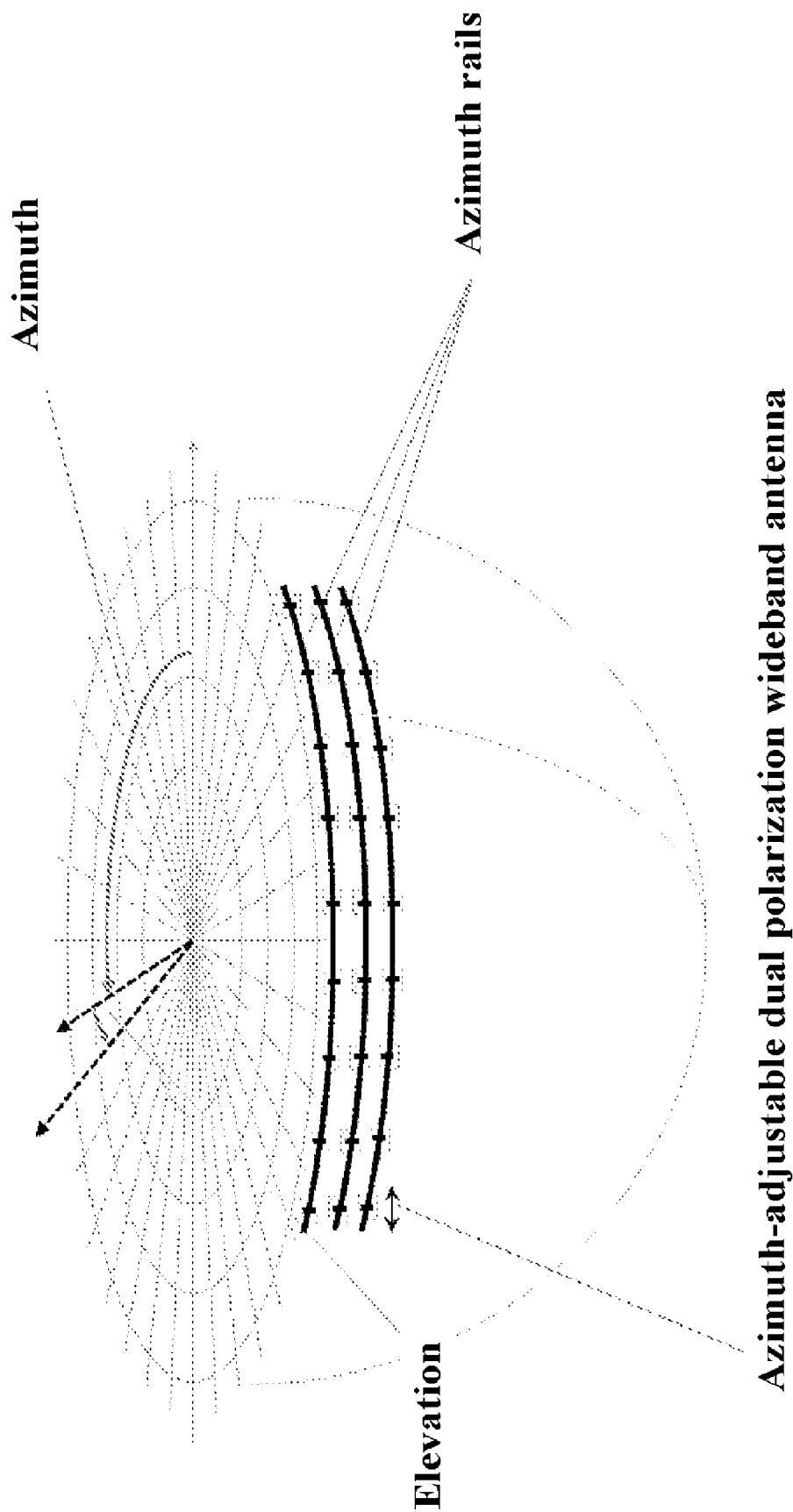
FIG. 26 shows an example of a Luneburg antenna with mechanically adjustable input feed locations.

When using a Luneburg antenna, it is possible to adjust the locations of the input feeds, such that non-precoded output beams will be pointing towards the remote devices. For this, a Luneburg antenna with mechanically adjustable locations of the input feeds is useful, as shown in the example of FIG. 26, which shows an example of a Luneburg antenna with mechanically adjustable input feeds' locations. In this example, the Luneburg lens has 27 input feeds which are dual-polarization antennas, arranged in 3 different elevation rows, each consisting of 9 antennas. In each row, the antenna elements are placed on an azimuth rail and the location of each antenna may be adjusted in azimuth. Similarly, an elevation rail may also be used to adjust the elevation of each beam.

On top of the mechanical adjustment, further shaping of the radiation pattern of the beams is possible by means of precoding (or postcoding of received signals).

Figure 27:
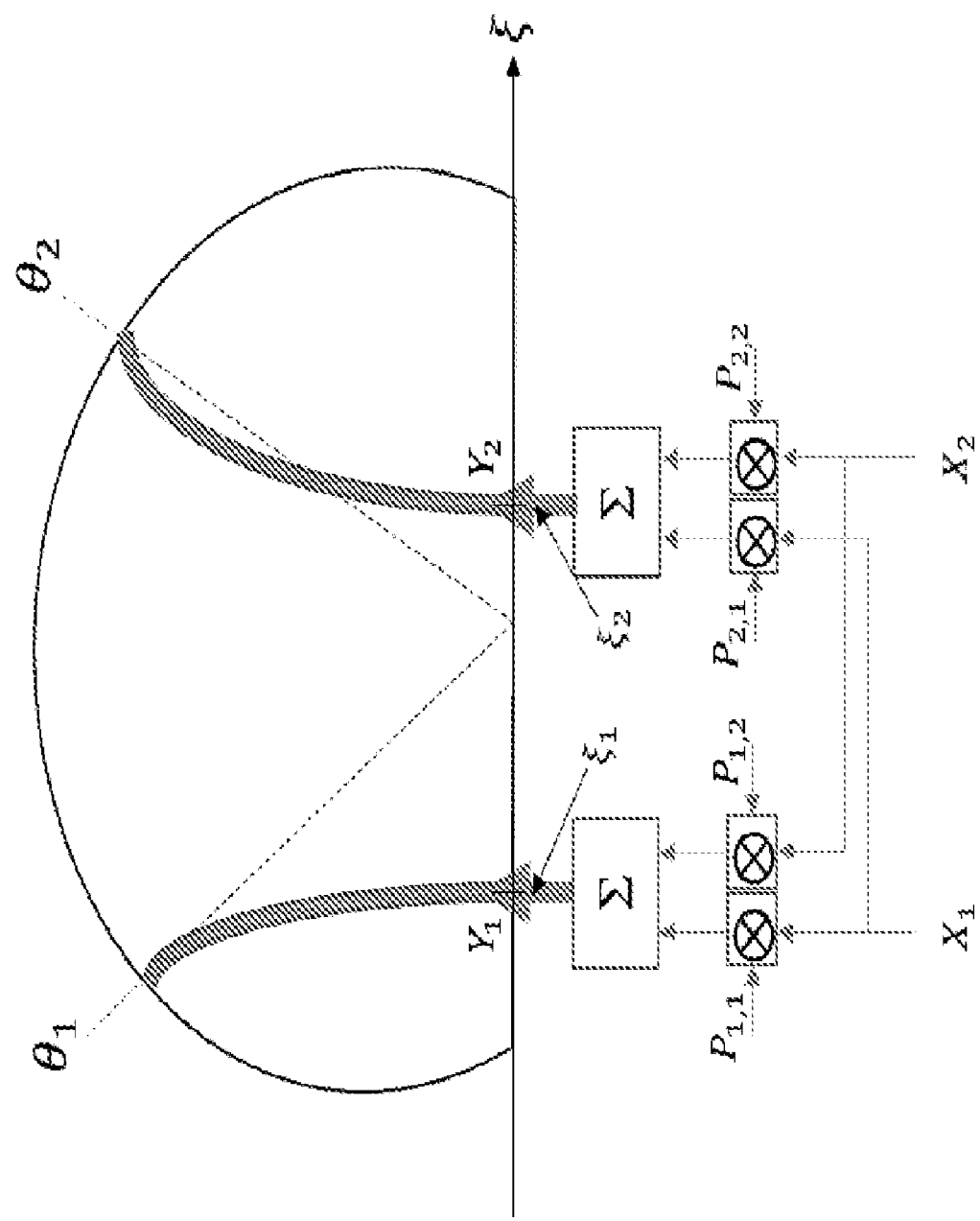
FIG. 27 shows an example of precoding in a Luneburg antenna based transmission system.

FIG. 27 illustrates a precoding example for two input streams and two output beams. In some embodiments, the number of signals passed between the precoding (or postcoding) operation and feed inputs (or outputs) of the antenna may be greater than the number of wireless stations. For example, multiple signals may be combined via additive or subtractive combination to achieve directionality to/from some wireless stations.

By feeding each input symbol to all antenna feeds, but with different weights, the transmitted beams may be shaped to maximize the SINR (signal to interference and noise ratio) at each target. Similarly, the received symbols from all antenna feeds, may be processed after applying different weights to them, to maximize the receive SINR.

5.2 Luneburg Precoding Example

Two input symbols $X_1$ and $X_2$ are precoded with weights Po creating the two input feeds to the antenna $Y_1$ and $Y_2$. In a vector notation, $Y = P \cdot X$, where P is a matrix with elements $P_{i,j}$.

5.3 Multi-Layer Multi-Beam Systems for Mobile Devices

For mobile devices, such as the case of a Radio-Access-Network (RAN), the beams may be dynamically generated to point to the directions of a selected set of devices. It is noted that uplink channel measurements are enough to design these beams.

When using a Luneburg antenna for this purpose, the input feeds may be adjusted to output non-precoded beams, which are evenly spaced in the angular domain. After precoding, the beams will approximately maximize the SINR at each target device.

5.4 Multi-Beam Precoding

For an antenna with K input ports, let $b_k(\theta)$, be a function modeling the $k^{th}$ beam generated by input ports $k=1, \ldots, K$, as a function of the angle $\theta$. For example, a linear antenna array may be modeled by $b_k(\theta)$=constant and a Luneburg antenna may be modeled by a one-dimensional jinc function, as given by $$b_k(\theta) = jinc(u) = 2\frac{J_1(2\pi u)}{2\pi u}$$

where $J_1(\cdot)$ is a Bessel function of the first kind, $u = \alpha/\lambda \sin(\theta - \bar{\theta}_k)$, $\lambda$ is the wavelength and $\bar{\theta}_k$ is the center of the desired angular beam.

For the purpose of precoding N≤K different streams of information symbol, define N output ports, which are angular targets, defined by $\theta_i$, $i=1, \ldots, N$, where an embodiment may target to focus each stream's energy and avoid interference from other streams.

Note that, for a Luneburg antenna, it is recommended that $\bar{\theta}_k = \theta_k$, for $k=1, \ldots, N$ and the remaining beams (if exist), $k=N+1, \ldots, K$, are at chosen angles that will meet side-lobes radiation constraints and desired SINR.

The precoder will shape the radiation patterns, such that around any angle $\theta_i$, the energy of output port i is maximized, while the energy of all other ports j≠i are minimized. To achieve this, each input symbol $X_i$ is fed to all the K input ports after multiplying it with a weight vector. More formally, let P be a K×N weights matrix. Then, the actual K inputs feeding the Luneburg antenna are computed as $Y = P \cdot X$. An example of precoding with two ports was given in FIG. 27. The precoder, P, is computed from a mathematical basis derived from $B_k(x)$, the Fourier transform of $b_k(\theta)$, and angular windows around $\theta_i$, specifying angular constraints.

In some embodiments, a wireless communication device (e.g., the PoP device depicted in FIG. 23 or 24) includes a feed port comprising multiple input feeds and a precoding subsystem that is electrically connected to the feed port and an antenna subsystem electrically connected to the precoding subsystem. The antenna subsystem is configured to transmit an output signal of the precoding subsystem to multiple wireless stations using multiple beams. The precoding subsystem is configured to perform a precoding operation on an input signal from the feed port, wherein the precoding operation maximizes a desired signal level to interference ratio of transmissions to the multiple wireless stations.

In some embodiments, the antenna sub-system comprises one or more antennas that are spatially separated. In some embodiments, the antenna sub-system comprises one or more Luneburg antennas. In some embodiments, the one or more Luneburg antennas are spatially separated. In some embodiments, the one or more antennas are configured to transmit or receive using a dual polarization mode.

In some embodiments, the output signal comprises a number of signals that is equal or greater than a number of the multiple wireless stations. These signals may be components of output signal that may represent multiple logical signal streams which may be combined to achieve directionality, e.g., as described with respect to FIG. 27.

6 Embodiments, Methods, and Implementations of the Disclosed Technology

Figure 28:
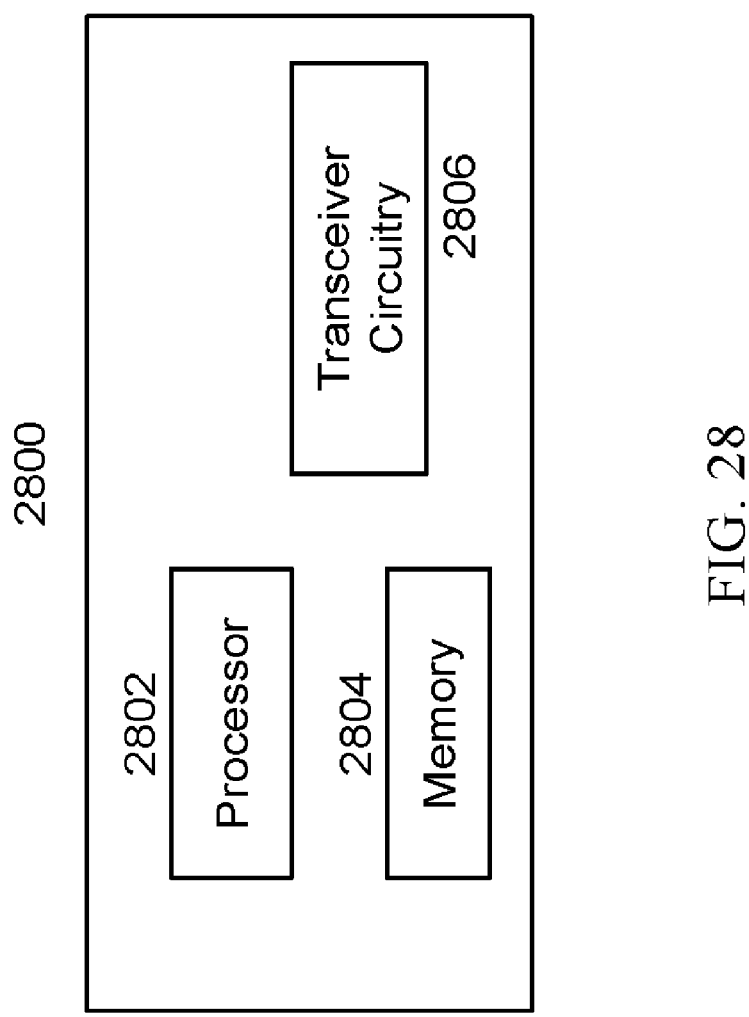
FIG. 28 is a block diagram of a hardware platform for implementing a technique described in the present document.

FIG. 28 shows a hardware platform 2800 that may be used for implementing various functions disclosed in the present document. The hardware platform 2800 includes one or more processors 2802, an optional storage or memory 2804 and transceiver circuitry 2806 for data communication (memory may be internal to processors in some implementations). The one or more processors 2802 are configured to implement various techniques described herein. The memory 2804 may store processor executable code and/or input or output data for processor-based processing. The transceiver circuitry 2806 may implement communication protocols for transmission and/or reception of data such as using a wired or wireless protocol. The hardware platform 2800 may further include one or more antennas (e.g., 202 depicted in FIG. 2) that are configured for receiving or transmitting wireless signals as described in the present document.

The following listing discloses various solutions preferably implemented in embodiments that allow for simultaneous connectivity to wireless user devices that implement different radio technologies. These solutions may be implemented by a hardware platform, such as depicted in FIG. 28, in a base station or gNB of a wireless network.

Figure 29:
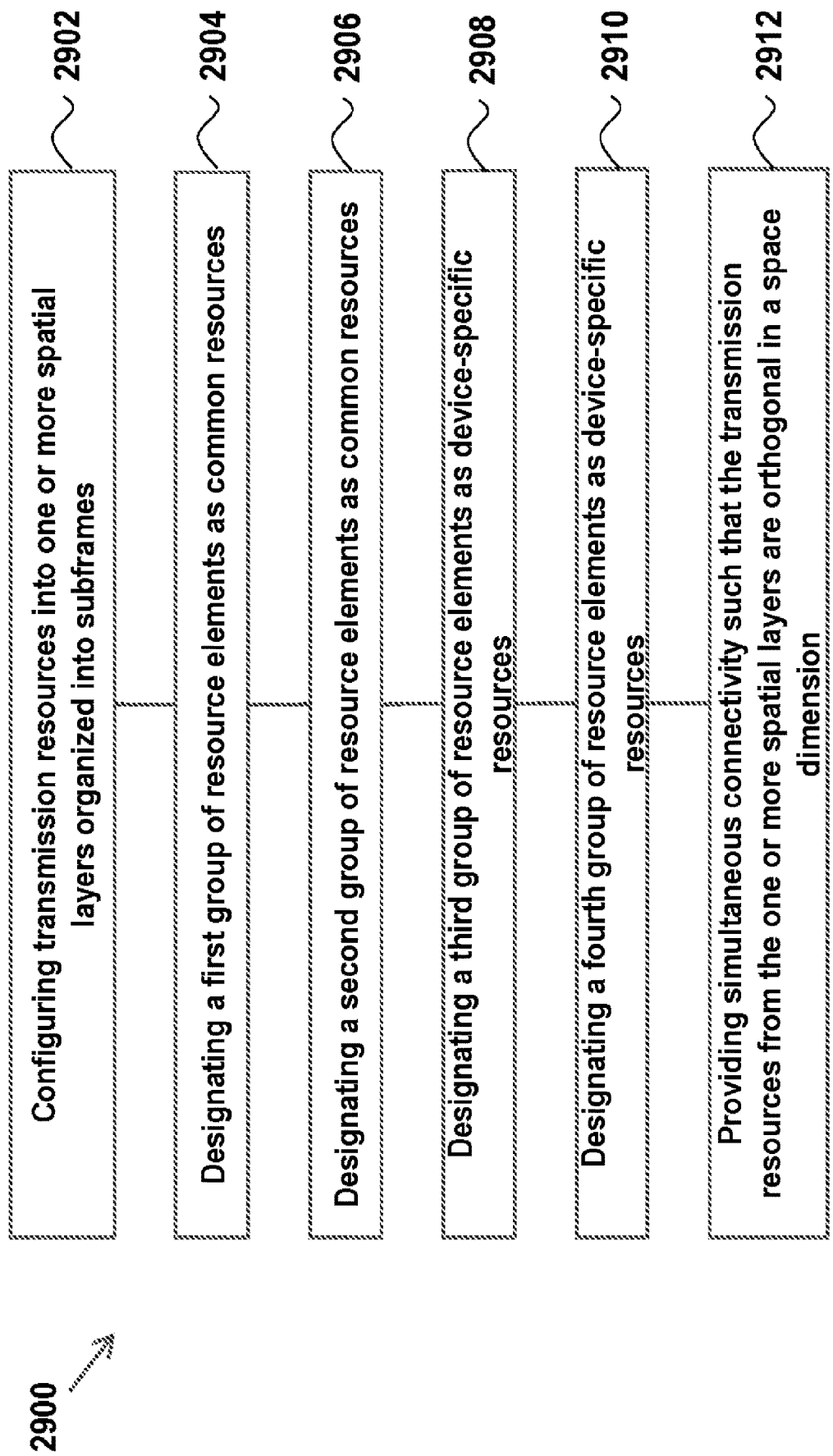
FIGS. 29-32 show flowcharts for wireless communication methods described in the present document.

1. A method of wireless communication (e.g., method 2900 depicted in FIG. 29), comprising: configuring (2902) transmission resources into one or more spatial layers organized into subframes, wherein transmission resources in each subframe are along a two-dimensional grid of time and frequency resource elements comprising symbols and subcarriers. The spatial layers may be configured based on spatial multiplexing, e.g., as described with reference FIG. 2, FIG. 5, FIG. 8, FIGS. 9A-9C, Section 1 and so on.

The method 2900 further includes, for each spatial layer, configuring the corresponding resource elements by: designating (2904) a first group of resource elements as common resources that carry signal transmissions common to a first group of user devices according to a first radio technology; designating (2906) a second group of resource elements as common resources that carry signal transmissions common to a second group of user devices according to a second radio technology; designating (2908) a third group of resource elements as device-specific resources that carry device-specific signal transmissions to user devices in the first group of user devices; designating (2910) a fourth group of resource elements as device-specific resources that carry device-specific signal transmissions to user devices in the second group of users; and providing (2912) simultaneous connectivity to the first group of user devices and the second group of user devices based on use of transmission resources from the one or more spatial layers, such that the transmission resources from the one or more spatial layers are orthogonal in a space dimension.

Various examples of configuration of the first, the second, the third and the fourth group of resource elements are described with reference to FIGS. 3 to 11J. For example, the first group of REs may be used for communication of common control channels or common reference signals. For example, the second group of REs may be used for carrying user device specific signals such as data signals and UE specific reference signals. The placement of these REs and pre-coding used for transmission may be determined based on a scheme described in Section 3 and Section 4. In other examples, method 2900 can leverage the schemes described in Section 5 to configure the transmission resources from the one or more spatial layers.

2. The method of solution 1, wherein the transmission resources from the one or more spatial layers are further orthogonal in a time dimension and/or a frequency dimension. In some embodiments, additionally, a code divisional orthogonality may also be implemented.

3. The method of solution 1, wherein the simultaneous connectivity is provided by multiplexing data transmissions of the one or more spatial layers by configuring the subframes according to one of the following multiplexing modes: a first mode in which each of the one or more spatial layers is used for carrying transmissions for the first radio technology or the second radio network technology; a second mode in which at least some of the spatial layers are used for carrying transmissions of different radio technologies.

4. The method of any of solutions 1-3, wherein at least one of the first group, the second group, the third group or the fourth group is allocated no resource elements in a subframe. For example, in some cases an entire subframe may be used for carrying communications for only a single radio technology, in which case no resource elements will be allocated for use by user devices that implement a different radio technology.

5. The method of any of solutions 1-4, wherein positions of at least some resource elements are allocable to the first group of or the third group.

6. The method of any of solutions 1-3, wherein the first radio technology comprises 4th generation Long Term Evolution (4G LTE) technology.

7. The method of any of solutions 1-3, wherein the first radio technology comprises an orthogonal time frequency space (OTFS) modulation scheme.

8. The method of any of solutions 1-7, wherein the second radio technology comprises generation New Radio (5G NR) technology.

9. The method of any of solutions 4-5, wherein the configuration of some the first group of resource elements and the configuration of some of the second group of resource elements is overlapping over three time symbols. Some examples are described with reference to FIGS. 4, 5, and 9A-9C.

10. The method of any of solutions 4-5, wherein the configuration of some of the first group of resource elements and the configuration of some of the second group of resource elements is overlapping over two time symbols. For example, some examples are described with reference to FIGS. 7, 8 and 9A-9C.

11. The method of any of solutions 1-10, wherein the method is performed in a wireless network operating in a frequency division duplexing mode.

12. The method of any of solutions 1-10, wherein the method is performed in a wireless network operating in a time division duplexing mode.

13. The method of any of solutions 1-13, wherein the transmission resources from the one or more spatial layers that are orthogonal in the spatial dimension are determined based on processing of reception of uplink reference signals.

The above listed solutions primarily disclose downlink signal transmissions. However, as described throughout the present document, similar spatial multiplexing techniques may also be implemented for uplink transmissions from user devices that implement different radio technologies.

The following solutions may be preferably implemented by some embodiments for simultaneous operation of uplink transmissions using different radio technologies.

Figure 30:
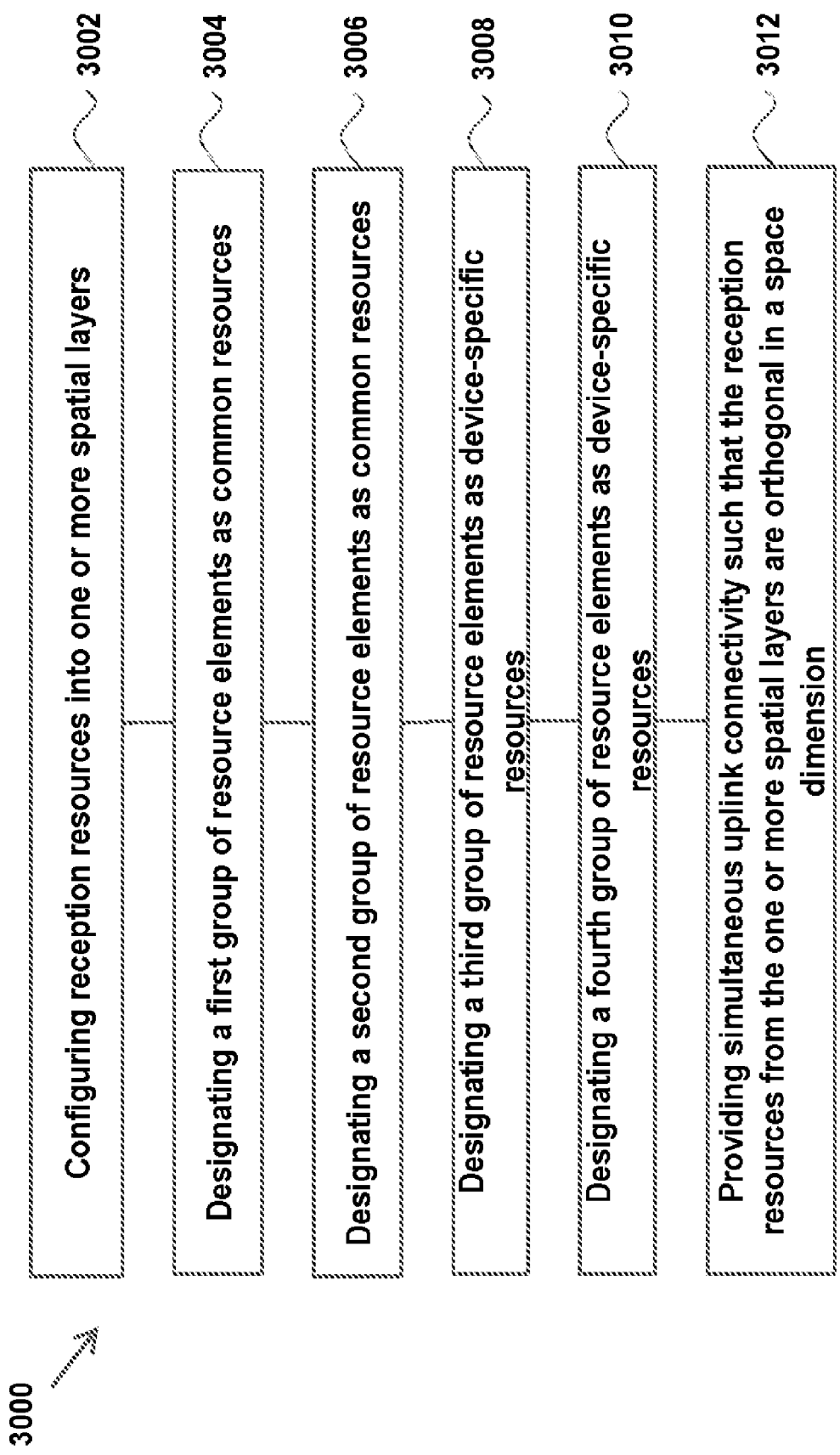

14. A method of wireless communication (e.g., method 3000 depicted in FIG. 30), comprising: configuring (3002) reception resources into one or more spatial layers organized into subframes, wherein reception resources in each subframe are along a two-dimensional grid of time and frequency resource elements comprising symbols and subcarriers, for each spatial layer, configuring the corresponding resource elements by: designating (3004) a first group of resource elements as common resources that carry signal transmissions from a first group of user devices according to a first radio technology; designating (3006) a second group of resource elements as common resources that carry signal transmissions from a second group of user devices according to a second radio technology; designating (3008) a third group of resource elements as device-specific resources that carry device-specific signal transmissions from user devices in the first group of user devices; designating (3010) a fourth group of resource elements as device-specific resources that carry device-specific signal transmissions from user devices in the second group of users; and providing (3012) simultaneous uplink connectivity to the first group of user devices and the second group of user devices based on use of reception resources from the one or more spatial layers, such that the reception resources from the one or more spatial layers are orthogonal in a space dimension.

15. The method of solution 14, wherein the reception resources from the one or more spatial layers are further orthogonal in a time dimension and/or a frequency dimension.

16. The method of solution 14, wherein the simultaneous connectivity is provided by multiplexing resources of the one or more spatial layers by configuring the subframes according to one of the following multiplexing modes: a first mode in which each of the one or more spatial layers is used for carrying transmissions for the first radio technology or the second radio network technology; a second mode in which at least some of the spatial layers are used for carrying transmissions of different radio technologies.

17. The method of any of solutions 14-16, wherein at least one of the first group, the second group, the third group or the fourth group is allocated no resource elements in a subframe.

18. The method of any of solutions 14-17, wherein positions of at least some resource elements are allocable to the first group of or the third group.

19. The method of any of solutions 14-17, wherein the first radio technology comprises 4th generation Long Term Evolution (4G LTE) technology.

20. The method of any of solutions 14-17, wherein the first radio technology comprises an orthogonal time frequency space (OTFS) modulation scheme.

The OTFS modulation scheme is further described in U.S. Pat. Nos. 8,976,851 and 9,444,514, which are incorporated herein by reference in their entirety. Using OTFS, for example, transmission resources may be processed in the delay-Doppler domain prior to transmission or reception of signals.

21. The method of any of solutions 14-17, wherein the second radio technology comprises 5th generation New Radio (5G NR) technology.

22. The method of any of solutions 14-21, wherein the method is performed in a wireless network operating in a frequency division duplexing mode.

23. The method of any of solutions 14-22, wherein the method is performed in a wireless network operating in a time division duplexing mode.

24. The method of any of solutions 14-23, wherein the transmission resources from the one or more spatial layers that are orthogonal in the spatial dimension are determined based on processing of reception of uplink reference signals.

The following technical solutions may be preferably implemented by some embodiments of a 5G base station that achieves a backward compatible operation with LTE radio technology.

Figure 31:
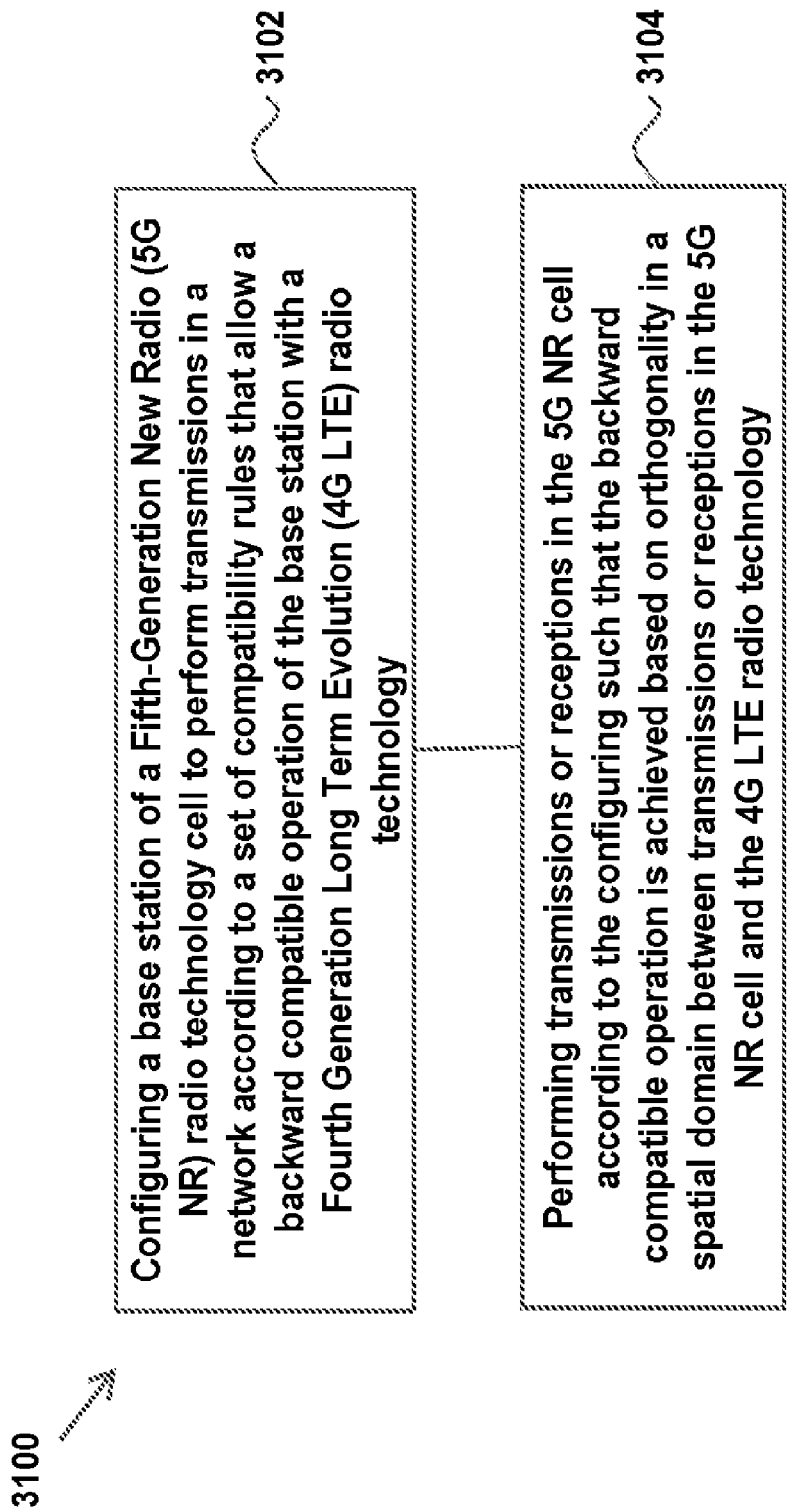

25. A method of wireless communication (e.g., method 3100 depicted in FIG. 31), comprising: configuring (3102) a base station of a fifth generation new radio (5G NR) radio technology cell to perform transmissions in a network according to a set of compatibility rules that allow a backward compatible operation of the base station with a 4th generation Long Term Evolution (4G LTE) radio technology; and performing (3104) transmissions or receptions in the NR cell according to the configuring such that the backward compatible operation is achieved based on orthogonality in a spatial domain between transmissions or receptions in the NR cell and the 4G LTE radio technology.

26. The method of solution 25, wherein the compatibility rules include: configuring a first slot in a frame to be aligned with an 4G LTE subframe, which is not number #0 or number #5.

27. The method of any of solutions 25-26, wherein the compatibility rules include configuring synchronization signal block (SSB) subcarrier spacing of 30 kHz and using SSB index #2.

28. The method of any of solutions 25-27, wherein the compatibility rules include configuring the base station and user devices served in the 5G NR radio technology cell for rate-matching an LTE cell-specific reference signal (CRS).

29. The method of any of solutions 25-28, wherein the compatibility rules include configuring subcarrier spacing of 15 kHz.

30. The method of any of solutions 25-29, wherein the compatibility rules include configuring transmissions of demodulation reference signal (DMRS) on symbols #3 and #12.

31. The method of any of solutions 25-30, wherein the compatibility rules include configuring uplink grid alignment of 7.5 kHz.

32. The method of any of solutions 25-31, wherein the compatibility rules include configuring sounding reference signal (SRS) on a last symbol of a frame.

33. The method of any of solutions 25-32, wherein, in case that the 4G LTE technology is configured to use first and second symbols of a frame for transmission of downlink control channel and a third symbol of the frame for downlink shared channel transmissions, the method further comprising: defining control resource sets (CORESETs) for downlink control channel (PDCCH) with a CSS (Common Search Space) over any of the symbol #1-#2 or USS (UE-specific Search Space) on any of the symbols #1-#3 and defining CORESET 0 over symbol #1 or #2; and transmitting a physical downlink shared channel transmission (PDSCH) on symbols #3-13 or #4-13.

34. The method of any of solutions 25-33, wherein, in case that the 4G LTE technology is configured to use first and second symbols of a frame for transmission of downlink control channel and/or downlink shared channel transmissions, the method further comprising: defining control resource sets (CORESETs) for downlink control channel (PDCCH) with a CSS (Common Search Space) over any of the symbol #1-#2 or USS (UE-specific Search Space) on any of the symbols #1-#3 and defining CORESET 0 over symbol #1; and transmitting a physical downlink shared channel transmission (PDSCH) on symbols #2-13 or #3-13.

Additional examples of the above-described solutions are provided in Sections 1.4 to 1.7 of the present document.

The following technical solutions may be implemented by some base stations to provide simultaneously providing wireless service to user devices that are operating using a variety of different radio access technologies.

Figure 32:
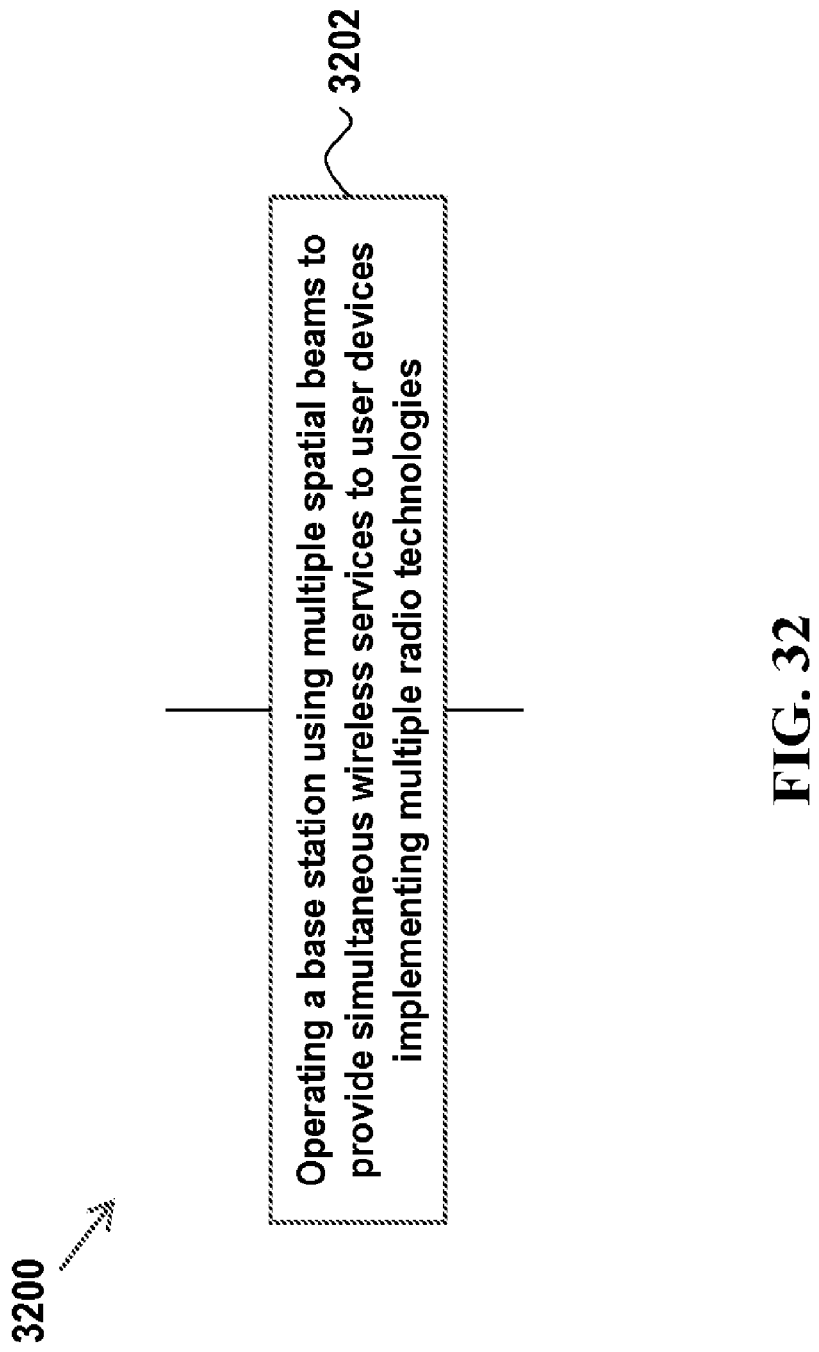

35. A method of wireless communication (e.g., method 3200 depicted in FIG. 32), comprising: operating (3202) a base station using multiple spatial beams to provide simultaneous wireless services to user devices implementing multiple radio technologies, wherein communication resources between the base station and the user devices are arranged as repetitive subframes of resource elements, wherein each resource element comprises a unit of time resource and a unit of frequency resource; wherein a first portion of each subframe is designated for carrying device-specific signals; wherein resource elements in the first portion of each subframe designated for carrying device-specific signals are configured to use spatial multiplexing over the multiple spatial beams to provide wireless service to user devices implementing multiple radio technologies. In some examples, method 3200 can leverage the schemes described in Section 5 to configure the multiple spatial beams for both stationary user devices (e.g., see Section 5.2) and mobile user devices (e.g., see Section 5.4).

36. The method of solution 35, wherein the device-specific signals include downlink transmissions from the base station.

37. The method of solution 35, wherein the device-specific signals include uplink transmissions to the base station.

38. The method of any of solutions 35-37, wherein resources elements are allocated to a specific user device for both downlink and uplink signals are based on processing of uplink reference signal transmissions from the specific user device.

39. The method of any of solutions 35-38, wherein the multiple radio technologies include fourth generation long term evolution (4G LTE) and fifth generation new radio (5G NR) radio technologies.

40. The method of any of solutions 35-38, wherein the multiple radio technologies include an orthogonal time frequency space (OTFS) modulation scheme.

41. The method of any of solutions 35-40, wherein resource elements in a second portion of each subframe are designated for carrying signals that are common to user devices implementing a specific radio technology.

42. The method of solution 41, wherein the second portion of each subframe is configured to carry signals for common control channel transmissions or common reference signal transmissions.

43. A method of wireless communication, comprising: configuring a base station implementing a Long Term Evolution (LTE) radio technology to provide cellular coverage to user device without using a multimedia broadcast single frequency network (MBSFN) feature; configuring the base station to perform downlink common control channel transmissions using N symbols, wherein N=2 or 3; and performing transmissions or receptions in remaining symbols of a subframe such that a compatible operation is achieved based on orthogonality in a spatial domain between the LTE radio technology and a fifth generation new radio (5G NR) cell.

The above method may be performed by an LTE base station using a hardware platform such as depicted in FIG. 28.

44. The method of solution 43, wherein N=3.

45. The method of solution 43, wherein downlink shared channel transmissions are performed using symbol numbers 3 to 13.

46. The method of solution 44-45, wherein the downlink common control channel transmissions are preformed using symbols 0 and 1.

47. The method of solution 44-45, wherein the downlink common control channel transmissions are preformed using symbols 0, 1 and 2.

48. The method of solution 43, wherein N=2.

49. The method of solution 48, wherein downlink shared channel transmissions are performed using symbol numbers 2 to 13.

50. The method of solution 44-45, wherein the downlink common control channel transmissions are preformed using symbols 0 and 1.

51. The method of any of solutions 43-50, wherein the configuring is performed based on information about operation of the 5G NR cell.

52. A wireless communication apparatus comprising a processor and a transceiver, wherein the processor is configured to perform a method recited in any one or more of solutions 1-51 and the transceiver is configured to transmit or receive a waveform according to the method recited in any one or more of solutions 1-51.

With respect to the technical solutions described herein, "orthogonality" among signals may be achieved in a theoretical sense but in practice the signals may have a small amount of overlap. In other words, in some cases, the orthogonality may be mathematically perfect; however, due to operational limitations such as non-ideal filter implementations and quantization errors, it may be "near-orthogonal" in a strict mathematical sense.

It will be appreciated that techniques for allowing co-existence and co-operation of wireless network that implement multiple radio technologies or air interface protocols are described. In one aspect, the simultaneous connectivity of multiple user devices implementing different radio technologies is achieved by provide a signal to each of the user devices in a manner compatible to the corresponding radio technology, while allowing spatial multiplexing of resources. In another example aspect, common resources and device specific resources are handled differently—namely, radio technologies will not use each other's common resources on which devices will expect meaningful signal transmissions, while device-specific resources are optimized for use by corresponding devices.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of wireless communication, comprising:
   configuring transmission resources into one or more spatial layers organized into subframes, wherein transmission resources in each subframe are along a two-dimensional grid of time and frequency resource elements comprising symbols and subcarriers; and
   for each spatial layer, configuring the corresponding resource elements by:
      designating a first group of resource elements as common resources that carry signal transmissions common to a first group of user devices according to a first radio technology;
      designating a second group of resource elements as common resources that carry signal transmissions common to a second group of user devices according to a second radio technology;
      designating a third group of resource elements as device-specific resources that carry device-specific signal transmissions to user devices in the first group of user devices;
      designating a fourth group of resource elements as device-specific resources that carry device-specific signal transmissions to user devices in the second group of users; and
      providing simultaneous connectivity to the first group of user devices and the second group of user devices based on use of transmission resources from the one or more spatial layers, such that the transmission resources from the one or more spatial layers are orthogonal in a space dimension.

2. The method of claim 1, wherein the transmission resources from the one or more spatial layers are further orthogonal in a time dimension and/or a frequency dimension.

3. The method of claim 1, wherein the simultaneous connectivity is provided by multiplexing data transmissions of the one or more spatial layers by configuring the subframes according to one of the following multiplexing modes:
   a first mode in which each of the one or more spatial layers is used for carrying transmissions for the first radio technology or the second radio network technology, or
   a second mode in which at least some of the spatial layers are used for carrying transmissions of different radio technologies.

4. The method of claim 1, wherein at least one of the first group, the second group, the third group or the fourth group is allocated no resource elements in a subframe.

5. The method of claim 1, wherein the first radio technology comprises 4th generation Long Term Evolution (4G LTE) technology.

6. The method of claim 1, wherein the first radio technology comprises an orthogonal time frequency space (OTFS) modulation scheme.

7. A method of wireless communication, comprising:
configuring reception resources into one or more spatial layers organized into subframes, wherein reception resources in each subframe are along a two-dimensional grid of time and frequency resource elements comprising symbols and subcarriers,
for each spatial layer, configuring the corresponding resource elements by:
designating a first group of resource elements as common resources that carry signal transmissions from a first group of user devices according to a first radio technology;
designating a second group of resource elements as common resources that carry signal transmissions from a second group of user devices according to a second radio technology;
designating a third group of resource elements as device-specific resources that carry device-specific signal transmissions from user devices in the first group of user devices;
designating a fourth group of resource elements as device-specific resources that carry device-specific signal transmissions from user devices in the second group of users; and
providing simultaneous uplink connectivity to the first group of user devices and the second group of user devices based on use of reception resources from the one or more spatial layers, such that the reception resources from the one or more spatial layers are orthogonal in a space dimension.

8. The method of claim 7, wherein the reception resources from the one or more spatial layers are further orthogonal in a time dimension and/or a frequency dimension.

9. The method of claim 7, wherein the simultaneous connectivity is provided by multiplexing resources of the one or more spatial layers by configuring the subframes according to one of the following multiplexing modes:
a first mode in which each of the one or more spatial layers is used for carrying transmissions for the first radio technology or the second radio network technology;
a second mode in which at least some of the spatial layers are used for carrying transmissions of different radio technologies.

10. The method of claim 7, wherein at least one of the first group, the second group, the third group or the fourth group is allocated no resource elements in a subframe.

11. A method of wireless communication, comprising:
operating a base station using multiple spatial beams to provide simultaneous wireless services to user devices implementing multiple radio technologies,
wherein communication resources between the base station and the user devices are arranged as repetitive subframes of resource elements, wherein each resource element comprises a unit of time resource and a unit of frequency resource,
wherein a first portion of each subframe is designated for carrying device-specific signals, and
wherein resource elements in the first portion of each subframe designated for carrying device-specific signals are configured to use spatial multiplexing over the multiple spatial beams to provide wireless service to user devices implementing multiple radio technologies;
wherein resources elements are allocated to a specific user device for both downlink and uplink signals are based on processing of uplink reference signal transmissions from the specific user device.

* * * * *